(12) United States Patent
Zheng et al.

(10) Patent No.: US 9,296,159 B2
(45) Date of Patent: *Mar. 29, 2016

(54) SILICONE HYDROGEL CONTACT LENSES

(75) Inventors: Ying Zheng, Pleasanton, CA (US); Yuan Xu, Fremont, CA (US); Junhao Ge, Fremont, CA (US); Charles A. Francis, Union City, CA (US); Yuan Sun, Pleasanton, CA (US); Yuwen Liu, Dublin, CA (US); Charlie Chen, San Ramon, CA (US); Ye Hong, Pleasanton, CA (US); Hongjin Qiu, Mountain House, CA (US); Li Yao, Johns Creek, GA (US); Arthur Back, Danville, CA (US)

(73) Assignee: CooperVision International Holding Company, LP, St. Michael (BB)

( * ) Notice: Subject to any disclaimer, the term of this patent is extended or adjusted under 35 U.S.C. 154(b) by 161 days.

This patent is subject to a terminal disclaimer.

(21) Appl. No.: 13/983,306

(22) PCT Filed: Feb. 23, 2012

(86) PCT No.: PCT/US2012/026225
§ 371 (c)(1),
(2), (4) Date: Sep. 30, 2013

(87) PCT Pub. No.: WO2012/154268
PCT Pub. Date: Nov. 15, 2012

(65) Prior Publication Data
US 2014/0009735 A1    Jan. 9, 2014

Related U.S. Application Data

(60) Provisional application No. 61/447,211, filed on Feb. 28, 2011.

(51) Int. Cl.
*G02B 1/04* (2006.01)
*B29D 11/00* (2006.01)
*C08F 290/06* (2006.01)

(52) U.S. Cl.
CPC ...... *B29D 11/00125* (2013.01); *C08F 290/068* (2013.01); *G02B 1/043* (2013.01); *B29D 11/0025* (2013.01)

(58) Field of Classification Search
CPC ..... G02B 1/043; C08L 83/12; B29D 11/0025
See application file for complete search history.

(56) References Cited

U.S. PATENT DOCUMENTS

| | | | |
|---|---|---|---|
| 5,079,319 A | 1/1992 | Mueller | |
| 5,760,100 A | 6/1998 | Nicolson et al. | |
| 8,865,789 B2 * | 10/2014 | Yao et al. | 523/107 |
| 2003/0008154 A1 | 1/2003 | Aguado et al. | |
| 2005/0018130 A1 | 1/2005 | Dahi et al. | |
| 2007/0296914 A1 | 12/2007 | Hong et al. | |
| 2009/0234089 A1 * | 9/2009 | Ueyama et al. | 526/279 |
| 2009/0252868 A1 | 10/2009 | Phelan | |
| 2009/0299022 A1 * | 12/2009 | Ichinohe | 526/279 |
| 2011/0085128 A1 * | 4/2011 | Liu et al. | 351/160 H |

OTHER PUBLICATIONS

International Search Report and Written Opinion issued in corresponding International Patent Application No. PCT/US2012/026225 dated Oct. 16, 2012 (15 pages).

* cited by examiner

*Primary Examiner* — Michael Pepitone
(74) *Attorney, Agent, or Firm* — Kilyk & Bowersox, P.L.L.C.

(57) ABSTRACT

Silicone hydrogel contact lenses that are derived from a polymerizable composition including at least one siloxane monomer and at least one hydrophobic ethylene glycol methyl ether methacrylate-containing monomer, or at least one hydrophilic vinyl ether-containing monomer, or both, wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight, are described. Batches of silicone hydrogel contact lenses and methods of making silicone hydrogel contact lenses are also described.

20 Claims, No Drawings

SILICONE HYDROGEL CONTACT LENSES

This application is a National Stage Application of PCT/US2012/026225, filed Feb. 23, 2012, and which claims the benefit under 35 U.S.C. §119(e) of prior U.S. Provisional Patent Application No. 61/447,211, filed Feb. 28, 2011, which is incorporated in its entirety by reference herein.

FIELD

The present disclosure is directed to silicone hydrogel contact lenses and related compositions and methods.

BACKGROUND

Commercially and clinically, silicone hydrogel contact lenses are a popular alternative to conventional hydrogel contact lenses (i.e., hydrogel contact lenses that do not contain silicone or silicone-containing ingredients). The presence of siloxanes in silicone hydrogel contact lens formulations is believed to affect the properties of silicone hydrogel contact lenses obtained therefrom. For example, it is believed that the presence of a siloxane component in a polymerizable composition used to form a contact lens results in a relatively higher oxygen permeability compared to a conventional hydrogel contact lens without a siloxane component. In addition, it is believed that the presence of a siloxane component in the polymerizable composition increases the likelihood of hydrophobic domains being present on the lens surface of a silicone hydrogel contact lens as compared to a conventional hydrogel contact lens without a siloxane component. The first generation of silicone hydrogel contact lenses provided high levels of oxygen, even though the wettability of the lenses tended to be lower than might be desired. Techniques have been developed to overcome the hydrophobicity issues of silicone hydrogel contact lens surfaces. Based on the popularity of silicone hydrogel contact lenses, there continues to be a need for new silicone hydrogel contact lenses.

Some documents describing silicone hydrogel contact lenses include: U.S. Pat. No. 4,711,943, U.S. Pat. No. 5,712,327, U.S. Pat. No. 5,760,100, U.S. Pat. No. 7,825,170, U.S. Pat. No. 6,867,245, US20060063852, US20070296914, U.S. Pat. No. 7,572,841, US20090299022, US20090234089, and US20100249356, each of which is incorporated in its entirety by reference herein.

SUMMARY

The present disclosure is directed to polymerizable compositions, to silicone hydrogel contact lenses that are formed by reacting the polymerizable compositions to form polymeric lens bodies, to batches of the silicone hydrogel contact lenses, to packages of the silicone hydrogel contact lenses, and to methods of manufacturing silicone hydrogel contact lenses from the polymerizable compositions.

The polymerizable compositions of the present disclosure comprise (a) at least one siloxane monomer, and (b) at least one hydrophobic ethylene glycol methyl ether methacrylate-containing monomer, or at least one hydrophilic vinyl ether-containing monomer, or both at least one hydrophobic ethylene glycol methyl ether methacrylate-containing monomer and at least one hydrophilic vinyl ether-containing monomer. When present in the polymerizable composition, the at least one hydrophobic ethylene glycol methyl ether methacrylate-containing monomer is present in the polymerizable composition, it is present in an amount of from 1 to 20 unit parts by weight. When present in the polymerizable composition, the at least one hydrophilic vinyl ether-containing monomer is present in the polymerizable composition, it is present in an amount of from 1 to 20 unit parts by weight.

One example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

One example of a method in accordance with the present disclosure is a method of manufacturing a silicone hydrogel contact lens, comprising: providing a polymerizable composition, said polymerizable composition comprising (a) at least one siloxane monomer; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

In one example of the polymerizable composition, the at least one hydrophobic ethylene glycol methyl ether methacrylate-containing monomer is present in the polymerizable composition. The at least one hydrophobic ethylene glycol methyl ether methacrylate-containing monomer can comprise or consist of ethylene glycol methyl ether methacrylate (EGMA), or di(ethylene glycol)methyl ether methacrylate, or tri(ethylene glycol)methyl ether methacrylate, or a poly(ethylene glycol)methyl ether methacrylate having from 4 to 10 ethylene glycol units, or a poly(ethylene glycol)methyl ether methacrylate having more than 10 ethylene glycol units, or any combination thereof. The at least one hydrophobic ethylene glycol methyl ether methacrylate-containing monomer can comprise or consist of ethylene glycol methyl ether methacrylate (EGMA). The at least one hydrophobic ethylene glycol methyl ether methacrylate-containing monomer can be present in the polymerizable composition in an amount of from of from 2 to 15 unit parts by weight, or of from 3 to 12 unit parts by weight.

In another example, the polymerizable composition can further comprise at least one other hydrophobic monomer which is not an ethylene glycol methyl ether methacrylate-containing monomer. For example, the at least one other hydrophobic monomer can comprise or consist of methyl methacrylate (MMA). The MMA can be present in the polymerizable composition in an amount from about 5 to about 20 unit parts by weight. In a particular example, the at least one hydrophobic ethylene glycol methyl ether methacrylate-containing monomer can consist of ethylene glycol methyl ether methacrylate (EGMA), and a ratio of unit parts by weight of MMA to unit parts by weight of EGMA present in the polymerizable composition can be from about 6:1 to about 1:1.

In yet another example, the polymerizable composition can comprise the at least one hydrophilic vinyl ether-containing monomer, wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight. The at least one hydrophilic vinyl ether-containing monomer can comprise or consist of 1,4-butanediol vinyl ether (BVE), or ethylene glycol vinyl ether (EGVE), or di(ethylene glycol) vinyl ether (DEGVE), or tri(ethylene glycol) vinyl ether, or a poly(ethylene glycol) vinyl ether having from 4 to 10 ethylene glycol units, or a poly(ethylene glycol) vinyl ether having more than 10 ethylene glycol units, or any combination thereof. The at least one hydrophilic vinyl ether-containing monomer can comprise or consist of a hydrophilic vinyl ether-containing monomer component consisting of BVE in combination with EGVE, or BVE in combination with DEGVE, or BVE in combination with both EGVE and DEGVE. The at least one hydrophilic vinyl ether-containing monomer can be present in the polymerizable composition in an amount of from 2 to 15 unit parts by weight, or in an amount of from 3 to 12 unit parts by weight.

The polymerizable composition of the present disclosure can optionally further comprise at least one hydrophilic monomer which is not a vinyl ether-containing monomer (i.e., a hydrophilic non-vinyl ether-containing monomer). For example, the at least one hydrophilic non-vinyl ether-containing monomer can comprise or consist of at least one hydrophilic amide monomer having one N-vinyl group. The at least one hydrophilic amide monomer having one N-vinyl group can comprise or consist of N-vinyl-N-methyl acetamide (VMA), or N-vinyl pyrrolidone (NVP), or both. The at least one hydrophilic amide-containing monomer can be present in the polymerizable composition in an amount from about 10 to about 60 unit parts by weight.

The polymerizable composition can further comprise at least one cross-linking agent. The at least one cross-linking agent can comprise or consist of an acrylate or methacrylate-containing cross-linking agent. The at least one cross-linking agent can comprise or consist of at least one vinyl-containing cross-linking agent. The at least one cross-linking agent can comprise or consist of at least one vinyl-containing cross-linking agent and at least one acrylate or methacrylate-containing cross-linking agent. The at least one vinyl-containing cross-linking agent can be present in the polymerizable composition in an amount from about 0.01 unit parts to about 2.0 unit parts by weight.

The at least one siloxane monomer of the polymerizable composition can comprise or consist of a methacrylate-containing siloxane monomer. The at least one siloxane monomer can comprise or consist of a multifunctional siloxane monomer. The at least one siloxane monomer can be a dual-end methacrylate end-capped polydimethylsiloxane monomer. The at least one siloxane monomer can be a dual-end methacrylate end-capped polydimethylsiloxane monomer having a number average molecular weight of at least 7,000 daltons. The at least one siloxane monomer can be present in the polymerizable composition in an amount from about 10 unit parts by weight to about 60 unit parts by weight.

In one example, the at least one siloxane monomer can comprise or consist of a single siloxane monomer, or can comprise or consist of a siloxane monomer component composed of two or more siloxane monomers. The siloxane monomer component can comprise or consist of a first siloxane monomer having a molecular weight less of from 400 daltons to 700 daltons, and a second siloxane monomer having a molecular weight of at least 7,000 daltons. The first siloxane monomer and the second siloxane monomer can be present in the polymerizable composition in a ratio of unit parts of the first siloxane monomer present in the polymerizable composition to unit parts of the second siloxane monomer present in the polymerizable composition of at least 2:1. For example, the ratio can be at least 3:1, or at least 4:1, or can be a ratio of about 4:1.

In one example, the at least one siloxane monomer can comprise a monofunctional siloxane monomer represented by formula (3):

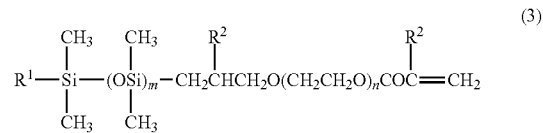

wherein m of formula (3) represents one integer from 3 to 10, n of formula (3) represents one integer from 1 to 10, $R^1$ of formula (3) is an alkyl group having from 1 to 4 carbon atoms, and each $R^2$ of formula (3) is independently either a hydrogen atom or a methyl group. In another example, the at least one siloxane monomer can comprise a monofunctional siloxane represented by formula (3):

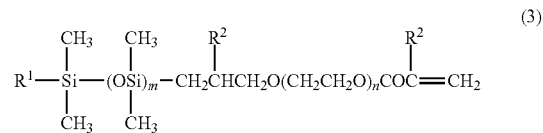

wherein m of formula (3) is 4, n of formula (3) is 1, $R^1$ of formula (3) is a butyl group, and each $R^2$ of formula (3) is independently either a hydrogen atom or a methyl group.

In another example, the at least one siloxane monomer can comprise a monofunctional siloxane represented by formula (4):

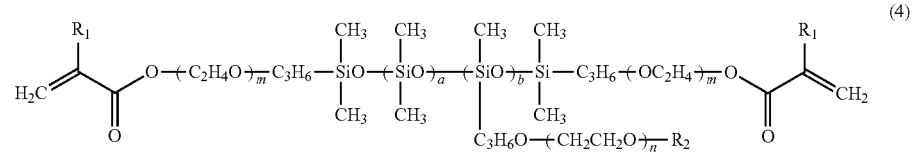

wherein R1 of formula (4) is selected from either hydrogen atom or a methyl group; R2 of formula (4) is selected from either hydrogen atom or a hydrocarbon group having 1 to 4 carbon atoms; m of formula (4) represents an integer of from 0 to 10; n of formula (4) represents an integer of from 4 to 100; a and b represent integers of 1 or more; a+b is equal to 20-500; b/(a+b) is equal to 0.01-0.22; and the configuration of siloxane units includes a random configuration.

In another example, the at least one siloxane monomer can comprise a monofunctional siloxane represented by formula (4):

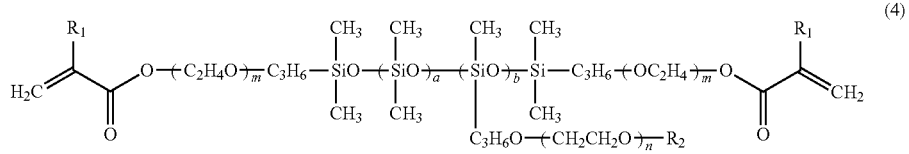

wherein m of formula (4) is 0, n of formula (4) is an integer from 5 to 15, a is an integer from 65 to 90, b is an integer from 1 to 10, $R^1$ of formula (4) is a methyl group, and $R^2$ of formula (4) is either a hydrogen atom or a hydrocarbon group having 1 to 4 carbon atoms; a and b represent integers of 1 or more; a+b is equal to 20-500; b/(a+b) is equal to 0.01-0.22; and the configuration of siloxane units includes a random configuration.

In yet another example, the at least one siloxane monomer can comprise a first siloxane monomer of formula (3) as described herein, and a second siloxane monomer of formula (4) as described herein.

Optionally, the ingredients of the polymerizable composition can further include at least one initiator, or at least one organic diluent, or at least one surfactant, or at least one tinting agent, or at least one UV absorber, or at least one oxygen scavenger, or at least one chain transfer agent, or any combination thereof.

The polymerizable composition of the present disclosure is reacted to form a polymeric lens body which is further processed to prepare a silicone hydrogel contact lens.

A batch of silicone hydrogel contact lenses can be prepared by preparing a plurality of silicone hydrogel contact lenses. In one example, the batch of silicone hydrogel contact lenses comprises a plurality of silicone hydrogel contact lenses formed from polymeric lens bodies that are the reaction product of a polymerizable composition, the polymerizable composition comprising (a) at least one siloxane monomer, and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

The batch of contact lenses can have lens properties making them acceptable for use as contact lenses. For example, the batch of silicone hydrogel contact lenses, when fully hydrated, have an average equilibrium water content (EWC) from about 30% wt/wt to about 70% wt/wt, or an average oxygen permeability of at least 55 barrers, or a tensile modulus from about 0.2 MPa to about 0.9 MPa, or any combination thereof, based on averages of values determined for at least 20 individual lenses of the batch.

The present disclosure is also directed to silicone hydrogel contact lens packages. The silicone hydrogel contact lens package can comprise a polymeric lens body that is the reaction product of a polymerizable composition, the polymerizable composition comprising (a) at least one siloxane monomer, and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; a packaging solution comprising a lens hydrating agent; and a contact lens package base member having a cavity configured to hold the contact lens body and the packaging solution, and a seal attached to the base member configured to maintain the silicone hydrogel contact lens and the packaging solution in a sterile condition for a duration of time equivalent to a room temperature shelf life of the contact lens.

The present disclosure is also directed to a method of manufacturing a silicone hydrogel contact lens. The method can comprise providing a polymerizable composition comprising (a) at least one siloxane monomer, and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and polymerizing the polymerizable composition to form a polymeric lens body which is then processed to form a silicone hydrogel contact lens. In one example, the polymerizing of the polymerizable composition can be conducted in a contact lens mold assembly to form a polymeric lens body. The method can further comprise a step of contacting the polymeric contact lens body with a washing liquid to remove extractable material from the polymeric contact lens body. The method can also further comprise a step of packaging the polymeric contact lens body in a contact lens packaging solution in a contact lens package.

In one example, the polymerizing step can comprise polymerizing the polymerizable composition in a contact lens mold assembly having a molding surface formed of a nonpolar thermoplastic polymer to form the polymeric lens body. Alternatively, the polymerizing step can comprise polymerizing the polymerizable composition in a contact lens mold assembly having a molding surface formed of a non-polar thermoplastic polymer to form the polymeric lens body.

In one example, the contacting step can comprise contacting the polymeric contact lens body with a washing liquid that is free of a volatile organic solvent. In another example, the contacting step can comprise contacting the polymeric contact lens body with a washing liquid comprising a volatile organic solvent. In yet another example, the method can be a method in which the polymeric lens body and the silicone hydrogel contact lens comprising the polymeric lens body are not contacted by a volatile organic solvent during the manufacturing process.

It is to be understood that both the foregoing general description and the following detailed description are exemplary and explanatory only and are intended to provide a further explanation of the present invention, as claimed.

DETAILED DESCRIPTION

As described herein, silicone hydrogel contact lenses formed from polymerizable compositions comprising (a) at least one siloxane monomer, and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight. The present hydrogel contact lenses comprise, or consist of, hydrated lens bodies comprising a polymeric component and a liquid component. The polymeric component comprises polymerized units of the at least one siloxane monomer, as well as polymerized units of the at least one hydrophobic ethylene glycol methyl ether methacrylate-containing monomer, or polymerized units of the at least one hydrophilic vinyl ether-containing monomer, or both polymerized units of the at least one hydrophobic ethylene glycol methyl ether methacrylate-containing monomer and polymerized units of the at least one hydrophilic vinyl ether-containing monomer.

One example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

One example of a method in accordance with the present disclosure is a method of manufacturing a silicone hydrogel contact lens, comprising: providing a polymerizable composition, said polymerizable composition comprising (a) at least one siloxane monomer; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

The at least one siloxane monomer can be understood to comprise a single siloxane monomer, or to comprise a siloxane monomer component composed of two or more siloxane monomers. It can therefore be understood that the polymeric component is the reaction product of a polymerizable composition comprising one or more siloxane monomers and can optionally include units of any additional polymerizable ingredients present in the polymerizable composition. The ingredients of the polymerizable composition can optionally further comprise additional monomers or macromers or pre-polymers or polymers, or combinations thereof. The additional monomers or macromers or pre-polymers or polymers, or combinations thereof, can be silicon-containing compounds or can be non-silicon compounds. As used herein, a non-silicon compound is understood to be a compound which does not have a silicon atom in its molecular structure. The optional additional ingredients of the polymerizable composition can be polymerizable ingredients or non-polymerizable ingredients. As used herein, a polymerizable ingredient is understood to be a compound which has a polymerizable double bond as part of its molecular structure. Thus, a non-polymerizable ingredient does not have a polymerizable double bond as part of its molecular structure.

One example of a silicone hydrogel contact lens in accordance with the present disclosure is a silicone hydrogel contact lens, comprising: a polymeric lens body that is the reaction product of a polymerizable composition, said polymerizable composition comprising (a) a first siloxane monomer; (b) a second siloxane monomer; and (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

One example of a method in accordance with the present disclosure is a method of manufacturing a silicone hydrogel contact lens, comprising: providing a polymerizable composition, said polymerizable composition comprising (a) a first siloxane monomer; (b) a second siloxane monomer; and (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition; it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

When present in the polymerizable composition, the at least one hydrophobic ethylene glycol methyl ether methacrylate-containing monomer and at least one hydrophilic vinyl ether-containing monomer of the polymerizable composition are understood to be silicon-free polymerizable ingredients.

A hydrophobic ethylene glycol methyl ether methacrylate-containing monomer is understood to be a hydrophobic monomer having at least one ethylene glycol functional group, and a methyl ether methacrylate functional group. A hydrophobic ethylene glycol methyl ether methacrylate-containing monomer is understood to be monofunctional in that it has only one polymerizable functional group as part of its molecular structure, specifically, a methacrylate polymerizable functional group. As used herein, the at least one hydrophobic ethylene glycol methyl ether methacrylate-containing monomer can be understood to comprise a single hydrophobic ethylene glycol methyl ether methacrylate-containing monomer, or to comprise a hydrophobic ethylene glycol methyl ether methacrylate-containing monomer component composed of two or more hydrophobic ethylene glycol methyl ether methacrylate-containing monomers.

Similarly, a hydrophilic vinyl ether-containing monomer is understood to be a monofunctional hydrophilic monomer as it has a single polymerizable functional group, specifically a vinyl ether polymerizable functional group, as part of its molecular structure. The at least one hydrophilic vinyl ether-containing monomer can be understood to comprise a single hydrophilic vinyl ether-containing monomer, or to comprise a hydrophilic vinyl ether-containing monomer component composed of two or more one hydrophilic vinyl ether-containing monomers.

Additionally, the polymerizable composition can optionally include at least one initiator, or at least one organic diluent, or at least one surfactant, or at least one oxygen scavenger, or at least one tinting agent, or at least one UV absorber, or at least one chain transfer agent, or any combination thereof. The optional at least one initiator, at least one organic diluent, at least one surfactant, at least one oxygen scavenger, at least one tinting agent, at least one UV absorber, or at least one oxygen scavenger, or at least one chain transfer agent are understood to be non-silicon ingredients, and can be either non-polymerizable ingredients or polymerizable ingredients (i.e., ingredients having a polymerizable functional group as part of their molecular structure).

The combination of the polymeric component and the liquid component are present as a hydrated lens body, which is suitable for placement on an eye of a person. The hydrated lens body has a generally convex anterior surface and a generally concave posterior surface, and has an equilibrium water content (EWC) greater than 10% weight by weight (wt/wt). Thus, the present contact lenses can be understood to be soft contact lenses, which as used herein, refers to contact lenses that, when fully hydrated, can be folded upon themselves without breaking.

As understood in the industry, a daily disposable contact lens is an unworn contact lens that is removed from its sealed, sterilized package (primary package) produced by a contact lens manufacturer, placed on a person's eye, and is removed and discarded after the person is done wearing the lens at the end of the day. Typically, the duration of lens wear for daily disposable contact lenses is from eight to fourteen hours, and they are then disposed of after wear. Daily disposable lenses are not cleaned or exposed to cleaning solutions prior to placement in the eye since they are sterile prior to opening the package. A daily disposable silicone hydrogel contact lens is a disposable silicone hydrogel contact lens that is replaced daily. In contrast, non-daily disposable contact lenses are disposable contact lenses that are replaced less frequently than daily (e.g., weekly, bi-weekly, or monthly). Non-daily disposable contact lenses are either removed from the eye and cleaned with a cleaning solution on a regular basis, or are worn continuously without removal from the eye. The present contact lenses can be either daily disposable contact lenses or non-daily disposable contact lenses. The present disclosure relates to polymerizable compositions comprising at least one siloxane monomer, and at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymeric lens bodies that are the reaction products of these polymerizable compositions; silicone hydrogel contact lenses comprising these polymeric lens bodies in hydrated form; packages comprising these silicone hydrogel contact lenses and a packaging solution in a sealed package; and methods of manufacturing these silicone hydrogel contact lenses.

The polymerizable compositions of the present disclosure comprise (a) at least one siloxane monomer, and (b) at least one hydrophobic ethylene glycol methyl ether methacrylate-containing monomer, or at least one hydrophilic vinyl ether-containing monomer, or both at least one hydrophobic ethylene glycol methyl ether methacrylate-containing monomer and at least one hydrophilic vinyl ether-containing monomer; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

In the development of silicone hydrogel contact lenses, numerous factors impact the acceptability of a lens material. On the one hand, it is desirable to have a lens material having a high water content and having ophthalmically acceptably wettable lens surfaces. However, silicone hydrogel lens formulations having high water contents are typically more difficult to manufacture, for example, as the high water content of the material may have a detrimental effect on the ability of the material to be dry demolded or dry delensed or both dry demolded and dry delensed. Similarly, the rate at which the material can absorb moisture may negatively affect the process-ability of the material.

As siloxane monomers tend to be hydrophobic, many of the development approaches used in the past have centered upon using high concentrations of hydrophilic monomers to increase the wettability. This approach often requires the presence of a diluent or "compatibilizer" to help make both the hydrophobic siloxane monomers and the hydrophilic monomers miscible in the polymerizable composition. The drawback with such an approach is that the diluent must be removed from the polymeric lens body before it is packaged.

It has been discovered that by including at least one hydrophobic ethylene glycol methyl ether methacrylate-containing monomer with at least one siloxane monomer in the polymerizable composition, it is possible to obtain silicone hydrogel contact lenses having advantageous properties, for example, ophthalmically acceptably wettable lens surfaces and water contents, and that these silicone hydrogel contact lenses can have properties allowing them to be easily and cost-effectively manufactured and to produce high batch yields. For example, silicone hydrogel contact lenses formed from polymerizable compositions comprising at least one hydrophobic ethylene glycol methyl ether methacrylate-containing monomer can have ophthalmically acceptably wettable lens surfaces when cast molded in non-polar materials without the need for plasma treatments. In another example, the polymeric lens bodies formed from the polymerizable compositions can be demolded using dry demolding methods (i.e., demolding methods not involving contacting the lens body or the mold assembly with a liquid). In another example, the polymeric lens bodies can be delensed using dry delensing methods (i.e., delensing methods not involving contacting the lens body or the mold section with a liquid). In another example, the polymeric lens bodies can be washed using washing liquid free of volatile organic solvents. In yet another example, the silicone hydrogel contact lens can be a lens which was not contacted by a volatile organic solvent during its manufacturing.

One example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; and (b) at least one hydrophobic ethylene glycol methyl ether methacrylate-containing monomer, wherein the at least one hydrophobic ethylene glycol methyl ether methacrylate-containing monomer is present in the polymerizable composition is present in an amount of from 1 to 20 unit parts by weight; and wherein lens surfaces of the silicone hydrogel contact lens are free of a plasma treatment.

One example of a method in accordance with the present disclosure is a method of manufacturing a silicone hydrogel contact lens, comprising: providing a polymerizable composition, said polymerizable composition comprising (a) at least one siloxane monomer; and (b) at least one hydrophobic ethylene glycol methyl ether methacrylate-containing monomer wherein the at least one hydrophobic ethylene glycol methyl ether methacrylate-containing monomer is present in the polymerizable composition in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package; and wherein lens surfaces of the silicone hydrogel contact lens are free of a plasma treatment.

Another example of a method in accordance with the present disclosure is a method of manufacturing a silicone hydrogel contact lens, comprising: providing a polymerizable composition, said polymerizable composition comprising (a) at least one siloxane monomer; and (b) at least one hydrophobic ethylene glycol methyl ether methacrylate-containing monomer; wherein the at least one hydrophobic ethylene glycol methyl ether methacrylate-containing monomer is present in the polymerizable composition in an amount of from 1 to 20 unit parts by weight; polymerizing the polymerizable composition in a contact lens mold assembly to form a polymeric contact lens body; demolding and delensing the polymeric lens body using a dry method; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one siloxane monomer; and (b) at least one hydrophobic ethylene glycol methyl ether methacrylate-containing monomer; wherein the at least one hydrophobic ethylene glycol methyl ether methacrylate-containing monomer is present in the polymerizable composition in an amount of from 1 to 20 unit parts by weight; polymerizing the polymerizable composition in a contact lens mold assembly to form a polymeric contact lens body; contacting the polymeric contact lens body with a washing liquid free of a volatile organic solvent to remove extractable material from the polymeric contact lens body; and packaging the polymeric contact lens body in a contact lens packaging solution in a contact lens package.

Yet another example of a method in accordance with the present disclosure is a method of manufacturing a silicone hydrogel contact lens, comprising: providing a polymerizable composition, said polymerizable composition comprising (a) at least one siloxane monomer; and (b) at least one hydrophobic ethylene glycol methyl ether methacrylate-containing monomer; wherein the at least one hydrophobic ethylene glycol methyl ether methacrylate-containing monomer is present in the polymerizable composition in an amount of from 1 to 20 unit parts by weight; polymerizing the polymerizable composition in a contact lens mold assembly to form a polymeric contact lens body; demolding and delensing the polymeric lens body using a dry method; contacting the polymeric contact lens body with a washing liquid to remove extractable material from the polymeric contact lens body; and packaging the polymeric contact lens body in a contact lens packaging solution in a contact lens package, wherein the silicone hydrogel contact lens is not contacted by a volatile organic solvent during its manufacturing process.

It has also been discovered that by including at least one hydrophilic vinyl ether-containing monomer with at least one siloxane monomer in the polymerizable composition, it is possible to obtain silicone hydrogel contact lenses having advantageous properties, for example, ophthalmically acceptably wettable lens surfaces and water contents, and that these silicone hydrogel contact lenses can have properties allowing them to be easily and cost-effectively manufactured and to produce high batch yields. For example, silicone hydrogel contact lenses formed from polymerizable compositions comprising at least one hydrophilic vinyl ether-containing monomer can have ophthalmically acceptably wettable lens surfaces when cast molded in non-polar materials without the need for plasma treatments. In another example, the polymeric lens bodies formed from the polymerizable compositions can be demolded using dry demolding methods. In another example, the polymeric lens bodies can be delensed using dry delensing methods. In another example, the polymeric lens bodies can be washed using washing liquid free of volatile organic solvents. In yet another example, the silicone hydrogel contact lens can be a lens which was not contacted by a volatile organic solvent during its manufacturing.

In one example of the present disclosure, the silicone hydrogel contact lenses formed from the polymerizable compositions disclosed herein have ophthalmically acceptably wettable lens surfaces. The silicone hydrogel contact lenses can have ophthalmically acceptably wettable lens surfaces when the lens surfaces are free of a plasma treatment. The silicone hydrogel contact lenses can have ophthalmically acceptably wettable surfaces when the polymerizable composition used to form the lenses is free of a wetting agent. The silicone hydrogel contact lenses, when formed from a polymerizable composition comprising at least one hydrophobic ethylene glycol methyl ether methacrylate-containing monomer, can have lens surfaces which are more wettable (e.g., as determined by a contact angle measurement) as compared to silicone hydrogel contact lenses formed from the same polymerizable composition but without the at least one hydrophobic ethylene glycol methyl ether methacrylate-containing monomer, and formed by the same manufacturing process. The silicone hydrogel contact lenses, when formed from a polymerizable composition comprising at least one hydrophilic vinyl ether-containing monomer, can have lens surfaces which are more wettable (e.g., as determined by a contact angle measurement) as compared to silicone hydrogel contact lenses formed from the same polymerizable composition but without the at least one hydrophilic vinyl ether-containing monomer, and formed by the same manufacturing process. The silicone hydrogel contact lenses, when formed from a polymerizable composition comprising at least one hydrophilic vinyl ether-containing monomer and at least one hydrophilic vinyl ether-containing monomer, can have lens surfaces which are more wettable (e.g., as determined by a contact angle measurement) as compared to silicone hydrogel contact lenses formed from the same polymerizable composition but without the at least one hydrophilic vinyl ether-containing monomer and without the at least one hydrophilic vinyl ether-containing monomer, and formed by the same manufacturing process.

One example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; and (b) at least one hydrophilic vinyl ether-containing monomer; wherein the at least one hydrophilic vinyl ether-containing monomer is present in the polymerizable composition in an amount of from 1 to 20 unit parts by weight; and wherein lens surfaces of the silicone hydrogel contact lens are free of a plasma treatment.

Another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; and (b) at least one hydrophilic vinyl ether-containing monomer; wherein the at least one hydrophilic vinyl ether-containing monomer is present in the polymerizable composition in an amount of from 1 to 20 unit parts by weight; wherein the polymerizable composition is free of a pre-formed polymeric wetting agent.

Yet another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; (b) at least one hydrophilic vinyl ether-containing monomer; wherein the at least one hydrophilic vinyl ether-containing monomer is present in the polymerizable composition in an amount of from 1 to 20 unit parts by weight; wherein a contact angle of a surface of the silicone hydrogel contact lens is lower than a contact angle of a surface of a silicone hydrogel contact lens formed from a polymerizable composition containing the same ingredients except without the hydrophilic vinyl ether-containing monomer, and formed using the same manufacturing process.

One example of a method in accordance with the present disclosure is a method of manufacturing a silicone hydrogel contact lens, comprising: providing a polymerizable composition, said polymerizable composition comprising (a) at least one siloxane monomer; and (b) at least one hydrophilic vinyl ether-containing monomer; wherein the at least one hydrophilic vinyl ether-containing monomer is present in the polymerizable composition in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package; and wherein lens surfaces of the silicone hydrogel contact lens are free of a plasma treatment.

Another example of a method in accordance with the present disclosure is a method of manufacturing a silicone hydrogel contact lens, comprising: providing a polymerizable composition, said polymerizable composition comprising (a) at least one siloxane monomer; and (b) at least one hydrophilic vinyl ether-containing monomer; wherein the at least one hydrophilic vinyl ether-containing monomer is present in the polymerizable composition in an amount of from 1 to 20 unit parts by weight; polymerizing the polymerizable composition in a contact lens mold assembly to form a polymeric contact lens body; demolding and delensing the polymeric lens body using a dry method; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one siloxane monomer; and (b) at least one hydrophilic vinyl ether-containing monomer; wherein the at least one hydrophilic vinyl ether-containing monomer is present in the polymerizable composition in an amount of from 1 to 20 unit parts by weight; polymerizing the polymerizable composition in a contact lens mold assembly to form a polymeric contact lens body; contacting the polymeric contact lens body with a washing liquid free of a volatile organic solvent to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one siloxane monomer; and (b) at least one hydrophilic vinyl ether-containing monomer; wherein the at least one hydrophilic vinyl ether-containing monomer is present in the polymerizable composition in an amount of from 1 to 20 unit parts by weight; polymerizing the polymerizable composition in a contact lens mold assembly to form a polymeric contact lens body; demolding and delensing the polymeric lens body using a dry method; contacting the polymeric contact lens body with a washing liquid to remove extractable material from the polymeric contact lens body; and packaging the polymeric contact lens body in a contact lens packaging solution in a contact lens package, wherein the silicone hydrogel contact lens is not contacted by a volatile organic solvent during its manufacturing process.

Another example of a method in accordance with the present disclosure is a method of manufacturing a silicone hydrogel contact lens, comprising: providing a polymerizable composition, said polymerizable composition comprising (a) at least one siloxane monomer; and (b) at least one hydrophilic vinyl ether-containing monomer; wherein the at least one hydrophilic vinyl ether-containing monomer is present in the polymerizable composition in an amount of from 1 to 20 unit parts by weight; wherein the polymerizable composition is free of a pre-formed polymeric wetting agent; polymerizing the polymerizable composition in a contact lens mold assembly to form a polymeric contact lens body; demolding and delensing the polymeric lens body using a dry method; contacting the polymeric contact lens body with a washing liquid to remove extractable material from the polymeric contact lens body; and packaging the polymeric contact lens body in a contact lens packaging solution in a contact lens package.

Yet another example of a method in accordance with the present disclosure is a method of increasing the wettability of a silicone hydrogel contact lens, comprising: providing a polymerizable composition, said polymerizable composition comprising (a) at least one siloxane monomer; and (b) at least one hydrophilic vinyl ether-containing monomer; wherein the at least one hydrophilic vinyl ether-containing monomer is present in the polymerizable composition in an amount of from 1 to 20 unit parts by weight; polymerizing the polymerizable composition in a contact lens mold assembly to form a polymeric contact lens body; demolding and delensing the polymeric lens body using a dry method; contacting the polymeric contact lens body with a washing liquid to remove extractable material from the polymeric contact lens body; and packaging the polymeric contact lens body in a contact lens packaging solution in a contact lens package; wherein a contact angle of a surface of the silicone hydrogel contact lens is lower than a contact angle of a surface of a silicone hydrogel contact lens formed from a polymerizable composition containing the same ingredients except without the hydrophilic vinyl ether-containing monomer, and formed using the same manufacturing process.

In another example of the present disclosure, the batch of silicone hydrogel contact lenses have a commercially acceptable yield, such as, for example, greater than 65%, or greater than 75%, or more. The batch of silicone hydrogel contact lenses can be demolded using a dry demolding process. The batch of silicone hydrogel contact lenses can be delensed using a dry delensing process. The batch of silicone hydrogel contact lenses can be demolded using a dry demolding process and delensed using a dry delensing process. The batch of silicone hydrogel contact lenses, when formed from a polymerizable composition comprising at least one hydrophobic ethylene glycol methyl ether methacrylate-containing monomer, can have a higher yield as compared to silicone hydrogel contact lenses formed from the same polymerizable composition but without the at least one hydrophobic ethylene glycol methyl ether methacrylate-containing monomer, and formed by the same manufacturing process. The batch of silicone hydrogel contact lenses, when formed from a polymerizable composition comprising at least one hydrophilic vinyl ether-containing monomer, can have a higher yield as compared to silicone hydrogel contact lenses formed from the same polymerizable composition but without the at least one hydrophilic vinyl ether-containing monomer, and formed by the same manufacturing process. The silicone hydrogel contact lenses, when formed from a polymerizable composition comprising at least one hydrophobic ethylene glycol methyl ether methacrylate-containing monomer and at least one hydrophilic vinyl ether-containing monomer, can have a higher yield as compared to silicone hydrogel contact lenses formed from the same polymerizable composition but without the at least one hydrophobic ethylene glycol methyl ether methacrylate-containing monomer and without the at least one hydrophilic vinyl ether-containing monomer, and formed by the same manufacturing process.

One example of a method in accordance with the present disclosure is a method of manufacturing a batch of silicone hydrogel contact lens, comprising: providing a polymerizable composition, said polymerizable composition comprising (a) at least one siloxane monomer; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a plurality of polymeric contact lens bodies; contacting the polymeric contact lens bodies with a washing liquid to remove extractable material from the polymeric contact lens bodies; and packaging the polymeric contact lens bodies singly in a contact lens packaging solution in a single contact lens package; wherein the batch of silicone hydrogel contact lenses have a higher yield as compared to silicone hydrogel contact lenses formed from the same polymerizable composition but without the at least one hydrophilic vinyl ether-containing monomer, or at least one hydrophilic vinyl ether-containing monomer, or both, and which are formed by the same manufacturing process.

Another example of a method in accordance with the present disclosure is a method of manufacturing a batch of silicone hydrogel contact lens, comprising: providing a polymerizable composition, said polymerizable composition comprising (a) at least one siloxane monomer; and (b) at least one hydrophobic ethylene glycol methyl ether methacrylate-containing monomer; wherein the at least one hydrophobic ethylene glycol methyl ether methacrylate-containing monomer is present in the polymerizable composition in an amount of from 1 to 20 unit parts by weight; polymerizing the polymerizable composition in a contact lens mold assembly to form a plurality of polymeric contact lens bodies; contacting the polymeric contact lens bodies with a washing liquid to remove extractable material from the polymeric contact lens bodies; and packaging the polymeric contact lens bodies singly in a contact lens packaging solution in a single contact lens package; wherein the batch of silicone hydrogel contact lenses have a higher yield as compared to silicone hydrogel contact lenses formed from the same polymerizable composition but without the at least one hydrophilic vinyl ether-containing monomer, and which are formed by the same manufacturing process.

Yet another example of a method in accordance with the present disclosure is a method of manufacturing a batch of silicone hydrogel contact lens, comprising: providing a polymerizable composition, said polymerizable composition comprising (a) at least one siloxane monomer; and (b) at least one hydrophilic vinyl ether-containing monomer; wherein the at least one hydrophilic vinyl ether-containing monomer is present in the polymerizable composition in an amount of from 1 to 20 unit parts by weight; polymerizing the polymerizable composition in a contact lens mold assembly to form a plurality of polymeric contact lens bodies; contacting the polymeric contact lens bodies with a washing liquid to remove extractable material from the polymeric contact lens bodies; and packaging the polymeric contact lens bodies singly in a contact lens packaging solution in a single contact lens package; wherein the batch of silicone hydrogel contact lenses have a higher yield as compared to silicone hydrogel contact lenses formed from the same polymerizable composition but without the at least one hydrophilic vinyl ether-containing monomer, and which are formed by the same manufacturing process.

The hydrophilicity or hydrophobicity of a monomer (including silicon-containing and non-silicon monomers) can be determined using conventional techniques, such as, for example, based on the monomer's aqueous solubility. For purposes of the present disclosure, a hydrophilic monomer is a monomer that is visibly soluble in an aqueous solution at room temperature (e.g. about 20-25 degrees C.). For example, a hydrophilic monomer can be understood to be any monomer for which 50 grams or more of the monomer are visibly fully soluble in 1 liter of water at 20 degrees C. (i.e., the monomer is soluble at a level of at least 5% wt/wt in water) as determined using a standard shake flask method as known to persons of ordinary skill in the art. A hydrophobic monomer, as used herein, is a monomer that is visibly insoluble in an aqueous solution at room temperature, such that separate, visually identifiable phases are present in the aqueous solution, or such that the aqueous solution appears cloudy and separates into two distinct phases over time after sitting at room temperature. For example, a hydrophobic monomer can be understood to be any monomer for which 50 grams of the monomer are not visibly fully soluble in 1 liter of water at 20 degrees C. (i.e., the monomer is soluble at a level of less than 5% wt/wt in water).

In one example of a polymerizable composition in accordance with the present disclosure, the at least one hydrophobic ethylene glycol methyl ether methacrylate-containing monomer is present in the polymerizable composition. The at least one hydrophobic ethylene glycol methyl ether methacrylate-containing monomer can be a hydrophobic ethylene glycol methyl ether methacrylate-containing monomer which is less hydrophobic than methyl methacrylate (MMA). The at least one hydrophobic ethylene glycol methyl ether methacrylate-containing monomer can comprise or consist of ethylene glycol methyl ether methacrylate (EGMA), or di(ethylene glycol)methyl ether methacrylate, or tri(ethylene glycol)methyl ether methacrylate, or a poly(ethylene glycol) methyl ether methacrylate having from 4 to 10 ethylene glycol units, or a poly(ethylene glycol)methyl ether methacrylate having more than 10 ethylene glycol units, or any combination thereof. The at least one hydrophobic ethylene glycol methyl ether methacrylate-containing monomer can comprise or consist of ethylene glycol methyl ether methacrylate (EGMA). The at least one hydrophobic ethylene glycol methyl ether methacrylate-containing monomer can be present in the polymerizable composition in an amount from about 1 to about 20 unit parts by weight.

One example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; and (b) ethylene glycol methyl ether methacrylate (EGMA); wherein the ethylene glycol methyl ether methacrylate (EGMA) is present in the polymerizable composition is present in an amount of from 1 to 20 unit parts by weight.

One example of a method in accordance with the present disclosure is a method of manufacturing a silicone hydrogel contact lens, comprising: providing a polymerizable composition, said polymerizable composition comprising (a) at least one siloxane monomer; and (b) ethylene glycol methyl ether methacrylate (EGMA); wherein the ethylene glycol methyl ether methacrylate (EGMA) is present in the polymerizable composition is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

In another example, the polymerizable composition can further comprise at least one hydrophobic monomer which is not an ethylene glycol methyl ether methacrylate-containing monomer. The hydrophobic monomer which is not an ethylene glycol methyl ether methacrylate-containing monomer is understood to be a non-silicone polymerizable ingredient having only one polymerizable functional group present in its molecular structure. The at least one hydrophobic monomer which is not an ethylene glycol methyl ether methacrylate-containing monomer can be one hydrophobic monomer, or can comprise a hydrophobic monomer component composed of at least two hydrophobic monomers each of which is not an ethylene glycol methyl ether methacrylate-containing monomer. Examples of hydrophobic monomers which are not an ethylene glycol methyl ether methacrylate-containing monomers that can be used in the polymerizable compositions disclosed herein, include, without limitation, acrylate-containing hydrophobic monomers, or methacrylate-containing hydrophobic monomers, or any combination thereof. Examples of hydrophobic monomers include, without limitation, methyl acrylate, or ethyl acrylate, or propyl acrylate, or isopropyl acrylate, or cyclohexyl acrylate, or 2-ethylhexyl acrylate, or methyl methacrylate (MMA), or ethyl methacrylate, or propyl methacrylate, or butyl acrylate, or vinyl acetate, or vinyl propionate, or vinyl butyrate, or vinyl valerate, or styrene, or chloroprene, or vinyl chloride, or vinylidene chloride, or acrylonitrile, or 1-butene, or butadiene, or methacrylonitrile, or vinyltoluene, or vinyl ethyl ether, or perfluorohexylethylthiocarbonylaminoethyl methacrylate, or isobornyl methacrylate, or trifluoroethyl methacrylate, or hexafluoroisopropyl methacrylate, or hexafluorobutyl methacrylate, or any combination thereof. In one particular example, the hydrophobic monomer which is not an ethylene glycol methyl ether methacrylate-containing monomer or monomer component can comprise or consist of MMA. When present in the polymerizable composition, the hydrophobic monomer which is not an ethylene glycol methyl ether methacrylate-containing monomer or monomer component can be present in an amount from about 5 to about 25 unit parts, or from about 10 to about 20 unit parts.

One example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one hydrophobic monomer which is not an ethylene glycol methyl ether methacrylate-containing monomer present in an amount of from 5 to 25 unit parts by weight.

Another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; (b) at least one hydrophobic ethylene glycol methyl ether methacrylate-containing monomer, wherein, when the at least one hydrophobic ethylene glycol methyl ether methacrylate-containing monomer is present in the polymerizable composition in an amount of from 1 to 20 unit parts by weight; and (c) at least one hydrophobic monomer which is not an ethylene glycol methyl ether methacrylate-containing monomer present in an amount of from 5 to 25 unit parts by weight.

Yet another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; (b) at least one hydrophobic ethylene glycol methyl ether methacrylate-containing monomer, wherein the at least one hydrophobic ethylene glycol methyl ether methacrylate-containing monomer is present in the polymerizable composition in an amount of from 1 to 20 unit parts by weight; and (c) methyl methacrylate (MMA) present in an amount of from 5 to 25 unit parts by weight.

One example of a method in accordance with the present disclosure is a method of manufacturing a silicone hydrogel contact lens, comprising: providing a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one hydrophobic monomer which is not an ethylene glycol methyl ether methacrylate-containing monomer present in an amount of from 5 to 25 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one siloxane monomer; (b) at least one hydrophobic ethylene glycol methyl ether methacrylate-containing monomer, wherein the at least one hydrophobic ethylene glycol methyl ether methacrylate-containing monomer is present in the polymerizable composition in an amount of from 1 to 20 unit parts by weight; and (c) at least one hydrophobic monomer which is not an ethylene glycol methyl ether methacrylate-containing monomer present in an amount of from 5 to 25 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Yet another example of a method in accordance with the present disclosure is a method of manufacturing a silicone hydrogel contact lens, comprising: providing a polymerizable composition, said polymerizable composition comprising (a) at least one siloxane monomer; (b) at least one hydrophobic ethylene glycol methyl ether methacrylate-containing monomer, wherein the at least one hydrophobic ethylene glycol methyl ether methacrylate-containing monomer is present in the polymerizable composition in an amount of from 1 to 20 unit parts by weight; and (c) methyl methacrylate (MMA) present in an amount of from 5 to 25 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Optionally, the polymerizable composition can comprise at least one hydrophobic ethylene glycol methyl ether methacrylate-containing monomer, and at least one hydrophobic monomer which is not an ethylene glycol methyl ether methacrylate-containing monomer. For example, the at least one hydrophobic ethylene glycol methyl ether methacrylate-containing monomer can comprise or consist of EGMA, and the at least one hydrophobic monomer which is not an ethylene glycol methyl ether methacrylate-containing monomer can comprise or consist of MMA. The ratio of the unit parts of the at least one hydrophobic monomer which is not an ethylene glycol methyl ether methacrylate-containing monomer to the unit parts of the at least one hydrophobic ethylene glycol methyl ether methacrylate-containing monomer present in the polymerizable composition can be from about 6:1 to about 1:1, or can be about 2:1.

One example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; (b) ethylene glycol methyl ether methacrylate (EGMA), present in the polymerizable composition in an amount of from 1 to 20 unit parts by weight; and (c) methyl methacrylate (MMA) present in an amount of from 5 to 25 unit parts by weight.

Another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; (b) ethylene glycol methyl ether methacrylate (EGMA), present in the polymerizable composition in an amount of from 1 to 20 unit parts by weight; and (c) methyl methacrylate (MMA) present in an amount of from 5 to 25 unit parts by weight, wherein a ratio of unit parts by weight of MMA to unit parts by weight of EGMA present in the polymerizable composition is from about 6:1 to about 1:1.

One example of a method in accordance with the present disclosure is a method of manufacturing a silicone hydrogel contact lens, comprising: providing a polymerizable composition, said polymerizable composition comprising (a) at least one siloxane monomer; (b) ethylene glycol methyl ether methacrylate (EGMA) present in the polymerizable composition in an amount of from 1 to 20 unit parts by weight; and (c) methyl methacrylate (MMA) present in an amount of from 5 to 25 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one siloxane monomer; (b) ethylene glycol methyl ether methacrylate (EGMA) present in the polymerizable composition in an amount of from 1 to 20 unit parts by weight; and (c) methyl methacrylate (MMA) present in an amount of from 5 to 25 unit parts by weight; wherein a ratio of unit parts by weight of MMA to unit parts by weight of EGMA present in the polymerizable composition is from about 6:1 to about 1:1 polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

In yet another example, the polymerizable composition can comprise the at least one hydrophilic vinyl ether-containing monomer. The at least one hydrophilic vinyl ether-containing monomer can comprise or consist of 1,4-butanediol vinyl ether (BVE), or ethylene glycol vinyl ether (EGVE), or di(ethylene glycol) vinyl ether (DEGVE), or tri(ethylene glycol) vinyl ether, or a poly(ethylene glycol) vinyl ether having from 4 to 10 ethylene glycol units, or a poly(ethylene glycol) vinyl ether having more than 10 ethylene glycol units, or any combination thereof. In one example, the hydrophilic monomer component comprises or consists of BVE. In another example, the hydrophilic monomer component comprises or consists of EGVE. In yet another example, the hydrophilic vinyl component comprises or consists of DEGVE. The at least one hydrophilic vinyl ether-containing monomer can comprise or consist of a hydrophilic vinyl ether-containing monomer component consisting of BVE in combination with EGVE, or BVE in combination with DEGVE, or BVE in combination with both EGVE and DEGVE. The at least one hydrophilic vinyl ether-containing monomer can be present in the polymerizable composition in an amount from about 1 to about 20 unit parts by weight. In another example, the least one hydrophilic vinyl ether-containing monomer can be present in the polymerizable composition from 1 to 15 unit parts, or from 2 to 10 unit parts, or from 3 to 7 unit parts.

One example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; and (b) at least one hydrophobic ethylene glycol methyl ether methacrylate-containing monomer, or at least one hydrophilic vinyl ether-containing monomer component consisting of 1,4-butanediol vinyl ether (BVE), or of BVE in combination with ethylene glycol vinyl ether (EGVE), or of BVE in combination with di(ethylene glycol) vinyl ether (DEGVE), or of BVE in combination with both EGVE and DEGVE, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer component is present in the polymerizable composition, it is present in an amount of from 1 to 20 unit parts by weight.

Another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; and (b) at least one hydrophilic vinyl ether-containing monomer component consisting of 1,4-butanediol vinyl ether (BVE), or of BVE in combination with ethylene glycol vinyl ether (EGVE), or of BVE in combination with di(ethylene glycol) vinyl ether (DEGVE), or of BVE in combination with both EGVE and DEGVE, or both; wherein the at least one hydrophilic vinyl ether-containing monomer component is present in the polymerizable composition in an amount of from 1 to 20 unit parts by weight.

One example of a method in accordance with the present disclosure is a method of manufacturing a silicone hydrogel contact lens, comprising: providing a polymerizable composition, said polymerizable composition comprising (a) at least one siloxane monomer; and (b) at least one hydrophobic ethylene glycol methyl ether methacrylate-containing monomer, or at least one hydrophilic vinyl ether-containing monomer component consisting of 1,4-butanediol vinyl ether (BVE), or of BVE in combination with ethylene glycol vinyl ether (EGVE), or of BVE in combination with di(ethylene glycol) vinyl ether (DEGVE), or of BVE in combination with both EGVE and DEGVE, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer component is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

One example of a method in accordance with the present disclosure is a method of manufacturing a silicone hydrogel contact lens, comprising: providing a polymerizable composition, said polymerizable composition comprising (a) at least one siloxane monomer; and (b) at least one hydrophilic vinyl ether-containing monomer component consisting of 1,4-butanediol vinyl ether (BVE), or of BVE in combination with ethylene glycol vinyl ether (EGVE), or of BVE in combination with di(ethylene glycol) vinyl ether (DEGVE), or of BVE in combination with both EGVE and DEGVE, or both; wherein the at least one hydrophilic vinyl ether-containing monomer component is present in the polymerizable composition in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

The polymerizable composition of the present disclosure can optionally further comprise at least one hydrophilic monomer which is not a vinyl ether-containing monomer (i.e., a hydrophilic non-vinyl ether-containing monomer). The hydrophilic monomer which is not a vinyl ether-containing monomer is understood to be a non-silicone polymerizable ingredient having only one polymerizable functional group present in its molecular structure. The at least one hydrophilic monomer which is not a vinyl ether-containing monomer can be understood to comprise a single hydrophilic monomer which is not a vinyl ether-containing monomer, or to comprise a hydrophilic monomer component composed of two or more hydrophilic monomers none of which is a vinyl ether-containing monomer. As used herein, the hydrophilic monomer which is not a vinyl ether-containing monomer is understood to be a non-silicon hydrophilic monomer, and thus is different from a siloxane monomer.

Examples of hydrophilic monomers which are not vinyl ether-containing monomers which can be included in the present polymerizable compositions can include, for example, N,N-dimethylacrylamide (DMA), or 2-hydroxyethyl acrylate, or 2-hydroxyethyl methacrylate (HEMA), or 2-hydroxypropyl methacrylate, or 2-hydroxybutyl methacrylate (HOB), or 2-hydroxybutyl acrylate, or 4-hydroxybutyl acrylate glycerol methacrylate, or 2-hydroxyethyl methacrylamide, or polyethyleneglycol monomethacrylate, or methacrylic acid, or acrylic acid, or any combination thereof.

In one example, the hydrophilic monomer or monomer component which is not a vinyl ether-containing monomer can comprise or consist of a vinyl-containing monomer which is not a vinyl ether monomer (i.e., a hydrophilic monomer having a vinyl polymerizable functional group which is not a vinyl ether polymerizable functional group). Examples of hydrophilic vinyl-containing monomers which are not vinyl ether-containing monomers which can be provided in the polymerizable compositions include, without limitation, N-vinyl formamide, or N-vinyl acetamide, or N-vinyl-N-ethyl acetamide, or N-vinyl isopropylamide, or N-vinyl-N-methyl acetamide (VMA), or N-vinyl pyrrolidone (NVP), or N-vinyl caprolactam, or N-vinyl-N-ethyl formamide, or N-vinyl formamide, or N-2-hydroxyethyl vinyl carbamate, or N-carboxy-β-alanine N-vinyl ester, or any combination thereof.

In another example, the hydrophilic monomer or monomer component which is not a vinyl ether-containing monomer can comprise or consist of a hydrophilic amide-containing monomer. The hydrophilic amide monomer can be a hydrophilic amide monomer having one N-vinyl group, such as, for example, N-vinyl formamide, or N-vinyl acetamide, or N-vinyl-N-ethyl acetamide, or N-vinyl isopropylamide, or N-vinyl-N-methyl acetamide (VMA), or N-vinyl pyrrolidone (NVP), or N-vinyl caprolactam, or any combination thereof. In one example, the hydrophilic monomer or hydrophilic monomer component comprises N-vinyl-N-methyl acetamide (VMA), or N-vinyl pyrrolidone (NVP), or both. In another example, the hydrophilic monomer or hydrophilic monomer component comprises N-vinyl-N-methyl acetamide (VMA). For example, the hydrophilic monomer or monomer component can comprise or consist of VMA. In one particular example, the hydrophilic monomer can be VMA. The at least one hydrophilic amide-containing monomer can be present in the polymerizable composition in an amount from about 10 to about 60 unit parts by weight.

One example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one hydrophilic vinyl-containing monomer.

Another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one hydrophilic amide monomer having one N-vinyl group.

Another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one hydrophilic amide monomer having one N-vinyl group present in an amount of from 10 to 60 unit parts by weight.

Another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) N-vinyl-N-methyl acetamide (VMA), or N-vinyl pyrrolidone (NVP), or both.

One example of a method in accordance with the present disclosure is a method of manufacturing a silicone hydrogel contact lens, comprising: providing a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one hydrophilic vinyl-containing monomer; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

One example of a method in accordance with the present disclosure is a method of manufacturing a silicone hydrogel contact lens, comprising: providing a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one hydrophilic vinyl-containing monomer; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one hydrophilic amide monomer having one N-vinyl group; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one hydrophilic amide monomer having one N-vinyl group present in an amount of from 10 to 60 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Yet another example of a method in accordance with the present disclosure is a method of manufacturing a silicone hydrogel contact lens, comprising: providing a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) N-vinyl-N-methyl acetamide (VMA), or N-vinyl pyrrolidone (NVP), or both; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

In another example, the hydrophilic monomer which is not a vinyl ether-containing monomer can comprise or consist of a monomer can have any molecular weight, such as a molecular weight less than 400 daltons, or less than 300 daltons, or less than 250 daltons, or less than 200 daltons, or less than 150 daltons, or from about 75 to about 200 daltons.

When a hydrophilic monomer which is not a vinyl ether-containing monomer is present in the polymerizable composition, the hydrophilic monomer which is not a vinyl ether-containing monomer can be present in the polymerizable composition in an amount from 30 to 60 unit parts of the polymerizable composition. The hydrophilic monomer which is not a vinyl ether-containing monomer can be present in the polymerizable composition from 40 to 55 unit parts, or from 45 to 50 unit parts by weight.

As used herein, a vinyl-containing monomer is a monomer having a single polymerizable carbon-carbon double bond (i.e., a vinyl polymerizable functional group) present in its molecular structure, where, under free radical polymerization, the carbon-carbon double bond in the vinyl polymerizable functional group is less reactive than the carbon-carbon double bond present in an acrylate or a methacrylate polymerizable functional group. In other words, although a carbon-carbon double bond is present in acrylate groups and methacrylate groups, as understood herein, monomers comprising a single acrylate or methacrylate polymerizable group are not considered to be vinyl-containing monomers. Examples of polymerizable groups having carbon-carbon double bonds which are less reactive than the carbon-carbon double bonds of acrylate or methacrylate polymerizable groups include vinyl amide, vinyl ester, and allyl ester polymerizable groups. Thus, as used herein, examples of vinyl-containing monomers include monomers having a single vinyl amide, a single vinyl ester, or a single allyl ester polymerizable group.

In yet another example, the hydrophilic monomer which is not a vinyl ether-containing monomer can comprise or consist of a monomer component. The hydrophilic monomer which is not a vinyl ether-containing monomer component can be composed of a first hydrophilic monomer and a second hydrophilic monomer, where neither the first hydrophilic monomer nor the second hydrophilic monomer is a vinyl ether-containing monomer. In one example, the first hydrophilic monomer can have a different polymerizable functional group than the second hydrophilic monomer. For example, when the first hydrophilic monomer or monomer component comprises or consists of an amide-containing monomer, the second hydrophilic monomer can comprise or consist of a non-amide monomer (i.e., a monomer not having an amide functional group as part of its molecular structure). As another example, when the first hydrophilic monomer comprises or consists of a vinyl-containing monomer, the second hydrophilic monomer can comprise or consist of a non-vinyl monomer (i.e., a monomer not having a vinyl polymerizable functional group as part of its molecular structure). In another example, when the first hydrophilic monomer comprises or consists of an amide monomer having an N-vinyl group, the second hydrophilic monomer can comprise or consist of a non-amide monomer. When the first hydrophilic monomer comprises or consists of a non-acrylate monomer (i.e., a monomer not having an acrylate or methacrylate polymerizable functional group as part of its molecular structure), the second hydrophilic monomer can comprise or consist of an acrylate-containing monomer, or a methacrylate-containing monomer.

Optionally, the polymerizable composition can further comprise at least one cross-linking agent. In accordance with the present disclosure, a cross-linking agent is understood to be a monomer having more than one polymerizable functional group as part of its molecular structure, such as two or three or four polymerizable functional groups, i.e., a multifunctional monomer such as a bifunctional or trifunctional or tetrafunctional monomer.

Non-silicon cross-linking agents that can be used in the polymerizable compositions disclosed herein include, for example, without limitation, allyl(meth)acrylate, or lower alkylene glycol di(meth)acrylate, or poly(lower alkylene)glycol di(meth)acrylate, or lower alkylene di(meth)acrylate, or divinyl ether, or divinyl sulfone, or di- and trivinylbenzene, or trimethylolpropane tri(meth)acrylate, or pentaerythritol tetra(meth)acrylate, or bisphenol A di(meth)acrylate, or methylenebis(meth)acrylamide, or triallyl phthalate and diallyl phthalate, or any combination thereof. Cross-linking agents, as disclosed in some of the formulations of Examples 1-28, include, for example, ethylene glycol dimethacrylate (EGDMA), or triethylene glycol dimethacrylate (TEGDMA), or triethylene glycol divinyl ether (TEGDVE), or any combination thereof. In one example, the cross-linking agent can have a molecular weight less than 1500 daltons, or less than 1000 daltons, or less than 500 daltons, or less than 200 daltons.

In one example, the cross-linking agent or cross-linking agent component can comprise or consist of a vinyl-containing cross-linking agent. As used herein, a vinyl-containing cross-linking agent is a monomer having at least two polymerizable carbon-carbon double bonds (i.e., at least two vinyl polymerizable functional groups) present in its molecular structure, where each of the at least two polymerizable carbon-carbon double bonds present in the vinyl polymerizable functional groups of the vinyl-containing cross-linking agent is less reactive than a carbon-carbon double bond present in an acrylate or methacrylate polymerizable functional group. Although carbon-carbon double bonds are present in acrylate and methacrylate polymerizable functional groups, as understood herein, cross-linking agents comprising one or more acrylate or methacrylate polymerizable group (e.g., an acrylate-containing cross-linking agent or a methacrylate-containing cross-linking agent) are not considered to be vinyl-containing cross-linking agents. Polymerizable functional groups having carbon-carbon double bonds which are less reactive than the carbon-carbon double bonds of acrylate or methacrylate polymerizable groups include, for example, vinyl amide, vinyl ester, vinyl ether and allyl ester polymerizable functional groups. Thus, as used herein, vinyl-containing cross-linking agents include, for example, cross-linking agents having at least two polymerizable functional groups selected from a vinyl amide, a vinyl ether, a vinyl ester, an allyl ester, and any combination thereof. As used herein, a mixed vinyl-containing cross-linking agent is a cross-linking agent having at least one polymerizable carbon-carbon double bond (i.e., at least one vinyl polymerizable functional group) present in its structure which is less reactive than the carbon-carbon double bond present in an acrylate or methacrylate polymerizable functional group, and at least one polymerizable functional group present in its structure having a carbon-carbon double bond which is at least as reactive as the carbon-carbon double bond in an acrylate or methacrylate polymerizable functional group.

One example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one vinyl-containing cross-linking agent.

Another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; (c) at least one hydrophilic amide monomer having one N-vinyl group; and (d) at least one vinyl-containing cross-linking agent.

One example of a method in accordance with the present disclosure is a method of manufacturing a silicone hydrogel contact lens, comprising: providing a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one vinyl-containing cross-linking agent; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; (c) at least one hydrophilic amide monomer having one N-vinyl group; and (d) at least one vinyl-containing cross-linking agent; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

When present in the polymerizable composition, the vinyl-containing cross-linking agent or cross-linking agent component can be present in an amount from about 0.01 unit parts to from about 2.0 unit parts, or from about 0.01 unit parts to about 0.80 unit parts, or from about 0.01 unit parts to about 0.30 unit parts, or from about 0.05 unit parts to about 0.20 unit parts, or in an amount of about 0.1 unit parts.

In one example, the cross-linking agent or cross-linking agent component can comprise or consist of a non-vinyl-containing cross-linking agent, i.e., a cross-linking agent which is not a vinyl-containing cross-linking agent. For example, the non-vinyl-containing cross-linking agent or cross-linking agent component can comprise or consist of an acrylate-containing cross-linking agent (i.e., a cross-linking agent having at least two acrylate polymerizable functional groups), or a methacrylate-containing cross-linking agent (i.e., at least two methacrylate polymerizable functional groups), or at least one acrylate-containing cross-linking agent and at least one methacrylate-containing cross-linking agent.

One example of a silicone hydro gel contact lens in accordance with the present disclosure is a silicone hydrogel contact lens, comprising: a polymeric lens body that is the reaction product of a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one acrylate or methacrylate-containing cross-linking agent.

Another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer having an acrylate or methacrylate-containing polymerizable functional group; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one acrylate or methacrylate-containing cross-linking agent.

One example of a method in accordance with the present disclosure is a method of manufacturing a silicone hydrogel contact lens, comprising: providing a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one acrylate or methacrylate-containing cross-linking agent; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one siloxane monomer having an acrylate or methacrylate-containing polymerizable functional group; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one acrylate or methacrylate-containing cross-linking agent; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

When present in the polymerizable composition, the non-vinyl cross-linking agent or cross-linking agent component can be present in an amount from about 0.01 unit parts to about 5 unit parts, or from about 0.1 unit parts to about 4 unit parts, or from about 0.3 unit parts to about 3.0 unit parts, or from about 0.2 unit parts to about 2.0 unit parts.

The cross-linking agent component can comprise or consist of a combination of two or more cross-linking agents, each of which has a different polymerizable functional group. For example, the cross-linking agent component can comprise one vinyl-containing cross-linking agent, and one acrylate-containing cross-linking agent. The cross-linking agent component can comprise one vinyl-containing cross-linking agent and one methacrylate-containing cross-linking group. The cross-linking agent component can comprise or consist of one vinyl ether-containing cross-linking agent, and one methacrylate-containing cross-linking agent.

One example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; (c) at least one vinyl-containing cross-linking agent; and (d) at least one acrylate or methacrylate-containing cross-linking agent.

Another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer having an acrylate or methacrylate-containing polymerizable functional group; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; (c) at least one vinyl-containing cross-linking agent; and (d) at least one acrylate or methacrylate-containing cross-linking agent.

Another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; (c) at least one hydrophilic amide monomer having one N-vinyl group; (d) at least one vinyl-containing cross-linking agent; and (e) at least one acrylate or methacrylate-containing cross-linking agent.

Yet another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer having an acrylate or methacrylate-containing polymerizable functional group; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; (c) at least one hydrophilic amide monomer having one N-vinyl group; (d) at least one vinyl-containing cross-linking agent; and (e) at least one acrylate or methacrylate-containing cross-linking agent.

One example of a method in accordance with the present disclosure is a method of manufacturing a silicone hydrogel contact lens, comprising: providing a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; (c) at least one vinyl-containing cross-linking agent; and (d) at least one acrylate or methacrylate-containing cross-linking agent; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one siloxane monomer having an acrylate or methacrylate-containing polymerizable functional group; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; (c) at least one vinyl-containing cross-linking agent; and (d) at least one acrylate or methacrylate-containing cross-linking agent; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one siloxane monomer; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; (c) at least one hydrophilic amide monomer having one N-vinyl group; (d) at least one vinyl-containing cross-linking agent; and (d) at least one acrylate or methacrylate-containing cross-linking agent; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Yet another example of a method in accordance with the present disclosure is a method of manufacturing a silicone hydrogel contact lens, comprising: providing a polymerizable composition, said polymerizable composition comprising (a) at least one siloxane monomer having an acrylate or methacrylate-containing polymerizable functional group; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; (c) at least one hydrophilic amide monomer having one N-vinyl group; (d) at least one vinyl-containing cross-linking agent; and (d) at least one acrylate or methacrylate-containing cross-linking agent; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

When the polymerizable composition comprises at least one cross-linking agent, the total amount of cross-linking agents (i.e., the total unit parts of all cross-linking agents present in the polymerizable composition) can be an amount from about 0.01 unit parts to about 5 unit parts, or from about 0.1 unit parts to about 4 unit parts, or from about 0.3 unit parts to about 3.0 unit parts, or from about 0.2 unit parts to about 2.0 unit parts, or from about 0.6 to about 1.5 unit parts.

In one example, when the present polymerizable composition comprises at least one vinyl-containing crosslinking agent, the total amount of vinyl-containing cross-linking agents present in the polymerizable composition can be an amount from about 0.01 unit parts to from about 2.0 unit parts, or from about 0.01 unit parts to about 0.80 unit parts, or from about 0.01 unit parts to about 0.30 unit parts, or from about 0.05 unit parts to about 0.20 unit parts, or in an amount of about 0.1 unit parts.

As used herein, "silicone hydrogel" or "silicone hydrogel material" refers to a particular hydrogel that includes a silicone (SiO) component. For example, a silicone hydrogel is typically prepared by combining a silicon-containing material with conventional hydrophilic hydrogel precursors. A silicone hydrogel contact lens is a contact lens, including a vision correcting contact lens, which comprises a silicone hydrogel material. A siloxane monomer is a monomer that contains at least one siloxane [—Si—O—Si—] linkage. In a siloxane monomer, each silicon atom may optionally possess one or more organic radical substituents ($R_1$, $R_2$) or substituted organic radical substituents that may be the same or different, e.g., —$SiR_1R_2O$—. Similarly, a non-silicon ingredient is an ingredient containing less than 0.1% (w/w) silicon.

As previously discussed, the present polymerizable compositions comprise at least one siloxane monomer, and thus the hydrogel contact lenses formed from these polymerizable compositions are silicone hydrogel contact lenses.

In one example, the at least one siloxane monomer can contain hydrophilic components within the main chain of the siloxane molecule, can contain hydrophilic components within one or more side chains of the siloxane molecule, or any combination thereof. For example, the siloxane monomer can have at least one unit of ethylene glycol adjacent to a polymerizable functional group in the main chain of the siloxane molecule. As used herein, adjacent is understood to mean both immediately adjacent, and separated only by 10 or fewer carbon atoms. The at least one unit of ethylene glycol adjacent to a polymerizable functional group in the main chain of the siloxane molecule can be separated from the polymerizable functional group by a carbon chain 1-5 units in length (i.e., where the ethylene glycol unit is bonded to the first carbon in the carbon chain 1-5 units in length, and the polymerizable functional group is bonded to the last carbon of the carbon chain 1-5 units in length, in other words, the ethylene glycol unit and the polymerizable group are not immediately adjacent but are separated by 1-5 carbon atoms). The siloxane monomer can have at least one unit of ethylene glycol adjacent to polymerizable functional groups present on both ends of the main chain of the siloxane molecule. The siloxane monomer can have at least one unit of ethylene glycol present in at least one side chain of the siloxane molecule. The at least one unit of ethylene glycol present in at least one side chain of the siloxane molecule can be part of a side chain bonded to a silicon atom of the main chain of the siloxane molecule. The siloxane molecule can have both at least one unit of ethylene glycol adjacent to polymerizable functional groups present on both ends of the main chain of the siloxane molecule, and at least one unit of ethylene glycol present in at least one side chain of the siloxane molecule.

In one example of the present disclosure, the at least one siloxane monomer can be a multifunctional siloxane monomer. If the siloxane monomer has two functional groups, such as two methacrylate groups, it is a bifunctional monomer. If the siloxane monomer has three functional groups, it is a trifunctional monomer.

The siloxane monomer can be a siloxane monomer having a polymerizable functional group present on one end of the main chain of the monomer. The siloxane monomer can be a siloxane monomer having a polymerizable functional group on both ends of the main chain of the monomer. The siloxane monomer can be a siloxane monomer having a polymerizable functional group present on at least one side chain of the monomer. The siloxane monomer can be a siloxane monomer having a polymerizable functional group present on only one side chain of the monomer.

The siloxane monomer of the polymerizable composition can be an acrylate-containing siloxane monomer, in other words, a siloxane monomer having at least one acrylate polymerizable functional group as part of its molecular structure. In one example, the acrylate-containing siloxane monomer can be a methacrylate-containing siloxane monomer, i.e., a siloxane monomer having at least one methacrylate polymerizable functional group as part of its molecular structure.

The siloxane monomer can be a siloxane monomer having a number average molecular weight of at least 3,000 daltons. In another example, the siloxane monomer can be a siloxane monomer having a molecular weight of at least 4,000 daltons, or of at least 7,000 daltons, or of at least 9,000 daltons, or of at least 11,000 daltons.

The siloxane monomer can be a siloxane monomer having a molecular weight less than 20,000 daltons. In another example, the siloxane monomer can be a siloxane monomer having a molecular weight less than 15,000 daltons, or less than 11,000 daltons, or less than 9,000 daltons, or less than 7,000 daltons, or less than 5,000 daltons.

The siloxane monomer can be a siloxane monomer having a molecular weight from 3,000 daltons to 20,000 daltons. In another example, the siloxane monomer can be a siloxane monomer having a molecular weight from 5,000 daltons to 20,000 daltons, or from 5,000 daltons to 10,000 daltons, or from 7,000 daltons to 15,000 daltons.

In one example, the siloxane monomer has more than one functional group and has a number average molecular weight of at least 3,000 daltons.

In one example, the at least one siloxane monomer can comprise or consist of a single siloxane monomer, or can comprise or consist of a siloxane monomer component composed of two or more siloxane monomers. The siloxane monomer component can comprise or consist of a first siloxane monomer having a molecular weight less than about 2,000 daltons, and a second siloxane monomer having a molecular weight greater than about 3,000 daltons. The siloxane monomer component can comprise or consist of a first siloxane monomer having a molecular weight of from 400 daltons to 700 daltons, and a second siloxane monomer having a molecular weight greater than 7,000 daltons. The first siloxane monomer and the second siloxane monomer can be present in the polymerizable composition in a ratio of unit parts of the first siloxane monomer present in the polymerizable composition to unit parts of the second siloxane monomer present in the polymerizable composition of at least 2:1. For example, the ratio can be at least 3:1, or at least 4:1, or can be a ratio of about 4:1.

One example of a silicone hydrogel contact lens in accordance with the present disclosure is a silicone hydrogel contact lens, comprising: a polymeric lens body that is the reaction product of a polymerizable composition, said polymerizable composition comprising (a) a first siloxane monomer having a number average molecular weight of from 400 daltons to 700 daltons; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

Another example of a silicone hydrogel contact lens in accordance with the present disclosure is a silicone hydrogel contact lens, comprising: a polymeric lens body that is the reaction product of a polymerizable composition, said polymerizable composition comprising (a) a first siloxane monomer; (b) a second siloxane monomer; wherein a ratio of unit parts of the first siloxane monomer present in the polymerizable composition to unit parts of the second siloxane monomer present in the polymerizable composition is at least 2:1; and (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

Another example of a silicone hydrogel contact lens in accordance with the present disclosure is a silicone hydrogel contact lens, comprising: a polymeric lens body that is the reaction product of a polymerizable composition, said polymerizable composition comprising (a) a first siloxane monomer having a number average molecular weight of from 400 daltons to 700 daltons; (b) a second siloxane monomer; and (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

Another example of a silicone hydrogel contact lens in accordance with the present disclosure is a silicone hydrogel contact lens, comprising: a polymeric lens body that is the reaction product of a polymerizable composition, said polymerizable composition comprising (a) a first siloxane monomer having a number average molecular weight of at least 7,000 daltons; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

Another example of a silicone hydrogel contact lens in accordance with the present disclosure is a silicone hydrogel contact lens, comprising: a polymeric lens body that is the reaction product of a polymerizable composition, said polymerizable composition comprising (a) a first siloxane monomer having a number average molecular weight of from 400 daltons to 700 daltons; (b) a second siloxane monomer having a number average molecular weight of at least 7,000 daltons; and (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

Another example of a silicone hydrogel contact lens in accordance with the present disclosure is a silicone hydrogel contact lens, comprising: a polymeric lens body that is the reaction product of a polymerizable composition, said polymerizable composition comprising (a) a first siloxane monomer having a number average molecular weight of from 400 daltons to 700 daltons; (b) a second siloxane monomer having a number average molecular weight of at least 7,000 daltons; (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (d) at least one hydrophilic amide monomer having one N-vinyl group.

Yet another example of a silicone hydrogel contact lens in accordance with the present disclosure is a silicone hydrogel contact lens, comprising: a polymeric lens body that is the reaction product of a polymerizable composition, said polymerizable composition comprising (a) a first siloxane monomer having a number average molecular weight of from 400 daltons to 700 daltons; (b) a second siloxane monomer having a number average molecular weight of at least 7,000 daltons; wherein a ratio of unit parts of the first siloxane monomer present in the polymerizable composition to unit parts of the second siloxane monomer present in the polymerizable composition is at least 2:1; (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (d) at least one hydrophilic amide monomer having one N-vinyl group.

One example of a method in accordance with the present disclosure is a method of manufacturing a silicone hydrogel contact lens, comprising: providing a polymerizable composition, said polymerizable composition comprising (a) at least one siloxane monomer having a number average molecular weight of from 400 daltons to 700 daltons; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) a first siloxane monomer; (b) a second siloxane monomer; wherein a ratio of unit parts of the first siloxane monomer present in the polymerizable composition to unit parts of the second siloxane monomer present in the polymerizable composition is at least 2:1. and (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) a first siloxane monomer having a number average molecular weight of from 400 daltons to 700 daltons; (b) a second siloxane monomer; and (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one siloxane monomer having a number average molecular weight of at least 7,000 daltons; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) a first siloxane monomer having a number average molecular weight of from 400 daltons to 700 daltons; (b) a second siloxane monomer having a number average molecular weight of at least 7,000 daltons; and (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) a first siloxane monomer having a number average molecular weight of from 400 daltons to 700 daltons; (b) a second siloxane monomer having a number average molecular weight of at least 7,000 daltons; (c) a hydrophilic amide monomer having one N-vinyl group; and (d) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Yet another example of a method in accordance with the present disclosure is a method of manufacturing a silicone hydrogel contact lens, comprising: providing a polymerizable composition, said polymerizable composition comprising (a) a first siloxane monomer having a number average molecular weight of from 400 daltons to 700 daltons; (b) a second siloxane monomer having a number average molecular weight of at least 7,000 daltons; wherein a ratio of unit parts of the first siloxane monomer present in the polymerizable composition to unit parts of the second siloxane monomer present in the polymerizable composition is at least 2:1; (c) a hydrophilic amide monomer having one N-vinyl group; and (d) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

The siloxane monomer can include poly(organosiloxane) monomers or macromers or prepolymers, such as, for example, 3-[tris(trimethylsiloxy)silyl]propyl allyl carbamate, or 3-[tris(trimethylsiloxy)silyl]propyl vinyl carbamate, or trimethylsilylethyl vinyl carbonate, or trimethylsilylmethyl vinyl carbonate, or 3-[tris(trimethylsilyloxy)silyl]propyl methacrylate (TRIS), or 3-methaycryloxy-2-hydroxypropyloxy)propylbis(trimethylsiloxy)methylsilane (SiGMA), or methyldi(trimethylsiloxy)silylpropylglycerolethyl methacrylate (SiGEMA), or monomethacryloxypropyl terminated polydimethylsiloxane (MCS-M11), MCR-M07, or monomethacryloxypropyl terminated mono-n-butyl terminated polydimethyl siloxane (mPDMS), or any combination thereof. In one example of a polymerizable composition of the present disclosure, the optional siloxane monomer can comprise a first siloxane monomer and a second siloxane monomer, wherein the second siloxane monomer differs from the first siloxane present in the polymerizable composition based on molecular weight, molecular structure, or both molecular weight and structure. For example, the optional second siloxane monomer or at least one third siloxane monomer can be a siloxane monomer of formula (1) having a different molecular weight than the first siloxane monomer of the polymerizable composition. In another example, the optional second siloxane monomer or at least one third siloxane can comprise at least one of the siloxanes disclosed in the following patents: US2007/0066706, US2008/0048350, U.S. Pat. No. 3,808,178, U.S. Pat. No. 4,120,570, U.S. Pat. No. 4,136,250, U.S. Pat. No. 4,153,641, U.S. Pat. No. 470,533, U.S. Pat. No. 5,070,215, U.S. Pat. No. 5,998,498, U.S. Pat. No. 5,760,100, U.S. Pat. No. 6,367,929, and EP080539, the entire content of which are hereby incorporated by reference.

In another example of the present contact lenses, the siloxane monomer can be a dual-end methacrylate end-capped polydimethylsiloxane. It will be understood that such siloxane monomers are bifunctional.

In another example of the present contact lenses, the siloxane monomer can be a dual-end methacrylate end-capped polydimethylsiloxane having a number average molecular weight of at least 4,000 daltons. It will be understood that such siloxane monomers are bifunctional.

In another example of the present contact lenses, the siloxane monomer can be a dual-end methacrylate end-capped polydimethylsiloxane having a number average molecular weight of at least 7,000 daltons. It will be understood that such siloxane monomers are bifunctional.

One example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer which is a dual-end methacrylate end-capped polydimethylsiloxane; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

Another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer which is a dual-end methacrylate end-capped polydimethylsiloxane having a number average molecular weight of at least 7,000 daltons; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

Yet another example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer which is a dual-end methacrylate end-capped polydimethylsiloxane; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one cross-linking agent. The at least one cross-linking agent can comprise a vinyl-containing cross-linking agent, or at least one acrylate or methacrylate-containing cross-linking agent, or both.

One example of a method in accordance with the present disclosure is a method of manufacturing a silicone hydrogel contact lens, comprising: providing a polymerizable composition, said polymerizable composition comprising (a) at least one siloxane monomer which is a dual-end methacrylate end-capped polydimethylsiloxane; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one siloxane monomer which is a dual-end methacrylate end-capped polydimethylsiloxane having a number average molecular weight of at least 7,000 daltons; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Yet another example of a method in accordance with the present disclosure is a method of manufacturing a silicone hydrogel contact lens, comprising: providing a polymerizable composition, said polymerizable composition comprising (a) at least one siloxane monomer which is a dual-end methacrylate end-capped polydimethylsiloxane; (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and (c) at least one cross-linking agent; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package. The at least one cross-linking agent can comprise a vinyl-containing cross-linking agent, or at least one acrylate or methacrylate-containing cross-linking agent, or both.

In one example of the present contact lenses, the siloxane monomer can have a number average molecular weight of at least 4,000 daltons, or at least 7,000 daltons, or at least 9,000 daltons, or at least 11,000 daltons. The number average molecular weight of the siloxane monomer can be less than 20,000 daltons. Thus, in some contexts, the siloxane monomer can be considered a macromer, but it will be referred to as a monomer herein since it forms a unit part of a polymer formed with the other reactive components of the polymerizable composition.

Examples of siloxane monomers can include monofunctional siloxane monomers having at least one urethane linkage, such as the examples of the monofunctional siloxane monomers represented by formula (1):

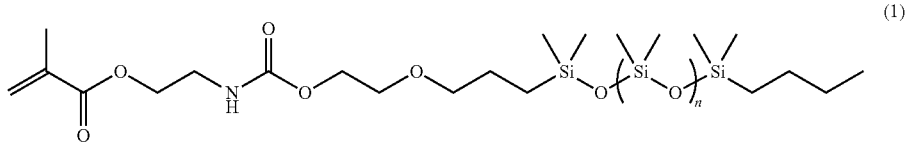

(1)

where n of formula (1) is 0-30, or is 10-15. In a particular example, the siloxane monomer can be the monomer of formula (1) where n of formula (1) is 12-13 and having a molecular weight of about 1,500 daltons. Examples of such monofunctional siloxane monomers described in U.S. Pat. No. 6,867,245, which is hereby incorporated by reference.

Examples of siloxane monomers can include bifunctional siloxane monomers having at least two urethane linkages, such as the examples of the bifunctional siloxane monomers represented by formula (2):

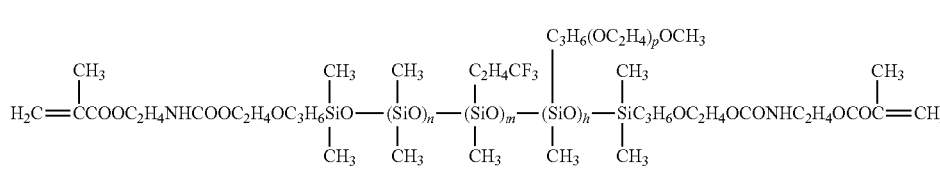

(2)

wherein n of formula (2) is an integer of about 100-150, m and p of formula (2) are both integers of about 5 to about 10, and h is an integer of about 2 to 8. Additional example of such bifunctional siloxane monomer, and methods of making compounds of formula (2) are described in U.S. Pat. No. 6,867,245, which is hereby incorporated by reference. In a particular example, the siloxane monomer can be a bifunctional siloxane monomer having two urethane linkages and having a molecular weight greater than 10,000 daltons, such as, for example, a molecular weight of greater than about 15,000 daltons.

The siloxane monomer can be a monofunctional siloxane monomer represented by formula (3):

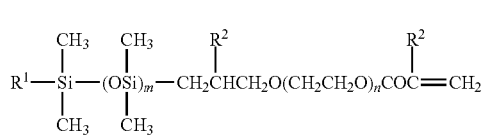

(3)

wherein m of formula (3) represents one integer from 3 to 10, n of formula (3) represents one integer from 1 to 10, $R^1$ of formula (3) is an alkyl group having from 1 to 4 carbon atoms, and each $R^2$ of formula (3) is independently either a hydrogen atom or a methyl group. In other words, on a single molecule of the siloxane monomer represented by formula 1, the first $R^2$ of formula (3), which is bonded to the $CH_2$ group adjacent to the siloxane group, can be either a hydrogen atom or a methyl group, and the second $R^2$ of formula (3), which is bonded to the C of the methacrylate end group, can also be either a hydrogen atom or a methyl group, regardless of whether the first $R^2$ of formula (3) is a hydrogen atom or a methyl group. In a particular example of the siloxane monomer of formula (3), m of formula (3) is 4, n of formula (3) is 1, $R^1$ of formula (3) is a butyl group, and each $R^2$ of formula (3) is independently either a hydrogen atom or a methyl group. The molecular weight of the siloxane monomer of formula (3) can be less than 2,000 daltons. In some examples, the molecular weight of the siloxane monomer of formula (3) is less than 1,000 daltons. Frequently, the molecular weight of the first siloxane monomer is from 400 to 700 daltons. Additional details of the siloxane monomer of formula (3) can be understood from US20090299022, the entire content of which is hereby incorporated by reference. As can be appreciated from formula (3), the first siloxane monomer has a single methacrylic functional end group.

One example of a silicone hydrogel contact lens in accordance with the present disclosure is a silicone hydrogel contact lens, comprising: a polymeric lens body that is the reaction product of a polymerizable composition, said polymerizable composition comprising (a) at least one monofunctional siloxane monomer represented by formula (3):

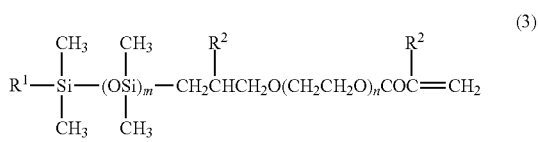

(3)

wherein m of formula (3) represents one integer from 3 to 10, n of formula (3) represents one integer from 1 to 10, $R^1$ of formula (3) is an alkyl group having from 1 to 4 carbon atoms, and each $R^2$ of formula (3) is independently either a hydrogen atom or a methyl group; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

Another example of a silicone hydrogel contact lens in accordance with the present disclosure is a silicone hydrogel contact lens, comprising: a polymeric lens body that is the reaction product of a polymerizable composition, said polymerizable composition comprising (a) at least one monofunctional siloxane monomer represented by formula (3):

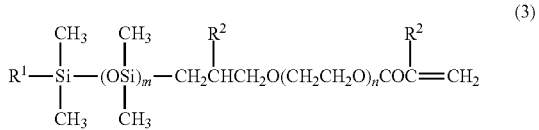

wherein m of formula (3) is 4, n of formula (3) is 1, $R^1$ of formula (3) is a butyl group, and each $R^2$ of formula (3) is independently either a hydrogen atom or a methyl group; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

One example of a method in accordance with the present disclosure is a method of manufacturing a silicone hydrogel contact lens, comprising: providing a polymerizable composition, said polymerizable composition comprising (a) at least one monofunctional siloxane monomer represented by formula (3):

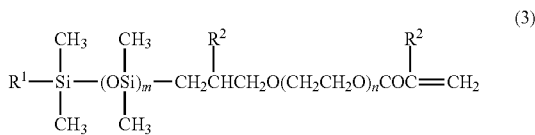

wherein m of formula (3) represents one integer from 3 to 10, n of formula (3) represents one integer from 1 to 10, $R^1$ of formula (3) is an alkyl group having from 1 to 4 carbon atoms, and each $R^2$ of formula (3) is independently either a hydrogen atom or a methyl group; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one monofunctional siloxane monomer represented by formula (3):

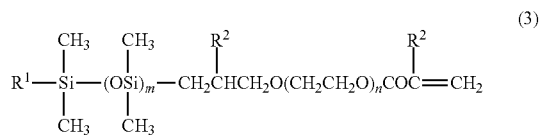

wherein m of formula (3) is 4, n of formula (3) is 1, $R^1$ of formula (3) is a butyl group, and each $R^2$ of formula (3) is independently either a hydrogen atom or a methyl group; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

The siloxane monomer can be a bifunctional siloxane monomer represented by formula (4):

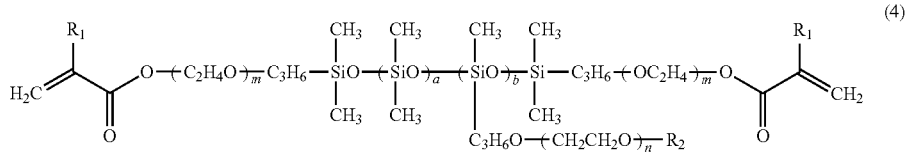

wherein $R_1$ of formula (4) is selected from either hydrogen atom or a methyl group; $R_2$ of formula (4) is selected from either of hydrogen atom or a hydrocarbon group having 1 to 4 carbon atoms; m of formula (4) represents an integer of from 0 to 10; n of formula (4) represents an integer of from 4 to 100; a and b represent integers of 1 or more; a+b is equal to 20-500; b/(a+b) is equal to 0.01-0.22; and the configuration of siloxane units includes a random configuration. In some examples in which the second siloxane monomer is a monomer represented by formula (4), m of formula (4) is 0, n of formula (4) is an integer from 5 to 15, a is an integer from 65 to 90, b is an integer from 1 to 10, $R_1$ of formula (4) is a methyl group, and $R_2$ of formula (4) is either a hydrogen atom or a hydrocarbon group having 1 to 4 carbon atoms. One example of such a second siloxane monomer as represented by formula (4) is abbreviated Si2 in the examples. In one example, the number average molecular weight for this second siloxane monomer represented by formula (4) is from about 9,000 daltons to about 10,000 daltons. In other examples, the second siloxane monomer represented by formula (4) is from about 5,000 daltons to about 10,000 daltons. It can be appreciated that the second siloxane represented by formula (4) is a bifunctional siloxane having two terminal methacrylic groups. Additional details of this second siloxane monomer can be found in US20090234089, the entire content of which is incorporated herein by reference.

One example of a silicone hydrogel contact lens in accordance with the present disclosure is a silicone hydrogel contact lens, comprising: a polymeric lens body that is the reaction product of a polymerizable composition, said polymerizable composition comprising (a) a bifunctional siloxane monomer represented by formula (4):

wherein m of formula (4) is 0, n of formula (4) is an integer from 5 to 15, a is an integer from 65 to 90, b is an integer from 1 to 10, $R^1$ of formula (4) is a methyl group, and $R^2$ of formula (4) is either a hydrogen atom or a hydrocarbon group having 1 to 4 carbon atoms; a and b represent integers of 1 or more; a+b is equal to 20-500; b/(a+b) is equal to 0.01-0.22; and the configuration of siloxane units includes a random configuration; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one

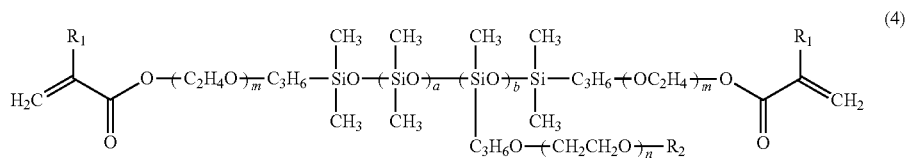
(4)

wherein $R^1$ of formula (4) is selected from either hydrogen atom or a methyl group; $R^2$ of formula (4) is selected from either of hydrogen atom or a hydrocarbon group having 1 to 4 carbon atoms; m of formula (4) represents an integer of from 0 to 10; n of formula (4) represents an integer of from 4 to 100; a and b represent integers of 1 or more; a+b is equal to 20-500; b/(a+b) is equal to 0.01-0.22; and the configuration of siloxane units includes a random configuration; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

Another example of a silicone hydrogel contact lens in accordance with the present disclosure is a silicone hydrogel contact lens, comprising: a polymeric lens body that is the reaction product of a polymerizable composition, said polymerizable composition comprising (a) a bifunctional siloxane monomer represented by formula (4):

hydrophilic vinyl ether-containing monomer is present in the polymerizable composition, it is present in an amount of from 1 to 20 unit parts by weight.

Another example of a silicone hydrogel contact lens in accordance with the present disclosure is a silicone hydrogel contact lens, comprising: a polymeric lens body that is the reaction product of a polymerizable composition, said polymerizable composition comprising (a) a monofunctional siloxane monomer represented by formula (3):

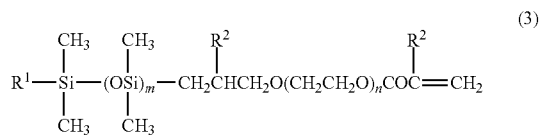
(3)

wherein m of formula (3) represents one integer from 3 to 10, n of formula (3) represents one integer from 1 to 10, $R^1$ of formula (3) is an alkyl group having from 1 to 4 carbon atoms, and each $R^2$ of formula (3) is independently either a hydrogen atom or a methyl group; (b) a bifunctional siloxane monomer represented by formula (4):

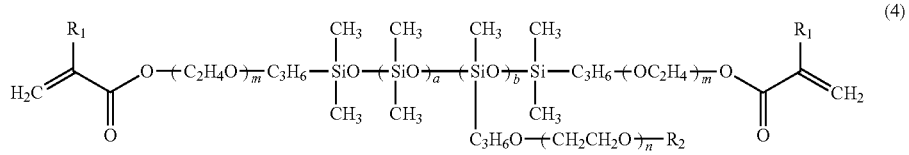
(4)

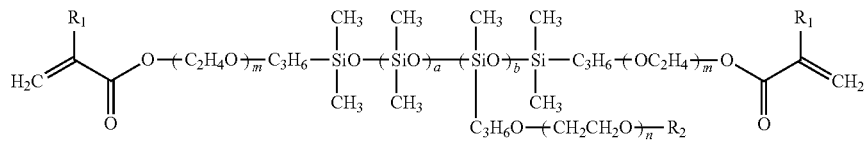

wherein $R^1$ of formula (4) is selected from either hydrogen atom or a methyl group; $R^2$ of formula (4) is selected from either of hydrogen atom or a hydrocarbon group having 1 to 4 carbon atoms; m of formula (4) represents an integer of from 0 to 10; n of formula (4) represents an integer of from 4 to 100; a and b represent integers of 1 or more; a+b is equal to 20-500; b/(a+b) is equal to 0.01-0.22; and the configuration of siloxane units includes a random configuration; and (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

Yet another example of a silicone hydrogel contact lens in accordance with the present disclosure is a silicone hydrogel contact lens, comprising: a polymeric lens body that is the reaction product of a polymerizable composition, said polymerizable composition comprising (a) a monofunctional siloxane monomer represented by formula (3):

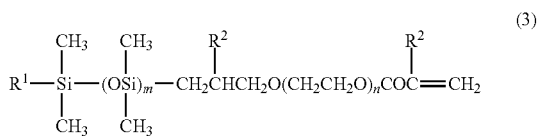

wherein m of formula (3) is 4, n of formula (3) is 1, $R^1$ of formula (3) is a butyl group, and each $R^2$ of formula (3) is independently either a hydrogen atom or a methyl group; (b) a bifunctional siloxane monomer represented by formula (4):

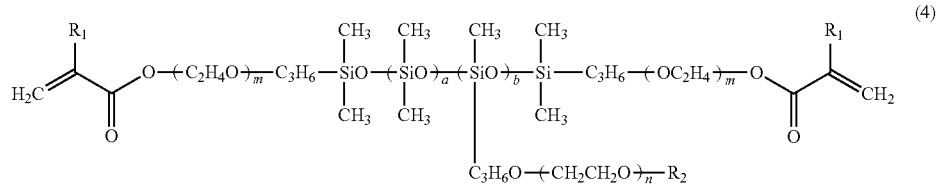

wherein m of formula (4) is 0, n of formula (4) is an integer from 5 to 15, a is an integer from 65 to 90, b is an integer from 1 to 10, $R^1$ of formula (4) is a methyl group, and $R^2$ of formula (4) is either a hydrogen atom or a hydrocarbon group having 1 to 4 carbon atoms; a and b represent integers of 1 or more; a+b is equal to 20-500; b/(a+b) is equal to 0.01-0.22; and the configuration of siloxane units includes a random configuration; and (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight.

One example of a method in accordance with the present disclosure is a method of manufacturing a silicone hydrogel contact lens, comprising: providing a polymerizable composition, said polymerizable composition comprising (a) a bifunctional siloxane monomer represented by formula (4):

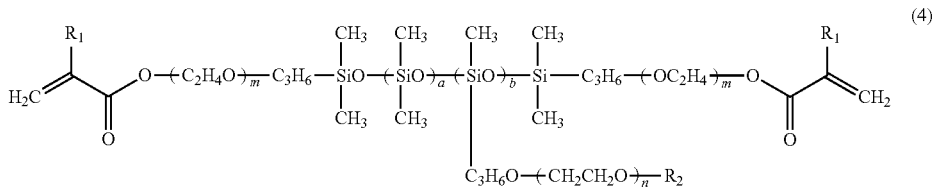

wherein $R^1$ of formula (4) is selected from either hydrogen atom or a methyl group; $R^2$ of formula (4) is selected from either of hydrogen atom or a hydrocarbon group having 1 to 4 carbon atoms; m of formula (4) represents an integer of from 0 to 10; n of formula (4) represents an integer of from 4 to 100; a and b represent integers of 1 or more; a+b is equal to 20-500; b/(a+b) is equal to 0.01-0.22; and the configuration of siloxane units includes a random configuration; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) a bifunctional siloxane monomer represented by formula (4):

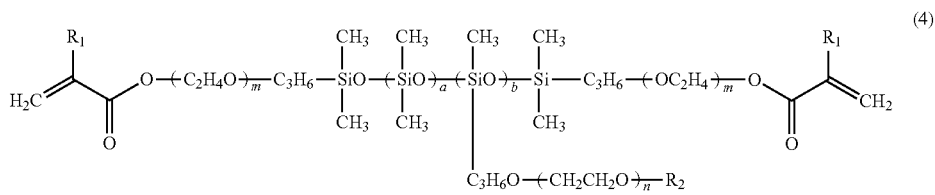

wherein m of formula (4) is 0, n of formula (4) is an integer from 5 to 15, a is an integer from 65 to 90, b is an integer from 1 to 10, $R^1$ of formula (4) is a methyl group, and $R^2$ of formula (4) is either a hydrogen atom or a hydrocarbon group having 1 to 4 carbon atoms; a and b represent integers of 1 or more; a+b is equal to 20-500; b/(a+b) is equal to 0.01-0.22; and the configuration of siloxane units includes a random configuration; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition compris ing (a) a monofunctional siloxane monomer represented by formula (3):

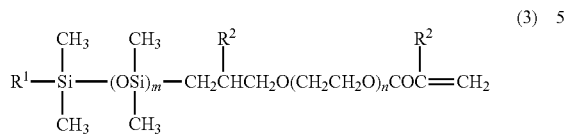

wherein m of formula (3) represents one integer from 3 to 10, n of formula (3) represents one integer from 1 to 10, $R^1$ of formula (3) is an alkyl group having from 1 to 4 carbon atoms, and each $R^2$ of formula (3) is independently either a hydrogen atom or a methyl group; (b) a bifunctional siloxane monomer represented by formula (4):

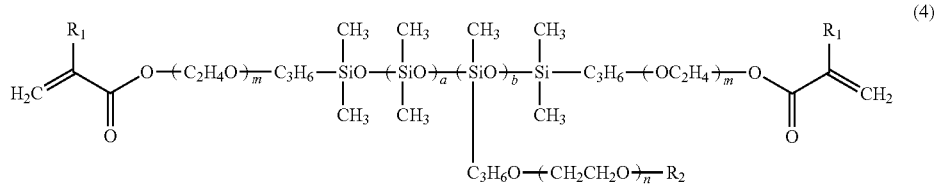

wherein $R^1$ of formula (4) is selected from either hydrogen atom or a methyl group; $R^2$ of formula (4) is selected from either of hydrogen atom or a hydrocarbon group having 1 to 4 carbon atoms; m of formula (4) represents an integer of from 0 to 10; n of formula (4) represents an integer of from 4 to 100; a and b represent integers of 1 or more; a+b is equal to 20-500; b/(a+b) is equal to 0.01-0.22; and the configuration of siloxane units includes a random configuration; and (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

Yet another example of a method in accordance with the present disclosure is a method of manufacturing a silicone hydro gel contact lens, comprising: providing a polymerizable composition, said polymerizable composition comprising (a) a monofunctional siloxane monomer represented by formula (3):

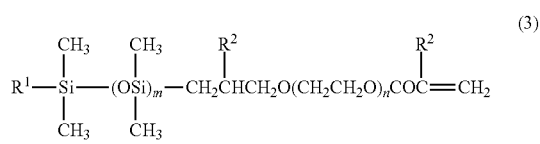

wherein m of formula (3) is 4, n of formula (3) is 1, $R^1$ of formula (3) is a butyl group, and each $R^2$ of formula (3) is independently either a hydrogen atom or a methyl group; (b) a bifunctional siloxane monomer represented by formula (4):

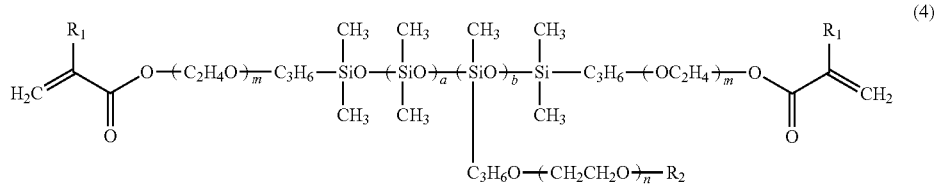

wherein m of formula (4) is 0, n of formula (4) is an integer from 5 to 15, a is an integer from 65 to 90, b is an integer from 1 to 10, $R^1$ of formula (4) is a methyl group, and $R^2$ of formula (4) is either a hydrogen atom or a hydrocarbon group having 1 to 4 carbon atoms; a and b represent integers of 1 or more; a+b is equal to 20-500; b/(a+b) is equal to 0.01-0.22; and the configuration of siloxane units includes a random configuration; and (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

The siloxane monomer can be a bifunctional siloxane monomer represented by formula (5):

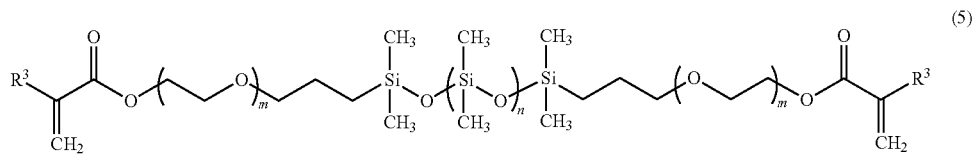

(5)

wherein R3 is selected from either hydrogen atom or a methyl group, m of formula (5) represents an integer from 0 to 15, and n of formula (5) represents an integer from 1 to 500. In one example, the siloxane monomer is represented by formula (5), and R3 is a methyl group, m of formula (5) is 0, and n of formula (5) is one integer from 40 to 60.

In another example, the siloxane monomer can be a bifunctional siloxane monomer represented by formula (6), and is available from Gelest, Inc., Morrisville, Pa. as product code DMS-R18:

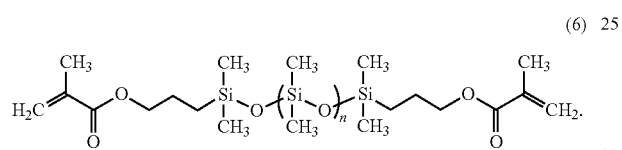

(6)

In one example, the siloxane of formula (6) has a number average molecular weight of about 4,000 to about 4,500 daltons.

In one example, the polymerizable composition can comprise a siloxane monomer component composed of a first siloxane monomer and a second siloxane monomer. The second siloxane monomer can have more than one functional group, or can have a number average molecular weight of at least 3,000 daltons, or can have both more than one functional group and a number average molecular weight of at least 3,000 daltons. If the second siloxane monomer has two functional groups, such as two methacrylate groups, it is a bifunctional monomer. If the second siloxane monomer has three functional groups, it is a trifunctional monomer.

When the polymerizable composition comprises a first siloxane and a second siloxane, the first siloxane monomer and the second siloxane monomer can be present in amounts such that the ratio of the first siloxane monomer to the second siloxane monomer is at least 1:1 based on unit parts, or is at least 2:1 based on unit parts. For example, the first siloxane monomer and the second siloxane monomer can be present in the polymerizable composition in a ratio from about 2:1 to about 10:1 based on unit parts. In another example, the first siloxane monomer and the second siloxane monomer can be present in the polymerizable composition in a ratio from about 3:1 to about 6:1 based on unit parts. In one example, the first siloxane monomer and the second siloxane monomer can be present in the polymerizable composition in a ratio of about 4:1 based on unit parts.

Another example of a silicone hydrogel contact lens in accordance with the present disclosure is a silicone hydrogel contact lens, comprising: a polymeric lens body that is the reaction product of a polymerizable composition, said polymerizable composition comprising (a) a first monofunctional siloxane monomer represented by formula (3):

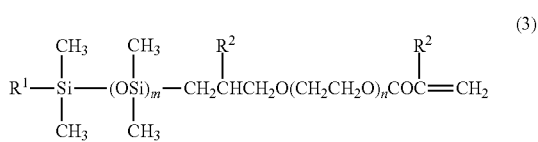

(3)

wherein m of formula (3) represents one integer from 3 to 10, n of formula (3) represents one integer from 1 to 10, $R^1$ of formula (3) is an alkyl group having from 1 to 4 carbon atoms, and each $R^2$ of formula (3) is independently either a hydrogen atom or a methyl group; (b) a second bifunctional siloxane monomer represented by formula (4):

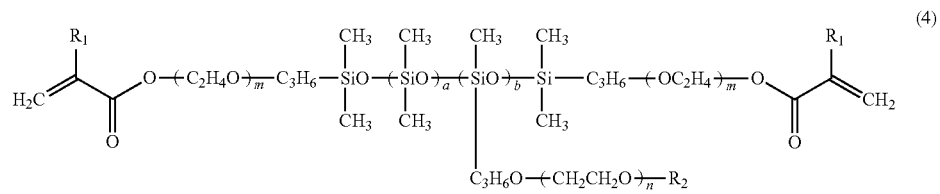

(4)

wherein $R^1$ of formula (4) is selected from either hydrogen atom or a methyl group; $R^2$ of formula (4) is selected from either of hydrogen atom or a hydrocarbon group having 1 to 4 carbon atoms; m of formula (4) represents an integer of from 0 to 10; n of formula (4) represents an integer of from 4 to 100; a and b represent integers of 1 or more; a+b is equal to 20-500; b/(a+b) is equal to 0.01-0.22; and the configuration of siloxane units includes a random configuration; and (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and a ratio of the first siloxane monomer to the second siloxane monomer is from 3:1 to 6:1 based on unit parts by weight.

Another example of a method in accordance with the present disclosure is a method of manufacturing a silicone hydrogel contact lens, comprising: providing a polymerizable composition, said polymerizable composition comprising (a) a first monofunctional siloxane monomer represented by formula (3):

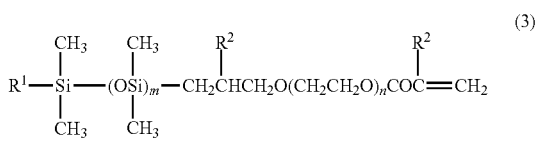

wherein m of formula (3) represents one integer from 3 to 10, n of formula (3) represents one integer from 1 to 10, $R^1$ of formula (3) is an alkyl group having from 1 to 4 carbon atoms, and each $R^2$ of formula (3) is independently either a hydrogen atom or a methyl group; (b) a second bifunctional siloxane monomer represented by formula (4):

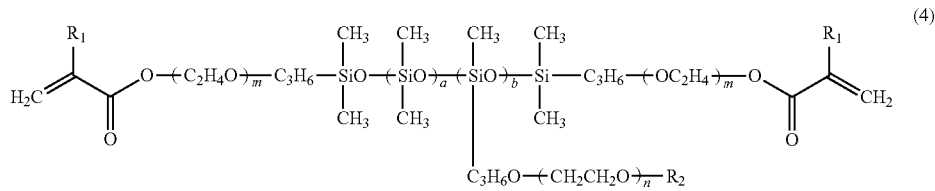

wherein $R^1$ of formula (4) is selected from either hydrogen atom or a methyl group; $R^2$ of formula (4) is selected from either of hydrogen atom or a hydrocarbon group having 1 to 4 carbon atoms; m of formula (4) represents an integer of from 0 to 10; n of formula (4) represents an integer of from 4 to 100; a and b represent integers of 1 or more; a+b is equal to 20-500; b/(a+b) is equal to 0.01-0.22; and the configuration of siloxane units includes a random configuration; and (c) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; and a ratio of the first siloxane monomer to the second siloxane monomer is from 3:1 to 6:1 based on unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

In one example, the total amount of siloxane monomers present in the polymerizable composition (e.g., the sum of the unit parts of the optional first siloxane monomer, the optional second siloxane monomer, and any other optional siloxane monomers present in the polymerizable composition) can be from about 10 to about 60 unit parts, or from about 25 to about 50 unit parts, or from about 35 to about 40 unit parts.

In one particular example, when the siloxane monomer component comprises a combination of at least two siloxane monomers each having a different molecular weight, the molecular weight of the first siloxane monomer can be less than 2,000 daltons. In some examples, the molecular weight of the first siloxane monomer can be less than 1,000 daltons. Frequently, the molecular weight of the first siloxane monomer is from 400 to 700 daltons.

When the at least one siloxane monomer is present in the polymerizable composition, as previously discussed, the at least one siloxane monomer can comprise a first siloxane monomer and a second siloxane monomer. In one example, the first siloxane monomer can consist of a siloxane monomer of formula (2) and the second siloxane monomer can consist of a siloxane monomer of formula (1). In another example, the first siloxane monomer can consist of a siloxane monomer of formula (1), and the second siloxane monomer con consist of a siloxane monomer of formula (2). In another example, the first siloxane monomer can consist of a siloxane monomer of formula (3), and the second siloxane can consist of a siloxane monomer of formula (4). In another example, the first siloxane monomer can consist of a siloxane monomer of formula (4), and the second siloxane monomer can consist of a siloxane monomer of formula (3). In another example, the first siloxane monomer can consist of a siloxane monomer of formula (1), and the second siloxane monomer can consist of a siloxane monomer of formula (4). In yet another example, the first siloxane monomer can consist of a siloxane monomer of formula (4), and the second siloxane monomer can consist of a siloxane monomer of formula (1). In any or all of the examples described herein, the siloxane monomer component can comprise a third siloxane monomer. For example, the third siloxane monomer can consist of a siloxane monomer of formula (5).

When the polymerizable composition comprises a first siloxane monomer and at least one cross-linking agent, the first siloxane monomer (e.g., a first siloxane monomer present as the only siloxane monomer of the polymerizable composition, or a first siloxane monomer present as part of a siloxane monomer component comprised of two or more siloxane monomers) and the at least one cross-linking agent (i.e., a single cross-linking agent or a cross-linking agent component composed of two or more cross-linking agents) can be present in the polymerizable composition in a ratio of at least 10:1 based on the total unit parts by weight of the first siloxane monomer to the total unit parts by weight of the at least one cross-linking agent (i.e., the sum of the unit parts of all vinyl-containing cross-linking agents present in the polymerizable composition). For example, the ratio can be at least 25:1 or at least 50:1 or at least 100:1 based on unit parts by weight.

In one example, the at least one cross-linking agent can comprise at least one vinyl-containing cross-linking agent, and at least one methacrylate-containing cross-linking agent.

In another example, the at least one cross-linking agent can consist of only one or more vinyl-containing cross linking agents. In another example, the at least one cross-linking agent can comprise or consist of at least one vinyl ether-containing cross-linking agent. In yet another example, the at least one cross-linking agent can consist of only one or more vinyl-containing cross linking agents. In one particular example, the at least one cross-linking agent can comprise or consist of at least one vinyl ether-containing cross-linking agent.

When the at least one cross-linking agent comprises or consists of at least one vinyl-containing cross-linking agent (i.e., a single vinyl-containing cross-linking agent or a vinyl-containing cross-linking agent component composed of two or more vinyl-containing cross-linking agents), the first siloxane monomer and the at least one vinyl-containing cross-linking agent can be present in the polymerizable composition in a ratio of at least about 50:1 based on a ratio of a total number of unit parts of the first siloxane monomer to a total number of unit parts of the least one vinyl-containing cross-linking agent (i.e., the sum of the unit parts of all vinyl-containing cross-linking agents present in the polymerizable composition). For example, the ratio can be from about 50:1 to about 500:1, or from about 100:1 to about 400:1, or from about 200:1 to about 300:1 based on unit parts by weight.

When the polymerizable composition comprises a first siloxane monomer and at least one additional siloxane monomer (i.e., a second siloxane, and optionally a third siloxane monomer, a fourth siloxane monomer, etc.) in combination with at least one cross-linking agent, the siloxane monomers and the at least one vinyl-containing monomer can be present in the polymerizable composition in a ratio of at least about 100:1 based on a ratio of a total number of unit parts of the each siloxane monomer present in the polymerizable composition (i.e., the sum of the unit parts of the first siloxane and the second siloxane monomer and, if present, the third siloxane monomer, etc.) to a total number of unit parts of the least one vinyl-containing cross-linking agent (i.e., the sum of the unit parts of all vinyl-containing cross-linking agents present in the polymerizable composition). For example, the ratio can be from about 50:1 to about 500:1, or from about 100:1 to about 400:1, or from about 200:1 to about 300:1 based on unit parts by weight.

The polymerizable composition can optionally include one or more organic diluents, one or more polymerization initiators (i.e., ultraviolet (UV) initiators or thermal initiators, or both), or one or more UV absorbing agents, or one or more tinting agents, or one or more oxygen scavengers, or one or more chain transfer agents, or any combination thereof. These optional ingredients can be polymerizable or non-polymerizable ingredients. In one example, the polymerizable compositions can be diluent-free in that they do not contain any organic diluent to achieve miscibility between the siloxanes and the other lens forming ingredients, such as the optional hydrophilic monomers, hydrophobic monomer, and cross-linking agents. In addition, many of the present polymerizable compositions are essentially free of water (e.g., contain no more than 3.0% or 2.0% water by weight).

The polymerizable compositions disclosed herein can optionally comprise one or more organic diluents, i.e., the polymerizable composition can comprise an organic diluent, or can comprise an organic diluent component comprising two or more organic diluents. Organic diluents that can optionally be included in the present polymerizable compositions include alcohols, including lower alcohols, such as, for example, without limitation, pentanol, or hexanol, or octanol, or decanol, or any combination thereof. When included, the organic diluent or organic diluent component can be provided in the polymerizable composition in an amount from about 1 to about 70 unit parts, or from about 2 unit parts to about 50 unit parts, or from about 5 unit parts to about 30 unit parts.

The present polymerizable compositions can optionally comprise one or more polymerization initiators, i.e., the polymerizable composition can comprise an initiator, or can comprise an initiator component comprising two or more polymerization initiators. Polymerization initiators that can be included in the present polymerizable compositions include, for example, azo compounds, or organic peroxides, or both. Initiators that can be present in the polymerizable composition include, for example, without limitation, benzoin ethyl ether, or benzyl dimethyl ketal, or alpha, alpha-diethoxyacetophenone, or 2,4,6-trimethylbenzoyl diphenyl phosphine oxide, or benzoin peroxide, or t-butyl peroxide, or azobisisobutyronitorile, or azobisdimethylvaleronitorile, or any combination thereof. UV photoinitiators can include, for example, phosphine oxides such as diphenyl (2,4,6-trimethyl benzoyl)phosphine oxide, or benzoin methyl ether, or 1-hydroxycyclohexylphenyl ketone, or Darocur (available from BASF, Florham Park, N.J., USA), or Irgacur (also available from BASF), or any combination thereof. In many of Examples 1-28 disclosed herein, the polymerization initiator is the thermal initiator 2,2'-azobis-2-methyl propanenitrile (VAZO-64 from E.I. DuPont de Nemours & Co., Wilmington, Del., USA). Other commonly used thermoinitiators can include 2,2'-azobis(2,4-dimethylpentanenitrile) (VAZO-52) and 1,1'-azo bis(cyanocyclohexane) (VAZO-88). The polymerization initiator or initiator component can be present in the polymerizable composition in an amount from about 0.01 unit parts to about 2.0 unit parts, or in an amount from about 0.1 unit parts to about 1.0 unit parts, or from about 0.2 unit parts to about 0.6 unit parts by weight.

Optionally, the present polymerizable compositions can comprise one or more UV absorbing agents, i.e., the polymerizable composition can comprise an UV absorbing agent, or can comprise an UV absorbing agent component comprising two or more UV absorbing agents. UV absorbing agents that can be included in the present polymerizable compositions include, for example, benzophenones, or benzotriazoles, or any combination thereof. In many of Examples 1-28 disclosed herein, the UV absorbing agent is 2-(3-(2H-benzo-triazol-2-YL)-4-hydroxy-phenyl)ethyl methacrylate (NOR-BLOC® 7966 from Noramco, Athens, Ga., USA). The UV absorbing agent can also be 2-(4-Benzoyl-3-hydroxyphenoxy)ethyl acrylate (UV-416). The UV absorbing agent or UV absorbing agent component can be present in the polymerizable composition in an amount from about 0.01 unit parts to about 5.0 unit parts, or in an amount from about 0.1 unit parts to about 3.0 unit parts, or from about 0.2 unit parts to about 2.0 unit parts by weight.

The polymerizable compositions of the present disclosure can also optionally include at least one tinting agent (i.e., one tinting agent or a tinting agent component comprising two or more tinting agents), although both tinted and clear lens products are contemplated. In one example, the tinting agent can be a reactive dye or pigment effective to provide color to the resulting lens product. The tinting agent or tinting agent component of the polymerizable composition can comprise a polymerizable tinting agent, or can comprise a non-polymerizable tinting agent, or any combination thereof. The polymerizable tinting agent can be a tinting agent whose molecular structure comprises a polymerizable functional group, or can be a tinting agent whose molecular structure includes both a monomer portion and a dye portion, i.e., the tinting agent can be a monomer-dye compound. The molecular structure of the tinting agent can comprise a beta sulfone functional group, or can comprise a triazine functional group. Tinting agents can include, for example, VAT Blue 6 (7,16-Dichloro-6,15-dihydroanthrazine-5,9,14,18-tetrone), or 1-Amino-4-[3-(beta-sulfatoethylsulfonyl)anilio]-2-anthraquinonesulfonic acid (C. I. Reactive Blue 19, RB-19), or a monomer-dye compound of Reactive Blue 19 and hydroxyethylmethacrylate (RB-19 HEMA), or 1,4-bis[4-[(2-methacryl-oxyethyl)phenylamino]anthraquinone (Reactive Blue 246, RB-246, available from Arran Chemical Company, Athlone, Ireland), or 1,4-Bis[(2-hydroxyethyl)amino]-9,10-anthracenedione bis(2-propenoic)ester (RB-247), or Reactive Blue 4, RB-4, or a monomer-dye compound of Reactive Blue 4 and hydroxyethyl methacrylate (RB-4 HEMA or "Blue HEMA"), or any combination thereof. In one example, the tinting agent or tinting agent component can comprise a polymerizable tinting agent. The polymerizable tinting agent component can comprise, for example, RB-246, or RB-247, or RB-4 HEMA, or RB-19 HEMA, or any combination thereof. Examples of monomer-dye compounds include RB-4 HEMA and RB-19 HEMA. Additional examples of monomer-dye compounds are described in U.S. Pat. No. 5,944,853 and U.S. Pat. No. 7,216,975, both of which are incorporated in their entirety by reference herein. Other exemplary tinting agents are disclosed, for example, in U.S. Patent Application Publication No. 2008/0048350, the disclosure of which is incorporated in its entirety herein by reference. In many of Examples 1-28 disclosed herein, the tinting agent is a reactive blue dye, such as those described in U.S. Pat. No. 4,997,897, the disclosure of which is incorporated in its entirety herein by reference. Other suitable tinting agents for use in accordance with the present invention are phthalocyanine pigments such as phthalocyanine blue, or phthalocyanine green, or chromic-alumina-cobaltous oxide, or chromium oxides, or various iron oxides for red, yellow, brown and black colors, or any combination thereof. Opaquing agents such as titanium dioxide can also be incorporated. For certain applications, a combination of tinting agents having different colors can be employed as the tinting agent component. If employed, the tinting agent or tinting agent component can be present in the polymerizable composition in an amount ranging from about 0.001 unit parts to about 15.0 unit parts, or about 0.005 unit parts to about 10.0 unit parts, or about 0.01 unit parts to about 8.0 unit parts.

The polymerizable compositions of the present disclosure can optionally comprise at least one oxygen scavenger, i.e., one oxygen scavenger or an oxygen scavenger component comprising two or more oxygen scavengers. Examples of oxygen scavengers which can be included as the oxygen scavenger or oxygen scavenger component of the present polymerizable compositions include, for example, Vitamin E, or phenolic compounds, or phosphite compounds, or phosphine compounds, or amine oxide compounds, or any combination thereof. For example, the oxygen scavenger or oxygen scavenger component can consist of or comprise a phosphine-containing compound. In many of Examples 1-28 disclosed herein, the oxygen scavenger or oxygen scavenger component is a phosphine-containing compound, such as triphenyl phosphine, or a polymerizable form of triphenyl phosphine, such as diphenyl(P-vinylphenyl)phosphine.

Chain transfer is a polymerization reaction in which the activity of a growing polymer chain is transferred to another molecule, reducing the average molecular weight of the final polymer. The polymerizable compositions of the present disclosure can optionally comprise at least one chain transfer agent, i.e., can comprise one chain transfer agent or can comprise a chain transfer agent component comprising at least two chain transfer agents. Examples of chain transfer agents which can be included as the chain transfer agent or the chain transfer component of the present polymerizable compositions include, for example, thiol compounds, or halocarbon compounds, or C3-C5 hydrocarbons, or any combination thereof. In many of Examples 1-28 disclosed herein, the chain transfer agent is allyloxy ethanol. When present in the polymerizable composition, the chain transfer agent or chain transfer agent component can be present in an amount from about 0.01 unit parts to about 1.5 unit parts, for example from about 0.1 unit parts to about 0.5 unit parts.

In any or each of the foregoing examples, as previously discussed, the amount of the hydrophilic monomer or monomer component (e.g., the one or more hydrophilic monomers present in the polymerizable composition) can be from 30 to 60 unit parts of the polymerizable composition. In one example, the hydrophilic monomer or mixture of monomers component can constitute from 40 to 55 unit parts of the polymerizable composition, or from 45 to 50 unit parts of the composition. When VMA is present in the polymerizable composition, it can be present in an amount from 30 unit parts to 60 unit parts. In one example, VMA is present in the polymerizable composition in an amount from about 40 unit parts to about 55 unit parts, or from 45 to 50 unit parts. If the hydrophilic monomers, N,N-dimethylacrylamide (DMA), 2-hydroxyethyl methacrylate (HEMA), or 2-hydroxylbutyl methacrylate (HOB), are present in the polymerizable composition as an optional second hydrophilic monomer or mixture of monomers, they can be present in amounts from about 3 to about 10 unit parts.

As used herein, a molecular weight is understood to refer to the number average molecular weight. The number average molecular weight is the ordinary arithmetic mean or average of the molecular weights of the individual molecules present in the sample of a monomer. As the individual molecules in a sample of monomer may vary slightly from one another in molar mass, some level of polydispersity may be present in the sample. As used herein, when the siloxane monomer, or any other monomer, macromer, pre-polymer, or polymer, of the polymerizable composition is polydisperse, the term "molecular weight" refers to the number average molecular weight of the monomer or ingredient. As one example, a sample of the siloxane monomer can have a number average molecular weight of about 15,000 daltons, but if the sample is polydisperse, the actual molecular weights of the individual monomers present in the sample may range from 12,000 daltons to 18,000 daltons.

The number average molecular weight can be the absolute number average molecular weight as determined by proton nuclear magnetic resonance (NMR) end group analysis, as understood by persons of ordinary skill in the art. Molecular weights may also be determined using gel permeation chromatography, as understood by persons of ordinary skill in the art, or may be provided by suppliers of the chemicals.

As used herein, "unit parts" is understood to mean unit parts by weight. For example, to prepare a formulation described as comprising x unit parts of a siloxane monomer and y unit parts of a hydrophilic monomer, the composition can be prepared by combining x grams of the siloxane monomer with y grams of the hydrophilic monomer to obtain a total of y+z grams of polymerizable composition, or by combining z ounces of the siloxane with y ounces of the hydrophilic monomer to obtain a total of y+z ounces of polymerizable composition, and so on. When the composition further comprises additional optional ingredients such as, for example, x unit parts of a cross-linking agent, x grams of the crosslinking agent are combined with z grams of the siloxane monomer and y grams of the hydrophilic monomer to obtain a total of x+y+z grams of polymerizable composition, and so on. When the composition comprises an additional optional ingredient comprising an ingredient component composed of two ingredients, such as, for example, a hydrophobic monomer component consisting of a first hydrophobic monomer and a second hydrophobic monomer, in addition to the z unit parts of siloxane monomer, the y unit parts of hydrophilic monomer and the x unit parts of the cross-linker, w unit parts of the first hydrophobic monomer and v unit parts of the second hydrophobic monomer are combined to obtain a total amount of v+w+x+y+z unit parts of the polymerizable composition. It is understood that the unit parts of the at least one hydrophobic monomer present in such a polymerizable is the sum of the unit parts of the first hydrophobic monomer and the unit parts of the second hydrophobic monomer, e.g., v+w unit parts in this example. Typically, a formula for a polymerizable composition will be composed of ingredients in amounts totaling from about 90 to about 110 unit parts by weight. When amounts of components of the polymerizable composition are recited herein as being in unit parts, it is to be understood that the unit parts of these component are based on a formula providing a total weight of the composition ranging from about 90 to 110 unit parts. In one example, the unit parts by weight can be based on a formula providing a total weight of the composition ranging from about 95 to 105 unit parts by weight, or from about 98 to 102 unit parts by weight.

As used herein, a reactive ingredient which can be reacted to form a unit part of a polymer is referred to as a monomer, regardless of its size. The at least one siloxane monomer can comprise a single siloxane monomer, or can comprise a siloxane monomer component composed of two or more siloxane monomers. The at least one siloxane monomer can be a hydrophilic siloxane monomer, or a hydrophobic siloxane monomer, or can have both hydrophilic regions and hydrophobic regions, depending on the amount and location of any hydrophilic components, such as units of ethylene glycol, polyethylene glycol and the like, present in the molecular structure of the siloxane monomers.

Additionally, the silicone hydrogel contact lenses of the present disclosure may have particular properties lens properties.

In one example, the silicone hydrogel contact lenses can have, when fully hydrated, equilibrium water contents (EWC)s from about 30 to about 70%. For example, the contact lenses can have an EWC from about 45% to about 65%, or from about 50% to about 63%, or from about 50% to about 67%, or from about 55% to about 65% by weight when fully hydrated. Methods of determining EWC are known to those of ordinary skill in the art, and can be based on weight loss from a lens during a drying process.

The silicone hydrogel contact lenses of the present disclosure can have, when fully hydrated, an average tensile modulus about 0.20 MPa to about 0.90 MPa. For example, the average modulus can be from about 0.30 MPa to about 0.80 MPa, or from about 0.40 MPa to about 0.75 MPa, or from about 0.50 MPa to about 0.70 MPa.

As used herein, the modulus of a contact lens or lens body is understood to refer to the tensile modulus, also know as Young's modulus. It is a measure of the stiffness of an elastic material. The tensile modulus can be measured using a method in accordance with ANSI Z80.20 standard. In one example, the tensile modulus can be measured using an Instron Model 3342 or Model 3343 mechanical testing system.

The silicone hydrogel contact lenses of the present disclosure can have, when fully hydrated, an average percentage of energy loss from about 25% to about 40%. For example, the average percentage of energy loss can be from about 27% to about 40%, or can be from about 30% to about 37%.

As used herein, percentage of energy loss is a measure of the energy lost as heat when energy loading and unloading cycles are applied to viscoelastic materials. Percentage of energy loss can be determined using a number of methods known to those of ordinary skill in the art. For example, the force involved in stretching a sample to 100% strain, and then returning it to 0% at a constant rate can be determined and used to calculate the percentage energy loss for the material.

The present contact lenses can have an oxygen permeability (or Dk) of at least 55 barrers (Dk≥55 barrers), or an oxygen permeability of at least 60 barrers (Dk≥60 barrers), or an oxygen permeability of at least 65 barrers (Dk≥65 barrers). The lenses can have an oxygen permeability from about 55 barrers to about 135 barrers, or from about 60 barrers to about 120 barrers, or from about 65 barrers to about 90 barrers, or from about 50 barrers to about 75 barrers. Various methods of determining oxygen permeability are known to those of ordinary skill in the art.

The present contact lenses, when fully hydrated, can have an ionoflux less than about $8.0 \times 10^{-3}$ mm$^2$/min, or less than about $7.0 \times 10^{-3}$ mm$^2$/min, or less than about $5.0 \times 10^{-3}$ mm$^2$/min. Various methods of determining ionoflux are conventional and are known to those of ordinary skill in the art.

The present contact lenses can have an oxygen permeability of at least 55 barrers (Dk≥55 barrers), or an EWC from about 30% to about 70%, or a captive bubble dynamic advancing contact angle less than 90 degrees, or a captive bubble static contact angle less than 70 degrees, or any combination thereof. In one example, the contact lenses can have an oxygen permeability of at least 60 barrers (Dk≥60 barrers), or an EWC from about 35% to about 65%, or a captive bubble dynamic advancing contact angle less than 70 degrees, or a captive bubble static contact angle less than 55 degrees, or any combination thereof. In another example, the present contact lenses can have an oxygen permeability of at least 65 barrers, or an EWC from about 45% to about 65%, or a captive bubble dynamic advancing contact angle less than 70 degrees, or a captive bubble static contact angle less than 55 degrees, or any combination thereof.

In one example, the present contact lenses have an oxygen permeability of at least 55 barrers, an EWC from about 30% to about 70%, a captive bubble dynamic advancing contact angle less than 70 degrees, and a captive bubble static contact angle less than 55 degrees.

In one example, the present contact lenses can have, when fully hydrated, an oxygen permeability of at least 55 barrers (Dk≥55 barrers), and a tensile modulus from about 0.2 MPa to about 0.9 MPa, and a captive bubble dynamic advancing contact angle less than 70 degrees, and a captive bubble static contact angle less than 55 degrees.

Various methods of measuring contact angles are known to those of ordinary skill in the art, including the captive bubble method. The contact angle can be a static or dynamic contact angle. Silicone hydrogel contact lenses of the present invention can have captive bubble dynamic advancing contact angles of less than 120 degrees, such as, for example, less than 90 degrees when fully hydrated, less than 80 degrees when fully hydrated, less than 70 degrees when fully hydrated, or less than 65 degrees when fully hydrated, or less than 60 degrees when fully hydrated, or less than 50 degrees when fully hydrated. Silicone hydrogel contact lenses of the present invention can have captive bubble static contact angles of less than 70 degrees when fully hydrated, or less than 60 degrees when fully hydrated, or less than 55 degrees when fully hydrated, or less than 50 degrees when fully hydrated, or less than 45 degrees when fully hydrated.

In one example, the present contact lenses can have a wet extractable component. The wet extractable component is determined based on the weight lost during methanol extraction of contact lenses which have been fully hydrated and sterilized prior to drying and extraction testing. The wet extractable component can comprise unreacted or partially reacted polymerizable ingredients of the polymerizable composition. The wet extractable component consists of organic solvent-extractable materials remaining in the lens body after the lens body has been fully processed to form a sterilized contact lens, for lenses formed from polymerizable compositions comprising non-polymerizable ingredients. For lenses extracted during manufacturing in either an extraction liquid comprising a volatile organic solvent or an extraction liquid free of an organic solvent, in most cases, substantially all of the non-polymerizable ingredients will have been removed from the lens body, and so the wet extractable component may consist essentially of extractable components formed from reactive polymerizable ingredients of the polymerizable composition, i.e., unreacted polymerizable components and partially reacted polymerizable ingredients. In lenses made from a polymerizable composition free of a diluent, the wet extractable component can be present in the contact lens in an amount from about 1% wt/wt to about 15% wt/wt, or from about 2% wt/wt to about 10% wt/wt, or from about 3% wt/wt to about 8% wt/wt based on the dry weight of the lens body prior to extraction testing. In lenses made from a polymerizable composition comprising a diluent, the wet extractable component may consist of a portion of the diluent as well as unreacted and partially reacted polymerizable ingredients, and can be present in the contact lens in an amount from about 1% wt/wt to about 20% wt/wt, or from about 2% wt/wt to about 15% wt/wt of the lens, or from about 3% wt/wt to about 10% wt/wt based on the dry weight of the lens body prior to extraction testing.

In one example, the present contact lenses have a dry extractable component. The dry extractable component is determined based on the weight lost during extraction in methanol of polymeric lens bodies which have not been washed, extracted (as part of a manufacturing process), hydrated or sterilized prior to the drying and extraction testing. The dry extractable component can comprise unreacted or partially reacted polymerizable ingredients of the polymerizable composition. When optional non-polymerizable ingredients such as diluents and the like are present in the polymerizable composition, the dry extractable component may further comprise the non-polymerizable ingredients.

In lenses made from a polymerizable composition free of a diluent, the dry extractable component of the lens consists primarily of dry extractable components contributed by polymerizable ingredients of the polymerizable composition (i.e., unreacted or partially reacted polymerizable ingredients), and may also include dry extractable materials contributed by optional non-polymerizable components present in the polymerizable composition in small amounts (e.g., less than 3% wt/wt), such as, for example, tinting agents, oxygen scavengers, and the like. In lenses made from a polymerizable composition free of a diluent, the dry extractable component can be present in the polymeric lens body in an amount from about 1% wt/wt to about 30% wt/wt of the lens body, or from about 2% wt/wt to about 25% wt/wt, or from about 3% wt/wt to about 20% wt/wt, or from about 4% wt/wt to about 15% wt/wt, or from 2% wt/wt to less than 10% wt/wt based on the dry weight of the lens body prior to extraction testing.

In lenses made from a polymerizable composition comprising a large amount (e.g., more than 3% wt/wt) of an optional non-polymerizable ingredient such as a diluent, the dry extractable component consists of extractable materials contributed by reactive ingredients as well as extractable components contributed by non-polymerizable ingredients of the polymerizable composition. The total amount of dry extractable components contributed by reactive ingredients and non-polymerizable ingredients present in the contact lens can consist of an amount from about 1% wt/wt to about 75% wt/wt, or from about 2% wt/wt to about 50% wt/wt of the lens, or from about 3% wt/wt to about 40% wt/wt, or from about 4% wt/wt to about 20% wt/wt, or from about 5% to about 10% based on the dry weight of the polymeric lens body prior to extraction testing. The total amount of dry extractable components contributed by polymerizable ingredients (i.e., unreacted or partially reacted polymerizable ingredients) can be an amount from about 1% wt/wt to about 30% wt/wt of the lens body, or from about 2% wt/wt to about 25% wt/wt, or from about 3% wt/wt to about 20% wt/wt, or from about 4% wt/wt to about 15% wt/wt, or from 2% wt/wt to less than 10% wt/wt based on the dry weight of the lens body prior to extraction testing.

It is also to be understood that reference to the contact lens formed from the compositions described herein is a lens body with an anterior surface and a posterior surface, the posterior surface being configured to be placed in contact with the cornea of an eye of a contact lens wearer. The lens body of the present invention can be entirely transparent. Alternatively, when the contact lens is a cosmetic lens configured to alter the appearance of an iris of a contact lens wearer, the lens body can comprise a transparent optic zone.

This invention is useful for contact lenses which, when worn, can be in contact with epithelial tissue or other eye tissues. This invention is useful for all known types of contact lenses, including both soft and rigid lens materials. In an example of the contact lens of the present invention, the contact lens is a lens with at least one optic zone configured to provide vision correction, to improve visual acuity, or to both provide vision correction and improve visual acuity. For example, the optic zone can be configured to provide a spherical correction, a toric correction, or a third order or higher correction. The optic zone can be configured to improve visual acuity at near viewing distances, at far viewing distances, or at both near and far viewing distances. Other features and examples of the contact lenses of the present invention are illustrated in the following sections.

The present hydrogel contact lenses are vision correcting or vision enhancing contact lenses. The lenses may be spheric lenses or aspheric lenses. The lenses may be monofocal lenses or multifocal lenses, including bifocal lenses. In one example, the present lenses are rotationally stabilized lenses, such as a rotationally stabilized toric contact lens. A rotationally stabilized contact lens may be a contact lens that comprises a lens body that includes a ballast. For example, the lens body may have a prism ballast, a periballast, and/or one or more thinned superior and inferior regions.

The present lenses also comprise lens bodies that include a peripheral edge region. The peripheral edge region may include a rounded portion. For example, the peripheral edge region may comprise a rounded posterior edge surface, a rounded anterior edge surface, or a combination thereof. The peripheral edge can be completely rounded from the anterior surface to the posterior surface. Therefore, it can be understood that the lens body of the present lenses may comprise a rounded peripheral edge.

The contact lenses of the present disclosure, as they are configured to be placed or disposed on a cornea of an animal or human eye, are ophthalmically acceptable contact lenses. As used herein, an ophthalmically acceptable contact lens is understood to be a contact lens having at least one of a number of different properties as described herein. An ophthalmically acceptable contact lens can be formed of, and packaged in, ophthalmically acceptable ingredients such that the lens is not cytotoxic and does not release irritating and/or toxic ingredients during wear. An ophthalmically acceptable contact lens can have a level of clarity in the optic zone of the lens (i.e., the portion of the lens providing vision correction) sufficient for its intended use in contact with the cornea of an eye, for example, a transmittance of at least 80%, or at least 90%, or at least 95% of visible light. An ophthalmically acceptable contact lens can have sufficient mechanical properties to facilitate lens handling and care for a duration of time based on its intended lifetime. For example, its modulus, tensile strength, and elongation can be sufficient to withstand insertion, wear, removal and, optionally, cleaning over the intended lifetime of the lens. The level of these properties which are appropriate will vary depending upon the intended lifetime and usage of the lens (e.g., single use daily disposable, multiple use monthly, etc). An ophthalmically acceptable contact lens can have an effective or appropriate ionoflux to substantially inhibit or substantially prevent corneal staining, such as corneal staining more severe than superficial or moderate corneal staining after continuous wear of the lens on a cornea for 8 or more hours. An ophthalmically acceptable contact lens can have a level of oxygen permeability sufficient to allow oxygen to reach the cornea of an eye wearing the lens in an amount sufficient for long term corneal health. An ophthalmically acceptable contact lens can be a lens which does not cause substantial or undue corneal swelling in an eye wearing the lens, for example, no more than about 5% or 10% corneal swelling after being worn on a cornea of an eye during an overnight sleep. An ophthalmically acceptable contact lens can be a lens which allows movement of the lens on the cornea of an eye wearing the lens sufficient to facilitate tear flow between the lens and the eye, in other words, does not cause the lens to adhere to the eye with sufficient force to prevent normal lens movement, and that has a low enough level of movement on the eye to allow vision correction. An ophthalmically acceptable contact lens can be a lens which allows wearing of the lens on the eye without undue or significant discomfort and/or irritation and/or pain. An ophthalmically acceptable contact lens can be a lens which inhibits or substantially prevents lipid and/or protein deposition sufficient to cause the lens wearer to remove the lens because of such deposits. An ophthalmically acceptable contact lens can have at least one of a water content, or a surface wettability, or a modulus or a design, or any combination thereof, that is effective to facilitate ophthalmically compatible wearing of the contact lens by a contact lens wearer at least for one day. Ophthalmically compatible wearing is understood to refer to the wearing of a lens by a lens wearer with little or no discomfort, and with little or no occurrence of corneal staining. Determining whether a contact lens is ophthalmically acceptable can be achieved using conventional clinical methods, such as those performed by an eye care practitioner, and as understood by persons of ordinary skill in the art.

In one example of the present disclosure, the contact lens can have ophthalmically acceptably wettable lens surfaces. For example, the contact lens can have the ophthalmically acceptably wettable lens surfaces when the polymerizable composition used to form the polymeric lens body is free of an internal wetting agent, or when the polymerizable composition used to form the polymeric lens body is free of an organic diluent, or when the polymeric lens body is extracted in water or an aqueous solution free of a volatile organic solvent, or when the polymeric lens body is free of a surface plasma treatment, or any combination thereof.

One approach commonly used in the art to increase the wettability of contact lens surfaces is to apply treatments to the lens surfaces or to modify the lens surfaces. In accordance with the present disclosure, the silicone hydrogel contact lenses can have ophthalmically acceptably wettable lens surfaces without the presence of a surface treatment or surface modification. Surface treatments include, for example, plasma and corona treatments which increase the hydrophilicity of the lens surface. While it is possible to apply one or more surface plasma treatments to the present lens bodies, it is not necessary to do so in order to obtain a silicone hydrogel contact lens having ophthalmically acceptably wettable lens surfaces when fully hydrated. In other words, in one example, the silicone hydrogel contact lenses of the present disclosure can be can be free of a surface plasma or corona treatment.

One example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; wherein the silicone hydrogel contact lens is free of a surface plasma or corona treatment.

One example of a method in accordance with the present disclosure is a method of manufacturing a silicone hydrogel contact lens, comprising: providing a polymerizable composition, said polymerizable composition comprising (a) at least one siloxane monomer; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package; wherein the silicone hydrogel contact lens is free of a surface plasma or corona treatment.

Surface modifications include binding wetting agents to the lens surface, such as, for example, binding a wetting agent such as a hydrophilic polymer to at least a lens surface by chemical bonding or another form of chemical interaction. In some cases, the wetting agent may be bound to the lens surface as well as a least a portion of the polymeric matrix of the lens, i.e., at least a portion of the bulk of the lens, by chemical bonding or another form of chemical interaction. The ophthalmically acceptably wettable lens surfaces of the present disclosure can be ophthalmically acceptably wettable without the presence of a wetting agent (e.g., a polymeric material or a non-polymeric material) bound to at least the lens surface. While it is possible to bind one or more wetting agents to the present lenses, it is not necessary to do so in order to obtain a silicone hydrogel contact lens having ophthalmically acceptably wettable lens surfaces when fully hydrated. Thus, in one example, the lenses of the present disclosure can comprise wetting agents, such as, for example, hydrophilic polymers and including polyvinyl pyrrolidone, bound to a surface of the lens. Alternatively, in another example, the silicone hydrogel contact lenses of the present disclosure can be free of a wetting agent bound to the lens surface.

Another method of increasing lens wettability is to physically entrap a wetting agent within the lens body or contact lens, such as by introducing the wetting agent into the lens body when the lens body is swollen, and then returning the lens body to a less swollen state, thereby entrapping a portion of a wetting agent within the lens body. The wetting agent can be permanently trapped within the lens body, or can be released from the lens over time, such as during wear. The ophthalmically acceptably wettable lens surfaces of the present disclosure can be ophthalmically acceptably wettable without the presence of a wetting agent (e.g., a polymeric material or a non-polymeric material) physically entrapped in the lens body following formation of the polymeric lens body. While it is possible to physically entrap one or more wetting agents in the present lenses, it is not necessary to do so in order to obtain a silicone hydrogel contact lens having ophthalmically acceptably wettable lens surfaces when fully hydrated. Thus, in one example, the lenses of the present disclosure can comprise wetting agents, such as, for example, hydrophilic polymers and including polyvinyl pyrrolidone, entrapped within the lenses. Alternatively, the hydrogel contact lenses of the present disclosure, for example the silicone hydrogel contact lenses of the present disclosure, can be free of a wetting agent physically entrapped within the lens. As used herein, physically entrapped refers to immobilizing a wetting agent, or other ingredient, in the polymeric matrix of the lens with little or no chemical bonding or chemical interaction being present between the wetting agent and or other ingredient and the polymeric matrix. This is in contrast to ingredients that are chemically bound to the polymeric matrix, such as by ionic bonds, covalent bonds, van der Waals forces, and the like.

Another approach commonly used in the art to increase the wettability hydrogel contact lenses, for example silicone hydrogel contact lenses, includes adding one or more wetting agents to the polymerizable composition. In one example, the wetting agent can be a polymeric wetting agent. However, the contact lenses of the present disclosure can have ophthalmically acceptably wettable lens surfaces when the polymerizable composition used to form the polymeric lens body is free of a wetting agent. While it is possible to include one or more wetting agents in the present polymerizable compositions to increase the wettability of the hydrogel contact lenses of the present disclosure, it is not necessary to do so in order to obtain a hydrogel contact lens having ophthalmically acceptably wettable lens surfaces. In other words, in one example, the hydrogel contact lenses of the present disclosure can be formed from polymerizable compositions free of wetting agents. Alternatively, in another example, the polymerizable compositions of the present invention can further comprise a wetting agent.

One example of a silicone hydrogel contact lens in accordance with the present disclosure is a silicone hydrogel contact lens, comprising: a polymeric lens body that is the reaction product of a polymerizable composition, said polymerizable composition comprising (a) at least one siloxane monomer; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; wherein the polymerizable composition is free of a pre-formed polymeric wetting agent.

One example of a method in accordance with the present disclosure is a method of manufacturing a silicone hydrogel contact lens, comprising: providing a polymerizable composition, said polymerizable composition comprising (a) at least one siloxane monomer; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; wherein the polymerizable composition is free of a pre-formed polymeric wetting agent; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

In one example, the wetting agent can be an internal wetting agent. The internal wetting agent can be bound within at least a portion of the polymeric matrix of the lens. For example, the internal wetting agent can be bound within at least a portion of the polymeric matrix of the lens by chemical bonding or another form of chemical interaction. In some cases, the wetting agent may be bound to the lens surface as well. The internal wetting agent can comprise a polymeric material or a non-polymeric material. While it is possible to bind one or more internal wetting agents within the polymeric matrix of the present lenses, it is not necessary to do so in order to obtain a hydrogel contact lens having ophthalmically acceptably wettable lens surfaces when fully hydrated. Thus, in one example, the lenses of the present disclosure can comprise internal wetting agents bound to at least a portion of the polymeric matrix of the lens. Alternatively, in another example, the hydrogel contact lenses of the present disclosure can be free of an internal wetting agent bound to at least a portion of the polymeric matrix of the lens.

In another example, the wetting agent can be an internal polymeric wetting agent. The internal polymeric wetting agent can be present in the polymeric lens body as part of an interpenetrating polymer network (IPN) or a semi-IPN. An interpenetrating polymer network is formed by at least two polymers, each of which is crosslinked to itself, but none of which are crosslinked to each other. Similarly, a semi-IPN is formed by at least two polymers, at least one of which is crosslinked to itself but not to the other polymer, and the other of which is not crosslinked either to itself or the other polymer. In one example of the present disclosure, the contact lens can have ophthalmically acceptably wettable lens surfaces when the polymeric lens body is free of an internal polymeric wetting agent present in the lens body as an IPN or a semi-IPN. Alternatively, the contact lens can comprise an internal polymeric wetting agent present in the lens body as an IPN or a semi-IPN.

In yet another example, the wetting agent can be a linking compound present in the polymerizable composition used to form the lens body, or a linking agent physically entrapped within the polymeric lens body after the lens body has been formed. When the wetting agent is a linking compound, after polymerization of the lens body or entrapment of the linking agent in the polymeric lens body, the linking compound can subsequently link a second wetting agent to the lens body when the lens body is contacted by the wetting agent. The linking can occur as part of the manufacturing process, for example as a washing process, or can take place when the lens body is contacted by a packaging solution. The linking can take the form of an ionic bond, or a covalent bond, or a form of van der Waals attraction. The linking agent can comprise a boronic acid moiety or group such that a polymerized boronic acid moiety or group is present in the polymeric lens body, or such that a boronic acid moiety or group is physically entrapped in the polymeric lens body. For example, when the linking agent comprises a form of boronic acid, the second wetting agent can comprise a form of poly(vinyl alcohol) which becomes bound to the form of boronic acid. Optionally, silicone hydrogel contact lenses of the present disclosure can be understood to be free of linking agents. In one example, the silicone hydrogel contact lenses can be free of boronic acid moieties or groups, including polymerized boronic acid moieties or groups, that is, specifically, the silicone hydrogel contact lenses can be formed from a polymerizable composition free of a form of boronic acid such as, for example, a polymerizable form of boronic acid including vinyl phenyl boronic acid (VPB), can be formed of a polymer free of units derived from a polymerizable form of boronic acid such as vinyl phenyl boronic acid (VPB), and the polymeric lens body and the silicone hydrogel contact lenses can be free of a form of boronic acid, including polymeric or non-polymeric form of boronic acid, physically entrapped therein. Alternatively, the polymerizable composition, or the polymeric lens body, or the hydrogel contact lens, or any combination thereof, can comprise at least one linking agent.

In addition to including wetting agents in the polymerizable composition and modifying the lens surfaces, washing polymeric lens bodies in volatile organic solvents or aqueous solutions of volatile organic solvent has been used to increase the wettability of lens surfaces, particularly silicone hydrogel contact lens surfaces. While it is possible to wash the present polymeric lens bodies in a volatile organic solvent or an aqueous solution of a volatile organic solvent, in accordance with the present disclosure, it is not necessary to do so in order to obtain a hydrogel contact lens having ophthalmically acceptably wettable lens surfaces when fully hydrated. In other words, in one example, the hydrogel contact lenses of the present invention have not been exposed to a volatile organic solvent, including a solution of a volatile organic solvent, as part of a manufacturing process. In one example, the hydrogel contact lenses of the present invention can be formed from a polymerizable composition free of a wetting agent, or the polymeric lens body and/or hydrated contact lens can be free of a wetting agent, or free of surface treatment, or free of a surface modification, or was not exposed to a volatile organic solvent during the manufacturing process, or any combination thereof. For example, the hydrogel contact lenses can be washed in washing liquid free of a volatile organic solvent, such as, for example, water or an aqueous solution free of a volatile organic solvent, including a liquid free of a volatile lower alcohol.

The use of volatile organic solvents to extract lens bodies contributes significantly to production costs, due to factors such as the cost of the organic solvents, the cost of disposal of the solvents, the need to employ explosion-proof production equipment, the need to remove the solvents from the lenses prior to packaging, and the like. However, development of polymerizable compositions capable of consistently producing contact lenses with ophthalmically acceptably wettable lens surfaces when extracted in aqueous liquids free of volatile organic solvents can be challenging. For example, it is common to find non-wetting regions present on the lens surfaces of contact lenses which have been extracted in aqueous liquids free of volatile organic solvents.

One example of a method in accordance with the present disclosure is a method of manufacturing a silicone hydrogel contact lens, comprising: providing a polymerizable composition, said polymerizable composition comprising (a) at least one siloxane monomer; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid free of a volatile organic solvent to remove extractable material from the polymeric contact lens body; and packaging the polymeric contact lens body in a contact lens packaging solution in a contact lens package.

Another example of a method in accordance with the present disclosure is a method of manufacturing a silicone hydrogel contact lens, comprising: providing a polymerizable composition, said polymerizable composition comprising (a) at least one siloxane monomer; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package; wherein the silicone hydrogel contact lens has not been contacted by a volatile organic solvent during its manufacturing process.

Alternatively, another example of a method in accordance with the present disclosure is a method of manufacturing a silicone hydrogel contact lens, comprising: providing a polymerizable composition, said polymerizable composition comprising (a) at least one siloxane monomer; and (b) at least one hydrophobic ethylene glycol methyl ether methacrylate-containing monomer, or at least one hydrophilic vinyl ether-containing monomer, or both; wherein, when the at least one hydrophobic ethylene glycol methyl ether methacrylate-containing monomer is present in the polymerizable composition, it is present in an amount of from 1 to 20 unit parts by weight, and when the at least one hydrophilic vinyl ether-containing monomer is present in the polymerizable composition, it is present in an amount of from 1 to 20 unit parts by weight; polymerizing the polymerizable composition in a contact lens mold assembly to form a polymeric contact lens body; contacting the polymeric contact lens body with a washing liquid comprising a volatile organic solvent to remove extractable material from the polymeric contact lens body; and packaging the polymeric contact lens body in a contact lens packaging solution in a contact lens package.

As previously discussed, in one example of the present disclosure, the contact lenses are contact lenses which have not been exposed to a volatile organic solvent, such as a lower alcohol, during their manufacture. In other words, the washing, extraction and hydration liquid used for such lenses, as well as all liquids used during wet demolding, or wet delensing, or washing, or any other manufacturing step, are all free of volatile organic solvents. In one example, the polymerizable composition used to form these lenses which are not contacted by a volatile organic solvent can comprise a hydrophilic vinyl-containing monomer or monomer component, such as, for example, a hydrophilic vinyl ether-containing monomer. The vinyl-containing hydrophilic monomer or monomer component can include, for example, VMA. The hydrophilic vinyl ether-containing monomers can include, for example, BVE, or EGVE, or DEGVE, or any combination thereof. In one particular example, the hydrophilic vinyl ether-containing monomer can be a hydrophilic vinyl ether-containing monomer which is more hydrophilic than BVE, such as, for example, DEGVE. In another example, the hydrophilic monomer component of the polymerizable composition can be a mixture of a first hydrophilic monomer which is a vinyl-containing monomer but which is not a hydrophilic vinyl ether-containing monomer, and a second hydrophilic monomer which is a hydrophilic vinyl ether-containing monomer. Such mixtures include, for example, mixtures of VMA and one or more vinyl ethers such as, for example, BVE, or DEGVE, or EGVE, or any combination thereof.

When present, the hydrophilic vinyl ether-containing monomer or monomer component can be present in the polymerizable composition in an amount from about 1 to about 15 unit parts, or from about 3 to about 10 unit parts. When present as a mixture with a hydrophilic vinyl-containing monomer which is not a vinyl ether, the portion of the hydrophilic vinyl-containing monomer or monomer component which is not a vinyl ether and the hydrophilic vinyl ether-containing monomer or monomer component can be present in the polymerizable composition in a ratio of at least 3:1, or from about 3:1 to about 15:1, or of about 4:1 based on the ratio of the unit parts by weight of the hydrophilic vinyl-containing monomer or monomer component which is not a vinyl ether to the unit parts by weight of the hydrophilic vinyl ether-containing monomer or monomer component.

Another approach for producing contact lenses having ophthalmically acceptably wettable lens surfaces in accordance with the present disclosure, particularly lenses extracted in a liquid free of a volatile organic solvent and including lenses which are not contacted by a volatile organic solvent during manufacturing, can be to limit the amount of a vinyl-containing cross-linking agent or cross-linking agent component included in the polymerizable composition. For example, a vinyl-containing cross-linking agent or cross-linking agent component can be present in the polymerizable composition in an amount from about 0.01 to about 0.80 unit parts, or from 0.01 to about 0.30 unit parts, or from about 0.05 to about 0.20 unit parts, or in an amount of about 0.1 unit parts. In one example, a vinyl-containing cross-linking agent or cross-linking agent component can be present in the polymerizable composition in an amount effective to produce a contact lens having improved wettability as compared to a contact lens produced from the same polymerizable composition but having an amount of the vinyl-containing cross-linking agent or cross-linking agent component greater than about 2.0 unit parts, or greater than 1.0 unit parts, or greater than about 0.8 unit parts, or greater than about 0.5 unit parts, or greater than about 0.3 unit parts.

While limiting the amount of the vinyl-containing cross-linking agent or cross-linking agent component can improve wettability, in one example, the inclusion of a vinyl-containing cross-linking agent or cross-linking agent component in the polymerizable composition can improve the dimensional stability of the resulting contact lens formed from the polymerizable composition. Thus, in some polymerizable compositions, a vinyl-containing cross-linking agent or cross-linking agent component can be present in the polymerizable in an amount effective to produce a contact lens having improved dimensional stability as compared to a contact lens produced from the same polymerizable composition but without the vinyl-containing cross-linking agent or cross-linking agent component.

Yet another approach for producing contact lenses having ophthalmically acceptably wettable surfaces in accordance with the present disclosure, particularly lenses washed in a liquid free of a volatile organic solvent, can be to include an amount of a vinyl-containing cross-linking agent or cross-linking agent component in the polymerizable composition based on the ratio of the unit parts by weight of the hydrophilic vinyl-containing monomer or monomer component present in the composition to the unit parts by weight of the vinyl-containing cross-linking agent or cross-linking agent component present in the composition. For example, the total unit parts of the hydrophilic vinyl-containing monomer or monomer component and the total unit parts of the vinyl-containing cross-linking agent or cross-linking agent component can be present in the polymerizable composition in a ratio greater than about 125:1, or from about 150:1 to about 625:1, or from about 200:1 to about 600:1, or from about 250:1 to about 500:1, or from about 450:1 to about 500:1, based on the ratio of the unit parts by weight of all the hydrophilic vinyl-containing monomers present in the polymerizable composition to the total unit parts by weight of all the vinyl-containing cross-linking agents present in the polymerizable composition.

In one example, the contact lenses of the present disclosure are ophthalmically compatible silicone hydrogel contact lenses. Many different criteria can be evaluated to determine whether or not a contact lens is ophthalmically compatible, as will be discussed later. In one example, ophthalmically acceptable contact lenses have ophthalmically acceptably wettable surfaces when fully hydrated. A silicone hydrogel contact lens having an ophthalmically acceptably wettable surfaces can be understood to refer to a silicone hydrogel contact lens that does not adversely affect the tear film of a lens wearer's eye to a degree that results in the lens wearer experiencing or reporting discomfort associated with placing or wearing the silicone hydrogel contact lens on an eye.

An example of the disclosed polymerizable composition can be miscible when initially prepared, and can remain miscible over a period of time adequate for the commercial manufacture of contact lenses, such as, for example, for about 2 weeks, or about 1 week, or about 5 days. Typically, when polymerized and processed into contact lenses, miscible polymerizable compositions result in contact lenses having ophthalmically acceptable clarities.

Approaches commonly employed to increase the miscibility of hydrophilic monomers and less hydrophilic or relatively hydrophobic monomers, including siloxane monomers, include adding organic diluents to the polymerizable composition to act as compatiblizers between the more hydrophilic monomers and the less hydrophilic monomers. For example, siloxane monomers which typically are more hydrophobic. Also, when using siloxane monomers, using only siloxane monomers having low molecular weights (e.g., molecular weights below 2500 daltons) can also increase the miscibility. In one example where the polymerizable composition comprises a first siloxane and a second siloxane monomer, the use of a first siloxane of formula (6) as described herein makes it possible to both include both an optional high molecular weight second siloxane and a high level of the at least one hydrophilic monomer in the polymerizable compositions of the present disclosure. And while it is possible to include one or more organic diluents in the present polymerizable compositions disclosed herein, it may not be necessary to do so in order to obtain a miscible polymerizable composition in accordance with the present disclosure. In other words, in one example, the hydrogel contact lenses of the present disclosure are formed from polymerizable compositions which are free of an organic diluent.

The present hydrogel contact lenses may be provided in a sealed package. For example, the present hydrogel contact lenses may be provided in sealed blister packs or other similar containers suitable for delivery to lens wearers. The lenses may be stored in an aqueous solution, such as a saline solution, within the package. Some suitable solutions include phosphate buffered saline solutions and borate buffered solutions. The solutions may include a disinfecting agent if desired, or may be free of a disinfecting or preservative agent. The solutions may also include a surfactant, such as a poloxamer and the like, if desired.

The lenses in the sealed packages are preferably sterile. For example, the lenses can be sterilized prior to sealing the package or can be sterilized in the sealed package. The sterilized lenses may be lenses that have been exposed to sterilizing amounts of radiation. For example, the lenses may be autoclaved lenses, gamma radiated lenses, ultraviolet radiation exposed lenses, and the like.

With respect to the contact lens package, the package can further comprise a base member with a cavity configured to hold the contact lens body and the packaging solution, and a seal attached to the base member configured to maintain the contact lens and the packaging solution in a sterile condition for a duration of time equivalent to a shelf life of the contact lens.

Certain specific examples of silicone hydrogel contact lenses will now be described, in accordance with the present teachings.

As one example (example A), a silicone hydrogel contact lens comprises a polymeric lens body that is the reaction product of a polymerizable composition comprising at least one siloxane monomer and at least one hydrophobic ethylene glycol methyl ether methacrylate-containing monomer. In one example, the at least one siloxane monomer comprises or consists of a first siloxane monomer represented by formula (3), wherein m of formula (3) represents one integer from 3 to 10, n of formula (3) represents one integer from 1 to 10, $R^1$ is an alkyl group having from 1 to 4 carbon atoms, and each $R^2$ of formula (3) is independently either a hydrogen atom or a methyl group. In another example, the at least one hydrophobic ethylene glycol methyl ether methacrylate-containing monomer comprises or consists of EGMA.

One example of a silicone hydrogel contact lens in accordance with example (A) is a silicone hydrogel contact lens, comprising: a polymeric lens body that is the reaction product of a polymerizable composition, said polymerizable composition comprising (a) at least one siloxane monomer; and (b) at least one hydrophobic ethylene glycol methyl ether methacrylate-containing monomer, wherein the at least one hydrophobic ethylene glycol methyl ether methacrylate-containing monomer is present in the polymerizable composition in an amount of from 1 to 20 unit parts by weight.

One example of a method in accordance with example (A) is a method of manufacturing a silicone hydrogel contact lens, comprising: providing a polymerizable composition, said polymerizable composition comprising (a) at least one siloxane monomer; and (b) at least one hydrophobic ethylene glycol methyl ether methacrylate-containing monomer, wherein the at least one hydrophobic ethylene glycol methyl ether methacrylate-containing monomer is present in the polymerizable composition in an amount of from 1 to 20 unit parts by weight; polymerizing the polymerizable composition in a contact lens mold assembly to form a polymeric contact lens body; contacting the polymeric contact lens body with a washing liquid to remove extractable material from the polymeric contact lens body; and packaging the polymeric contact lens body in a contact lens packaging solution in a contact lens package.

As a second example (example B), a silicone hydrogel contact lens comprises a polymeric lens body that is the reaction product of a polymerizable composition as described in example A, and wherein the polymerizable composition further comprises at least one hydrophilic vinyl ether-containing monomer. In one example, the at least one hydrophilic vinyl ether-containing monomer is present in the polymerizable composition in an amount from about 1 to about 20 unit parts by weight.

As a third example (example C), a silicone hydrogel contact lens comprises a polymeric lens body that is the reaction product of a polymerizable composition as described in example A or B, and wherein the polymerizable composition further comprises a second hydrophobic monomer or monomer component, wherein the second hydrophilic monomer or monomer component is not an ethylene glycol methyl ether methacrylate-containing monomer. For example, the hydrophilic monomer can comprise or consist of methyl methacrylate (MMA).

As a fourth example (example D), a silicone hydrogel contact lens comprises a polymeric lens body that is the reaction product of a polymerizable composition as described in example A or B or C, and wherein the polymerizable composition further comprises a vinyl-containing cross-linking agent or cross-linking agent component. In one example, the cross-linking agent or cross-linking agent component can comprise or consist of a vinyl ether-containing cross-linking agent or cross-linking agent component, specifically the cross-linking agent or cross-linking agent component can comprise or consist of triethylene glycol divinyl ether (TEGVE).

As a fifth example (example E), a silicone hydrogel contact lens comprises a polymeric lens body that is the reaction product of a polymerizable composition as described in example A or B or C or D, and wherein the polymerizable composition further comprises a thermal initiator or thermal initiator component.

As a sixth example (example F), a silicone hydrogel contact lens comprises a polymeric lens body that is the reaction product of a polymerizable composition as described in example A or B or C or D or E, and wherein the polymerizable composition further comprises a second hydrophilic monomer or monomer component, wherein the second hydrophilic monomer or monomer component is not a vinyl ether-containing monomer. In one example, the second hydrophilic monomer can comprise a hydrophilic amide-containing monomer.

As a seventh example (example G), a silicone hydrogel contact lens comprises a polymeric lens body that is the reaction product of a polymerizable composition as described in example A or B or C or D or E or F, and wherein the polymerizable composition further comprises a UV absorbing agent or UV absorbing agent component.

As a eighth example (example H), a silicone hydrogel contact lens comprises a polymeric lens body that is the reaction product of a polymerizable composition as described in example A or B or C or D or E or F or G, and wherein the polymerizable composition further comprises a tinting agent or tinting agent component.

As an ninth example (example I), a silicone hydrogel contact lens comprises a polymeric lens body that is the reaction product of a polymerizable composition as described in example A or B or C or D or E or F or G or H, and wherein the polymerizable composition comprises a siloxane monomer represented by formula (2), wherein $R_1$ of formula (2) is selected from either hydrogen atom or a methyl group; $R_2$ of formula (2) is selected from either of hydrogen or a hydrocarbon group having 1 to 4 carbon atoms; m of formula (2) represents an integer of from 0 to 10; n of formula (2) represents an integer of from 4 to 100; a and b represent integers of 1 or more; a+b is equal to 20-500; b/(a+b) is equal to 0.01-0.22; and the configuration of siloxane units includes a random configuration. As one example, the siloxane monomer can be represented by formula (2), wherein m of formula (2) is 0, n of formula (2) is one integer from 5 to 10, a is one integer from 65 to 90, b is one integer from 1 to 10, $R_1$ of formula (2) is a methyl group, and $R_2$ of formula (2) is either a hydrogen atom or a hydrocarbon group having 1 to 4 carbon atoms.

As a tenth example (example J), a silicone hydrogel contact lens comprises a polymeric lens body that is the reaction product of a polymerizable composition as described in example A or B or C or D or E or F or G or H or I, and wherein the polymerizable composition further comprises a methacrylate-containing cross-linking agent or cross-linking agent component, specifically the cross-linking agent or agent component can comprise or consist of ethylene glycol dimethacrylate (EGDMA). In this example, when the polymerizable composition also comprises a vinyl ether-containing cross-linking agent as part of the cross-linking agent component, specifically the cross-linking agent component can comprise or consist of triethylene glycol divinyl ether (TEGDVE) in combination with a methacrylate-containing cross-linking agent, which can specifically comprise or consist of ethylene glycol dimethacrylate (EGDMA). In this example, it can be appreciated that the polymerizable composition comprises two cross-linking agents, each having different reactivity ratios, i.e., the polymerizable composition comprises a cross-linking agent component comprising or consisting of a vinyl-containing cross-linking agent and a methacrylate-containing cross-linking agent, the methacrylate-containing cross-linking agent having polymerizable functional groups which are more reactive and which thus react at a faster rate than the vinyl polymerizable functional groups present in the vinyl-containing cross-linking agent.

As an eleventh example (example K), a silicone hydrogel contact lens comprises a polymeric lens body that is the reaction product of a polymerizable composition as described in example A or B or C or D or E or F or G or H or I or J, and wherein the polymerizable composition further comprises a chain transfer agent or chain transfer agent component which can specifically comprise or consist of allyloxy ethanol (AE).

As a twelfth example (example L), a silicone hydrogel contact lens comprises a polymeric lens body that is the reaction product of a polymerizable composition as described in example A or B or C or D or E or F or G or H or I or J or K, and wherein the at least one hydrophilic vinyl ether-containing monomer comprises or consists of 1,4-butanediol vinyl ether (BVE), or ethylene glycol vinyl ether (EGVE), or diethylene glycol vinyl ether (DEGVE), or any combination thereof.

As a thirteenth example (example M), a silicone hydrogel contact lens comprises a polymeric lens body that is the reaction product of a polymerizable composition as described in example A or B or C or D or E or F or G or H or I or J or K or L, wherein the contact lens has the ophthalmically acceptably wettable lens surfaces when the polymerizable composition used to form the lens is free of an internal wetting agent, or when the polymerizable composition used to form the polymeric lens body is free of an organic diluent, or when the polymeric lens body is extracted in a liquid free of a volatile organic solvent, or when the lens is free of a surface plasma treatment, or any combination thereof.

In any or each of the foregoing examples A-M, as well as any or all other examples disclosed herein, when the at least one siloxane monomer comprises a siloxane monomer component composed of a first siloxane monomer and a second siloxane monomer, the amount of the first siloxane monomer can be from 20 to 45 unit parts of the polymerizable composition. The amount of the first siloxane monomer can be from 25 to 40 unit parts of the polymerizable composition. The amount of the first siloxane monomer can be from 27 to 35 unit parts of the polymerizable composition.

In any or each of the foregoing examples A-M, as well as any or all other examples disclosed herein, when the at least one siloxane monomer comprises a siloxane monomer component composed of a first siloxane monomer and a second siloxane monomer, the amount of the second siloxane monomer can be from 1 to 20 unit parts of the polymerizable composition. The amount of the second siloxane monomer can be from 2 to 15 unit parts of the polymerizable composition. The amount of the second siloxane monomer can be from 5 to 13 unit parts of the polymerizable composition. In another example, the ratio of the unit parts of the first siloxane monomer to the second siloxane can be at least 1:1, or at least 2:1, or at least 4:1, or about 4:1.

In any or each of the foregoing examples A-M, as well as any or all other examples disclosed herein, the amount of the optional hydrophilic non-vinyl ether-containing monomer or monomer component present in the polymerizable composition can be from 1 to 60 unit parts of the polymerizable composition. The hydrophilic non-vinyl ether-containing monomer component can constitute from 4 to 60 unit parts of the polymerizable composition. When the hydrophilic non-vinyl ether-containing monomer comprises or consists of VMA, it can be present in an amount from 30 unit parts to 60 unit parts. VMA can be present in the polymerizable composition in an amount from about 40 unit parts to about 50 unit parts. When the hydrophilic non-vinyl ether-containing monomers, N,N-dimethylacrylamide (DMA), 2-hydroxyethyl methacrylate (HEMA), or 2-hydroxylbutyl methacrylate (HOB), or any combination thereof are present in the polymerizable composition as the hydrophilic non-vinyl ether-containing monomer, each or all can be present in amounts from about 3 to about 10 unit parts.

In any or each of the foregoing examples A-M as well as any or all other examples disclosed herein, the amount of the hydrophobic non-ethylene glycol methyl ether methacrylate-containing monomer or monomer component present in the polymerizable composition can be from 1 to 30 unit parts of the polymerizable composition. For example, the total amount of hydrophobic non-ethylene glycol methyl ether methacrylate-containing monomer or monomer component can be from about 5 to about 20 unit parts of the polymerizable composition. In polymerizable compositions in which the hydrophobic non-ethylene glycol methyl ether methacrylate-containing monomer MMA is present as the hydrophobic non-ethylene glycol methyl ether methacrylate-containing monomer or as part of the hydrophobic monomer component, the MMA can be present in an amount from about 5 to about 20 unit parts, or from about 8 to about 15 unit parts.

In any or each of the foregoing examples A-M, as well as any or all other examples disclosed herein, the amount of the cross-linking agent or cross-linking agent component present in the polymerizable composition can be from 0.01 to 4 unit parts of the polymerizable composition. TEGDVE can be present in amounts from 0.01 to 1.0 unit parts. EGDMA can be present in amounts from 0.01 to 1.0 unit parts. TEGDMA can be present in amounts from 0.1 to 2.0 unit parts. Each of these non-silicon cross-linking agents can be present alone or in any combination in the polymerizable composition.

In any or each of the foregoing examples A-M as well as any or all other examples disclosed herein, when the polymerizable composition contains EGMA, BVE, DEGVE, EGVE, or any combination thereof, as a hydrophilic vinyl ether-containing monomer or as part of a hydrophilic vinyl ether-containing monomer component, they can each be present in amounts from 1 unit part to 20 unit parts of the polymerizable composition. EGMA can be present in an amount from about 2 unit parts to about 15 unit parts. BVE can be present in an amount from 1 unit part to about 15 unit parts. BVE can be present in an amount from about 3 unit parts to about 7 unit parts. DEGVE can be present in an amount from 1 unit part to about 15 unit parts. DEGVE can be present in an amount from about 7 unit parts to about 10 unit parts. EGVE can be present in an amount from 1 unit part to about 15 unit parts, or in an amount from about 3 unit parts to about 7 unit parts.

In any or each of the foregoing examples A-M, as well as any or all other examples disclosed herein, the other optional components, such as initiators or initiator component, tinting agents or tinting agent components, UV absorbing agents or UV absorbing agent components, oxygen scavengers or oxygen scavenger components, or chain transfer agents or chain transfer agent components, can each be present in amounts from about 0.01 unit parts to about 3 unit parts. An initiator or initiator component can be present in the polymerizable in an amount from 0.1 unit parts to 1.0 unit parts. When a thermal initiator or thermal initiator component is present, such as Vazo-64, it can be present in an amount from about 0.3 to about 0.5 unit parts. Tinting agents or tinting agent components can be present in amounts from 0.01 unit parts to 1 unit part. When reactive dyes are used as tinting agents or as part of a tinting agent component, such as Reactive Blue 246 or Reactive Blue 247, they can each be present in amounts of about 0.01 unit parts. UV absorbing agents or UV absorbing agent components can be present in amounts from 0.1 unit parts to 2.0 unit parts. For example, the UV absorbing agent UV1 described in the Examples 1-28 herein can be present in an amount from about 0.8 to about 1.0 unit parts, such as 0.9 unit parts; or the UV absorbing agent UV2 described in the Examples 1-28 herein, can be present in an amount from 0.5 unit parts to 2.5 unit parts, such as from about 0.9 unit parts to about 2.1 unit parts. Oxygen scavengers or oxygen scavenger components can be present in amounts from 0.1 unit parts to 1.0 unit parts. As an example, when triphenyl phosphine (TPP) or diphenyl(P-vinylphenyl)phosphine (pTPP) or any combination thereof is used as an oxygen scavenger or oxygen scavenger component in the polymerizable composition, each or the combination can be present in an amount from 0.3 unit parts to 0.7 unit parts, such as about 0.5 unit parts. Chain transfer reagents or chain transfer reagent components can be present in the polymerizable composition in an amount from 0.1 unit parts to 2.0 unit parts, and in many of Examples 1-28 herein is present in an amount from 0.2 unit parts to 1.6 unit parts. For example, the chain transfer reagent allyloxy ethanol (AE) can be present in an amount from about 0.3 to about 1.4 unit parts.

In any or each of the foregoing examples A-M, as well as any or all other examples disclosed herein, the silicone hydrogel contact lenses can be free of a wetting agent that is present in the polymerizable composition, or in the polymeric lens body, or in the silicone hydrogel contact lens. Similarly, the silicone hydrogel contact lens can have lens surfaces that are free of a surface treatment or a surface modification. However, in another example, the silicone hydrogel contact lens can include at least one wetting agent (i.e., a single wetting agent or two or more wetting agents present as a wetting agent component) in the polymerizable composition, in the polymeric lens body, or in the silicone hydrogel contact lens. The silicone hydrogel contact lens can have treated or modified lens surfaces. In addition or alternatively, any or each of the foregoing examples A-M, as well as any or all other examples of silicone hydrogel contact lenses disclosed herein, the contact lenses can be understood to be free of a linking agent such as, for example, a form of boronic acid.

In another example, new polymerizable compositions are provided, including each and every polymerizable composition described herein in reference to the silicone hydrogel contact lenses and methods. The polymerizable compositions can be diluent-free in that they do not contain an organic solvent, such as alcohols and the like, which can help reduce phase separation of the polymerizable composition. However, such diluent-free polymerizable compositions can still contain one or more chain transfer agents, such as allyloxy ethanol. However, if desired, the polymerizable composition can include a diluent or a diluent component, which can be present in an amount from 1 to 20 unit parts.

As described herein, the present silicone hydrogel contact lenses which comprise polymeric lens bodies that comprise units derived from at least one siloxane monomer and at least one hydrophilic monomer; when fully hydrated, have an average equilibrium water content (EWC) from about 30% wt/wt to about 70% wt/wt, or an average oxygen permeability of at least 55 barrers, or an average captive bubble dynamic advancing contact angle less than 70 degrees, or an average captive bubble static contact angle less than 55 degrees, or any combination thereof, based on averages of values determined for at least 20 individual lenses of the batch. Thus, the present disclosure also relates to a batch of silicone hydrogel contact lenses.

As used herein, a batch of silicone hydrogel contact lenses refers to a group of two or more silicone hydrogel contact lenses, and frequently, a batch refers to at least 10, or at least 100, or at least 1,000 silicone hydrogel contact lenses. In accordance with the present disclosure, a batch of silicone hydrogel contact lenses comprises a plurality of any of the silicone hydrogel contact lenses described herein.

As used herein, a batch of hydrogel contact lenses refers to a group of two or more hydrogel contact lenses, and frequently, a batch refers to at least 10, or at least 100, or at least 1,000 hydrogel contact lenses. In accordance with the present disclosure, a batch of hydrogel contact lenses comprises a plurality of any of the hydrogel contact lenses described herein.

In one example, the hydrogel contact lenses of the batch can have an average axial edge lift (AEL) variance based on averaging the AEL measurements of a representative number of lenses from the batch at different time points. For a batch of lenses, an average AEL variance of less than plus or minus one hundred percent (±100%), or of less than plus or minus fifty percent (±50%), or of less than twenty percent (±20%) over a time period from two weeks to seven years at room temperature or, when stored under accelerated shelf life testing conditions, for a period of time and temperature equivalent to storage from two weeks to seven years at room temperature, may be considered to be acceptable. In one example, accelerated shelf life testing conditions which are especially useful in determining average AEL variance are for 4 weeks at 70 degrees C., although other periods of time and temperature can be used. The average AEL variance is determined by averaging the AEL values for each of the representative lenses using the actual AEL measurements of the representative lenses before ($AEL_{Initial}$) and following ($AEL_{Final}$) storage at room temperature or under accelerated shelf life conditions. The average AEL variability is determined using the following equation (C):

$$((AEL_{Final} - AEL_{Initial})/AEL_{Initial}) \times 100 \qquad (C).$$

On average, the AELs of the hydrogel contact lenses of the batch vary by less than twenty percent in either direction of a target value, or less than ten percent in either direction of a target value, or less than five percent in either direction of a target value. As one example, if a contact lens has a target AEL of 20 µm±50%, the present batch of hydrogel contact lenses will have an average AEL from 10 µm to 30 µm over the course of the shelf life study. A representative number of lenses tested from the batch can be 20 or more individual lenses.

In accelerated shelf life studies, the lens properties such as AEL or color value can be determined for contact lenses that were stored for a period of time at an elevated temperature, such as above 40 degrees C., such as 50 degrees C., or 55 degrees C., or 65 degrees C., or 70 degrees C., or 80 degrees C., or 95 degrees C., and the like. Or, the lens properties can be determined for contact lenses that were stored for a period of time at room temperature (e.g., about 20-25 degrees C.).

For accelerated shelf life studies, the following formula (D) can be used to determine the number of months of storage at a particular temperature that are equivalent to storage of the desired length of time at room temperature:

$$\text{Desired shelf life} = [N \times 2y] + n \qquad (D)$$

where
N=number of months of storage under accelerated conditions
2y=acceleration factor
y=2.0 for each 10° C. above room temperature (25° C.), for storage at or above 45° C.
y=1.0 for each 10° C. above room temperature (25° C.), for storage from 35° C. to 45° C.
n=age of lenses (in months) at start of the study Based on this equation, the following storage times have been calculated: 6 months of storage at 35 degrees C. is equivalent to 1 year aging at 25 degrees C., 3 months of storage at 45 degrees C. is equivalent to 1 year of aging at 25 degrees C., 3 months of storage at 55 degrees C. is equivalent to 2 years of aging at 25 degrees C., and 3 months of storage at 65 degrees C. is equivalent to 4 years of aging at 25 degrees C.

In one example, the batch comprises a batch of silicone hydrogel contact lenses comprising a plurality of the silicone hydrogel contact lenses in accordance with the present disclosure, wherein the batch of silicone hydrogel contact lenses has at least two average values selected from an average oxygen permeability of at least 55 barrers, an average tensile modulus from about 0.2 MPa to about 0.9 MPa when fully hydrated, and an average EWC from about 30% wt/wt to about 70% wt/wt; based on averages of values determined for at least 20 individual lenses of the batch.

In one example, when initially tested shortly after manufacturing and then tested again at a later time point, a batch of lenses can exhibit a change in its average physical dimensions. As batches of lenses in accordance with the present disclosure are dimensionally stable, they can exhibit an acceptable level of change in their average physical dimensions. As used herein, dimensional stability variance is understood to refer to a variance in a value of a physical dimension between a value of the physical dimension determined when the batch of lenses is initially tested shortly after its manufacture, and the value of the physical dimension determined when the batch of lenses is tested again at a later time point. The later time point can be, for example, from at least 2 weeks after the initial time point, to up to 7 years after the initial time point. The silicone hydrogel contact lenses of the batch have an average dimensional stability variance of less than plus or minus three percent (±3.0%) based on averaging the lens diameter measurements of a representative number of lenses from the batch, such as, for example, 20 lenses from the batch. For a batch of lenses, an average dimensional stability variance of less than plus or minus three percent (±3.0%), where the average dimensional stability variance is the variance in a value of a physical dimension when measured at an initial time point within one day of a manufacturing date of the batch of lenses, and at a second time point, where the second time point is from two weeks to seven years after the initial time point when the batch is stored at room temperature, or, when the batch is stored at a higher temperature (i.e., under accelerated shelf life testing conditions), the second time point is a time point representative of storage of the batch from two weeks to seven years at room temperature, is considered to be a dimensionally stable batch. In one example, accelerated shelf life testing conditions which are especially useful in determining average dimensional stability variance are for 4 weeks at 70 degrees C., although other periods of time and other temperatures can be used. The average dimensional stability variance is determined by averaging the individual dimensional stability variances for each of the representative lenses using the actual diameters of representative lenses measured initially ($Diameter_{original}$) and the actual diameters of representative lenses measured following (Diameter$_{Final}$) storage at room temperature or under accelerated shelf life conditions. The representative lenses measured initially and the representative lenses measured following storage can be the same lenses or can be different lenses. As used herein, the average dimensional stability variance is represented as a percent (%). The individual dimensional stability variances are determined using the following equation (E):

$$((\text{Diameter}_{Final} - \text{Diameter}_{Original}) / \text{Diameter}_{Original}) \times 100 \quad (E).$$

On average, the diameters of the silicone hydrogel contact lenses of the batch vary by less than three percent in either direction of a target value (±3.0%). As one example, if a contact lens has a target diameter (chord diameter) of 14.20 mm, the present batch of silicone hydrogel contact lenses will have an average diameter (average of the population in the batch) from 13.77 mm to 14.63 mm. In one example, the dimensional stability variance is less than plus or minus two percent (±2.0%). As one example, if a contact lens has a target diameter (chord diameter) of 14.20 mm, the present batch of silicone hydrogel contact lenses will have an average diameter (average of the population in the batch) from 13.92 mm to 14.48 mm. Preferably, the average diameter of the batch of silicone hydrogel contact lenses does not vary by more than plus or minus 0.20 mm from the target diameter, which is commonly from 13.00 mm to 15.00 mm.

In accelerated shelf life studies, the average dimensional stability variance can be determined for contact lenses that were stored for a period of time at an elevated temperature, such as above 40 degrees C., including, for example, 50 degrees C., or 55 degrees C., or 65 degrees C., or 70 degrees C., or 80 degrees C., or 95 degrees C., and the like. Or, the average dimensional stability can be determined for contact lenses that were stored for a period of time at room temperature (e.g., about 20-25 degrees C.).

Another example of the present disclosure provides methods of manufacturing hydrogel contact lenses. In accordance with the present teachings, the method comprises providing a polymerizable composition.

The method can also comprise a step of polymerizing the polymerizable composition to form a polymeric lens body. The step of polymerizing the polymerizable composition can be conducted in a contact lens mold assembly. The polymerizable composition can be cast molded between molds formed of a thermoplastic polymer. The thermoplastic polymer used to form the molding surfaces of the mold can comprise a polar polymer, or can comprise a non-polar polymer. Alternatively, the polymerizable composition can be formed into a lens via various methods known to those of ordinary skill in the art, such as spin casting, injection molding, forming a polymerized rod that is subsequently lathed to form a lens body, etc.

The polymerization of the polymerizable composition can be initiated thermally or using light, such as using ultra-violet (UV) light. In some examples, the polymerization can be conducted in an atmosphere comprising air, or in an inert atmosphere.

The method can also comprise contacting the polymeric lens body with a washing liquid to remove extractable material, such as unreacted monomers, uncross-linked materials that are otherwise not physically immobilized in the polymeric lens body, diluents, and the like. The washing liquid can be a liquid free of a volatile organic solvent, or can comprise a volatile organic solvent (e.g., can be a volatile organic solvent or a solution of a volatile organic solvent).

As previously discussed, the washing liquid can be water or an aqueous solution free of a volatile organic solvent, or can be an organic solvent or a solution of an organic solvent. Alternatively, in some examples, the method does not comprise a step of contacting the polymeric lens body with a washing liquid or any liquid, i.e., where the polymeric lens body is not contacted with any liquid prior to being placed into a blister package with packaging solution and sealed. The method can be a method not comprising a washing step involving the use of a washing liquid comprising a volatile organic solvent, i.e., where the polymeric lens body is contacted by a washing liquid, but is not contacted with a washing liquid comprising a volatile organic solvent, and is not contacted by a volatile organic solvent prior to being placed into a blister package with packaging solution and sealed.

In methods including a step of contacting the lens body with a washing liquid, the step of contacting the polymeric lens body with a washing liquid can be understood to be an extraction step because extractable materials are removed from the polymeric lens body. In some methods, the contacting step comprises contacting the polymeric lens body with a washing liquid comprising a volatile organic solvent, such as a liquid containing a primary alcohol, such as methanol, ethanol, n-propyl alcohol, and the like. Some washing liquid may contain a secondary alcohol, such as isopropyl alcohol, and the like. Using a washing liquid containing one or more volatile organic solvents can be helpful in removing hydrophobic materials from the polymeric lens body, and thus may increase the wettability of the lens surfaces. Such methods may be understood to be alcohol-based extraction steps. In other methods, the contacting step comprises contacting the polymeric lens body with an aqueous washing liquid that is free of a volatile organic solvent. Such methods may be understood to be aqueous extractions steps. Examples of aqueous washing liquid that can be used in such methods include water, such as deionized water, saline solutions, buffered solutions, or aqueous solutions containing surfactants or other non-volatile ingredients that may improve the removal of hydrophobic components from the polymeric contact lens bodies, or may reduce distortion of the polymeric contact lens bodies, compared to the use of deionized water alone. In one example, when washed using a washing liquid free of volatile organic solvents, the surfaces of the lens bodies of the present disclosure have ophthalmically acceptable wettable surfaces.

After washing, the contact lenses can be placed in packages, such as plastic blister packs, with a packaging solution, such as a buffered saline solution, which may or may not contain surfactants, anti-inflammatory agents, anti-microbial agents, contact lens wetting agents, and the like, and are sealed and sterilized. The packaging solution used to package the silicone hydrogel contact lenses of the present disclosure can comprise a wetting agent to increase wettability of the lens surfaces. However, it will be understood that the lens surfaces of the silicone hydrogel contact lenses of the present disclosure have ophthalmically acceptable wettable surfaces prior to contact with a packaging solution comprising a wetting agent, and the use of a wetting agent in the packaging solution is only to increase the wettability of the already ophthalmically acceptable wettable surfaces, and thus is not needed to provide the contact lens with an ophthalmically acceptable wettable surface.

After washing, the contact lenses can be placed in packages, such as plastic blister packs, with a packaging solution, such as a buffered saline solution, which may or may not contain surfactants, anti-inflammatory agents, anti-microbial agents, contact lens wetting agents, and the like, and can be sealed and sterilized.

In accordance with the present disclosure, the polymeric lens body can be packaged along with a contact lens packaging solution in a contact lens package, such as a blister pack or glass vial. Following packaging, the package can be sealed and the polymeric lens body and the contact lens packaging solution can be sterilized, for example, by autoclaving the sealed package, to produce a silicone hydrogel contact lens product.

The present method can further comprise repeating the steps to produce a plurality of the hydrogel contact lenses. The present method can further comprise manufacturing a batch of hydrogel contact lenses.

EXAMPLES

The following Examples 1-28 illustrate certain aspects and advantages of the present invention, which should be understood not to be limited thereby.

As can be readily determined by a review of the Examples herein, all of the Example formulations are free of an organic diluent. Also, all of the Example formulations are free of N,N-dimethylacrylamide (DMA). Additionally, all of the Example formulations herein are free of a polymeric wetting agent. Furthermore, all of the Example formulations comprise at least one hydrophilic amide monomer having one N-vinyl group. A majority of the Example formulations comprise a second siloxane having a number average molecular weight greater than 7,000 daltons.

The following chemicals are referred to in Examples 1-28, and may be referred to by their abbreviations.

Si1: 2-propenoic acid, 2-methyl-, 2-[3-(9-butyl-1,1,3,3,5,5,7,7,9,9-decamethylpentasiloxane-1-yl)propoxy]ethyl ester (CAS number of 1052075-57-6). (Si1 was obtained from Shin-Etsu Chemical Co., Ltd. (Japan) as product number X-22-1622).

Si2: α,ω-Bis(methacryloxypropyl)-poly(dimethyl siloxane)-poly(ω-methoxy-poly(ethylenegylcol)propylmethylsiloxane) (the synthesis of this compound can be performed as described in US20090234089)

Si3: Poly(dimethyl siloxane), methacryloxypropyl terminated (CAS number 58130-03-3; DMS-R18 available from Gelest, Morrisville, Pa.)

Si4: SiGMA: 3-methacryloxy-2-hydroxypropyloxy)propylbis(trimethylsiloxy)methylsilane (available from Gelest, Morrisville, Pa.)

Si5: TRIS: 3-[Tris(trimethylsilyloxy)silyl]propyl methacrylate

Si6: MCS-M11: A monomethacryloxypropyl terminated polydimethylsiloxane (Gelest, Morrisville, Pa., USA).

VMA: N-vinyl-N-methylacetamide (CAS number 003195786)

DMA: N,N-dimethylacrylamide (CAS number 2680-03-7)

HEMA: 2-hydroxyethyl methacrylate (CAS number 868-77-9)

HOB: 2-hydroxylbutyl methacrylate (CAS number 29008-35-3)

EGMA: Ethylene glycol methyl ether methacrylate (CAS number 6976-93-8)

MMA: Methyl methacrylate (CAS number 80-62-6)

EGDMA: Ethylene glycol dimethacrylate (CAS number 97-90-5)

TEGDMA: triethylene glycol dimethacrylate (CAS number 109-16-0)

BVE: 1,4-butanediol vinyl ether (CAS number 17832-28-9)

DEGVE: diethylene glycol vinyl ether (CAS number 929-37-3)

EGVE: ethylene glycol vinyl ether (CAS number 764-48-7)

TEGDVE: triethylene glycol divinyl ether (CAS number 765-12-8)

AE: 2-Allyloxy ethanol (CAS number 111-45-5)

V-64: 2,2'-Azobis-2-methyl propanenitrile (CAS number 78-67-1)

UV1: 2-(4-benzoyl-3-hydroxyphenoxy)ethyl acrylate (CAS number 16432-81-8)

UV2: 2-(3-(2H-benzotriazol-2-YL)-4-hydroxy-phenyl) ethyl methacrylate (CAS number 96478-09-0)

RBT1: 1,4-Bis[4-(2-methacryloxyethyl)phenylamino]anthroquinone (CAS number 121888-69-5)

RBT2: 1,4-Bis[(2-hydroxyethyl)amino]-9,10-anthracenedione bis(2-propenoic)ester (CAS Reg. No. 109561071)

TPP: Triphenyl phosphine (CAS number 603-35-0)

pTPP: polymerizable TPP: diphenyl(P-vinylphenyl)phosphine (CAS number 40538-11-2)

Hydrogel Contact Lens Fabrication and Testing Procedure

The chemical compounds set forth in Examples 1-28 were, for each example, weighed out in amounts corresponding to the described unit parts, and combined to form a mixture. The mixture was filtered through a 0.2-5.0 micron syringe filter into a bottle. Mixtures were stored for up to about 2 weeks. The mixtures are understood to be polymerizable silicone hydrogel contact lens precursor compositions, or as used herein, polymerizable compositions. In Examples 1-28, the listed amounts of ingredients are given as unit parts of the polymerizable composition by weight.

A volume of the polymerizable composition was cast molded by placing the composition in contact with a lens defining surface of a female mold member. In all of the following Examples 1-28, the molding surface of the female mold member was formed of a non-polar resin, specifically polypropylene. A male mold member was placed in contact with the female mold member to form a contact lens mold assembly comprising a contact lens shaped cavity containing the polymerizable composition. In the following Examples 1-28, the molding surface of the male mold member was formed of a non-polar resin, specifically polypropylene.

Contact lens mold assemblies were placed in a nitrogen flushed oven to allow the precursor compositions to thermally cure. For all of Examples 1-28, the contact lens mold assemblies were exposed to temperatures of at least about 55° C. for about 2 hours. Examples of curing profiles which can be used to cure silicone hydrogel contact lenses described herein include exposing the contact lens mold assemblies to temperatures of 55° C. for 40 minutes, 80° C. for 40 minutes, and 100° C. for 40 minutes. Other contact lenses can be made with the same curing profile, but instead of the first temperature being at 55° C., it can be at 65° C.

After polymerizing the polymerizable compositions, the contact lens mold assemblies were demolded to separate the male and female mold members. The polymeric lens body remained adhered to the male mold or the female mold. A dry demolding process where the mold assembly is not contacted with a liquid medium can be used, or a wet demolding process where the mold assembly is contacted with a liquid medium such as, for example, water or an aqueous solution, can be used. A mechanical dry demolding process can involve applying mechanical force to a portion of one or both of the mold members in order to separate the mold members. In all of the following Examples 1-28, a dry demolding process was used.

The polymeric lens body was then delensed from the male mold or female mold to produce a delensed polymeric lens body. In one example of a delensing method, the polymeric lens body can be delensed from the male mold member using a dry delensing process, such as by manually peeling the lens from the male mold member or by compressing the male mold member and directing a gas toward the male mold member and the polymeric lens body, and lifting the dry polymeric lens body with a vacuum device from the male mold member, which is discarded. In other methods, the polymeric lens body can be delensed using a wet delensing process by contacting the dry polymeric lens body with a liquid releasing medium, such as water or an aqueous solution. For example, a male mold member with the attached polymeric lens body can be dipped into a receptacle containing a liquid until the polymeric lens body separates from the male mold member. Or, a volume of liquid releasing medium can be added to the female mold to soak the polymeric lens body in the liquid and to separate the lens body from the female mold member. In the following Examples 1-28, a dry delensing process was used. Following separation, the lens body can be lifted from the mold member manually using tweezers or using a vacuum device and placed into a tray.

The delensed lens product was then washed to remove extractable materials from the polymeric lens body, and hydrated. Extractable materials included polymerizable components such as, for example, monomers, or cross-linking agents, or any optional polymerizable ingredients such as tints or UV blockers, or combinations thereof, present in the polymerizable composition which remain present in the polymeric lens body in an unreacted form, in a partially reacted form, or in an uncross-linked form, or any combination thereof, following polymerization of the lens body and prior to extraction of the lens body. Extractable materials may have also included any non-polymerizable ingredients present in the polymerizable composition, for example, any optional non-polymerizable tinting agents, or UV blockers, or diluents, or chain transfer agent, or any combination thereof, remaining present in the polymeric lens body following polymerization of the polymeric lens body but prior to extraction of the polymeric lens body.

In another method, such as a method involving delensing by compression of the male mold member and directing gas flow toward the male mold member, the delensed polymerized contact lens bodies can be placed in cavities of lens carriers or trays where the delensed polymeric lens bodies can then be contacted with one or more volumes of an extraction liquid, such as an aqueous extraction liquid free of a volatile organic solvent, for example deionized water or an aqueous solution of a surfactant such as Tween 80, or an organic solvent-based extraction liquid such as ethanol, or an aqueous solution of a volatile organic solvent such as ethanol.

In other methods, such as those involving wet delensing by contacting the mold and lens with a liquid releasing medium, the delensed polymerized contact lens bodies can be washed to remove extractable components from the lens bodies using a washing liquid that is free of a volatile organic solvent, such as a lower alcohol, for example, methanol, ethanol, or any combination thereof. For example, the delensed polymerized contact lens bodies can be washed to remove extractable components from the lens bodies by contacting the lens bodies with aqueous washing liquid free of a volatile organic solvent, such as, for example, deionized water, or a surfactant solution, or a saline solution, or a buffer solution, or any combination thereof. The washing can take place in the final contact lens package, or can take place a in washing tray or a washing tank.

In the following Examples 1-28, following the dry demolding and dry delensing steps, the dry delensed lens bodies were placed in cavities of trays, and the delensed polymeric lens bodies were extracted and hydrated by contacting the polymeric lens bodies with one or more volumes of extraction liquid. The extraction and hydration liquid used in the extraction and hydration process consisted of either a) a combination of volatile organic solvent-based extraction liquid and volatile organic solvent-free hydration liquid, or b) volatile organic solvent-free extraction and hydration liquid, i.e., entirely aqueous-based extraction and hydration liquid. Specifically, in Examples 1-5 herein, the extraction and hydration process comprised at least two extraction steps in separate portions of ethanol, followed by at least one extraction step in a portion of a 50:50 wt/wt ethanol:water solution of Tween 80, followed by at least three extraction and hydration steps in separate portions of a solution of Tween 80 in deionized water, wherein each extraction or extraction and hydration step lasted from about 5 minutes to 3 hours. In Examples 6-25 herein, the extraction and hydration process used comprised at least three extraction and hydration steps in separate portions of a solution of Tween 80 in deionized water, wherein the temperature of the Tween 80 solution of the portions ranged from room temperature to about 90 degrees C., and wherein each extraction and hydration step lasted from about 15 minutes to about 3 hours.

Washed, extracted and hydrated lenses were then placed individually in contact lens blister packages with a phosphate buffered saline packaging solution. The blister packages were sealed and sterilized by autoclaving.

Following sterilization, lens properties such as contact angle, including dynamic and static contact angle, oxygen permeability, ionoflux, modulus, elongation, tensile strength, water content, and the like were determined, as described herein.

For the present contact lenses, contact angles including dynamic and static contact angles, can be determined using routine methods known to persons of ordinary skill in the art. For example, the advancing contact angle and receding contact angle of the contact lenses provided herein can be measured using a conventional drop shape method, such as the sessile drop method or captive bubble method.

In the following Examples 1-28, the advancing and receding contact angle of silicone hydrogel contact lenses was determined using a Kruss DSA 100 instrument (Kruss GmbH, Hamburg), and as described in D. A. Brandreth: "Dynamic contact angles and contact angle hysteresis", Journal of Colloid and Interface Science, vol. 62, 1977, pp. 205-212 and R. Knapikowski, M. Kudra: Kontaktwinkelmessungen nach dem Wilhelmy-Prinzip-Ein statistischer Ansatz zur Fehierbeurteilung", Chem. Technik, vol. 45, 1993, pp. 179-185, and U.S. Pat. No. 6,436,481, all of which are incorporated by reference herein.

As an example, the advancing contact angle and receding contact angle was be determined using a captive bubble method using phosphate buffered saline (PBS; pH=7.2). The lens was flattened onto a quartz surface and rehydrated with PBS for at least 10 minutes before testing. An air bubble was placed onto a lens surface using an automated syringe system. The size of the air bubble was increased and decreased to obtain the receding angle (the plateau obtained when increasing the bubble size) and the advancing angle (the plateau obtained when decreasing the bubble size).

The modulus, elongation, and tensile strength values of the present lenses can be determined using routine methods known to persons of ordinary skill in the art, such as, for example, a test method in accordance with ANSI Z80.20. The modulus, elongation, and tensile strength values reported herein were determined by using an Instron Model 3342 or 3343 mechanical testing system (Instron Corporation, Norwood, Mass., USA) and Bluehill Materials Testing Software, using a custom built rectangular contact lens cutting die to prepare the rectangular sample strip. The modulus, elongation and tensile strength were determined inside a chamber having a relative humidity of least 70%. The lens to be tested was soaked in phosphate buffered solution (PBS) for at least 10 minutes prior to testing. While holding the lens concave side up, a central strip of the lens was cut using the cutting die. The thickness of the strip was determined using a calibrated gauge (Rehder electronic thickness gauge, Rehder Development Company, Castro Valley, Calif., USA). Using tweezers, the strip was loaded into the grips of the calibrated Instron apparatus, with the strip fitting over at least 75% of the grip surface of each grip. A test method designed to determine the maximum load (N), the tensile strength (MPa), the strain at maximum load (% elongation) and the mean and standard deviation of the tensile modulus (MPa) was run, and the results were recorded.

The percent energy loss of the present silicone hydrogel contact lenses can be determined using routine methods known to persons of ordinary skill in the art. For the following Examples 1-28, the percent energy loss was determined using an Instron Model 3343 (Instron Corporation, Norwood, Mass., USA) mechanical testing system, with a 10N force transducer (Instron model no. 2519-101) and Bluehill Materials Testing Software including a TestProfiler module. The energy loss was determined inside a chamber having a relative humidity of least 70%. Before testing, each lens was soaked in phosphate buffered solution (PBS) for at least 10 minutes. Using tweezers, the lens was loaded into the grips of the calibrated Instron apparatus, with the lens loaded vertically between the grips as symmetrically as possible so that the lens fit over at least 75% of the grip surface of each grip. A test designed to determine the energy required to stretch the lens to 100% strain and then return it to 0% strain at a rate of 50 mm/minute was then run on the lens. The test was conducted only once on a single lens. Once the test was finished, energy loss was calculated using the following equation: Lost Energy (%)=(Energy to 100% strain−Energy to return to 0% strain)/Energy to 100% strain×100%.

The ionoflux of the present lenses can be determined using routine methods known to persons of ordinary skill in the art. For the lenses of the following Examples 1-28, the ionoflux was measured using a technique substantially similar to the "Ionoflux Technique" described in U.S. Pat. No. 5,849,811, which is incorporated by reference herein. Prior to measurement, a hydrated lens was equilibrated in deionized water for at least 10 minutes. The lens to be measured was placed in a lens-retaining device, between male and female portions. The male and female portions included flexible sealing rings which were positioned between the lens and the respective male or female portion. After positioning the lens in the lens-retaining device, the lens-retaining device was then placed in a threaded lid. The lid was screwed onto a glass tube to define a donor chamber. The donor chamber was filled with 16 ml of 0.1 molar NaCl solution. A receiving chamber was filled with 80 ml of deionized water. Leads of the conductivity meter were immersed in the deionized water of the receiving chamber and a stir bar was added to the receiving chamber. The receiving chamber was placed in a water bath and the temperature was held at about 35° C. Finally, the donor chamber was immersed in the receiving chamber such that the NaCl solution inside the donor chamber was level with the water inside the receiving chamber. Once the temperature inside the receiving chamber was equilibrated to 35 degrees C., measurements of conductivity were taken every 2 minutes for at least 10 minutes. The conductivity versus time data was substantially linear, and was used to calculate the ionoflux value for the lenses tested.

The oxygen permeability (Dk) of the present lenses can be determined using routine methods known to persons of ordinary skill in the art. For example, the Dk value can be determined using a commercially available instrument under the model designation of MOCON® Ox-Tran System (Mocon Inc., Minneapolis, Minn., USA), for example, using the Mocon Method, as described in U.S. Pat. No. 5,817,924, which is incorporated by reference herein. The Dk values of the lenses of the following Examples 1-28 were determined using the method described by Chhabra et al. (2007), *A single-lens polarographic measurement of oxygen permeability (Dk) for hypertransmissible soft contact lenses*. Biomaterials 28: 4331-4342, which is incorporated by reference herein.

The equilibrium water content (EWC) of the present lenses can be determined using routine methods known to persons of ordinary skill in the art. For the lenses of the following Examples 1-28 a hydrated silicone hydrogel contact lens was removed from an aqueous liquid, wiped to remove excess surface water, and weighed. The weighed lens was then dried in an oven at 80 degrees C. under a vacuum, and the dried lens was then weighed. The weight difference was determined by subtracting the weight of the dry lens from the weight of the hydrated lens. The water content (%) is the (weight difference/hydrated weight)×100.

The percentage of the wet extractable component or dry extractable component in a lens can be determined by extracting the lenses in an organic solvent in which the polymeric lens body is not soluble in accordance to methods known to those of ordinary skill in the art. For the lenses of the following Examples 1-28, an extraction in methanol using a Sohxlet extraction process was used. For determination of the wet extractable component, a sample (e.g., at least 5 lenses per lot) of fully hydrated and sterilized contact lenses was prepared by removing excess packaging solution from each lens and drying them overnight in an 80° C. vacuum oven. For determination of the dry extractable component, a sample of polymeric lens bodies which had not been washed, extracted, hydrated or sterilized was prepared by drying the lens bodies overnight in an 80° C. vacuum oven. When dried and cooled, each lens was weighed to determine its initial dry weight (W1). Each lens was then placed in a perforated, stackable Teflon thimble, and the thimbles were stacked to form an extraction column with an empty thimble placed at the top of the column. The extraction column was placed into a small Sohxlet extractor attached to a condenser and a round bottom flask containing 70-80 ml methanol. Water was circulated through the condenser and the methanol was heated until it gently boiled. The lenses were extracted for at least 4 hours from the time condensed methanol first appeared. The extracted lenses were again dried overnight at 80° C. in a vacuum oven. When dried and cooled, each lens was weighed to obtain the dry weight of the extracted lens (W2), and the following calculation was made for each lens to determine the percent wet extractable component: [(W1−W2)/W1]×100.

Examples 1-28

Table 1 lists the ingredients of polymerizable compositions 1-14. Table 2 lists the ingredients of polymerizable compositions 15-28. Polymerizable compositions 1-28 were prepared as described in the Hydrogel Contact Lens Fabrication and Testing Procedure given herein, and were used to prepare and test hydrogel contact lenses as described in the Hydrogel Contact Lens Fabrication and Testing Procedure. All of the lenses prepared in Examples 1-28 were manually dry demolded and delensed.

Table 3 shows the lens properties for lenses formed using polymerizable compositions 1-14 when initially manufactured. Table 4 shows the lens properties for lenses formed using polymerizable compositions 15-28 when initially manufactured.

TABLE 1

| | Formulation Number | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Si1 | 30 | 30 | 30 | 30 | 30 | 32 | 32 | 23 | 23 | 26 | 26 | 26 | 26 | 26 |
| Si2 | | | | 10 | 10 | | | 15 | 15 | 10 | 10 | 10 | 10 | 10 |
| Si3 | 3 | 3 | 3 | | | 4 | 4 | | | | | 2 | | 2 |
| VMA | 45 | 45 | 45 | 45 | 48 | 40 | 50 | 40 | 45 | 40 | 45 | 45 | 40 | 45 |
| DMA | | | | | | | | | | | | | | |
| HEMA | | | | | | | | | | | | | | |
| HOB | | | | | | | | | | | | | | |
| BVE | | | | | | 7 | | 7 | 7 | 7 | 5 | 5 | 7 | 5 |
| DEGVE | | | | | | | | | | | | | | |
| EGVE | | | | | | | | | | | | | | |
| MMA | 15 | 15 | 15 | 15 | 15 | 12 | 14 | 10 | 10 | 12 | 12 | 12 | 12 | 12 |
| EGMA | 7 | 7 | 7 | 7 | 7 | 5 | | 5 | | 5 | 2 | | 5 | |
| TEGDVE | | 0.10 | 0.10 | 0.10 | 0.10 | 0.30 | 0.20 | 0.10 | 0.10 | 0.10 | 0.20 | 0.20 | 0.20 | 0.20 |
| EGDMA | | 0.50 | 0.50 | 0.50 | 0.50 | | | | | | | | | |
| TEGDMA | 0.80 | | | | | 1.00 | 0.80 | 1.00 | 1.00 | 1.20 | 1.20 | 1.20 | 1.30 | 1.10 |
| AE | 0.5 | 0.8 | 1.4 | 1.4 | 1.4 | | | | | | | | | |
| V64 | 0.30 | 0.30 | 0.50 | 0.50 | 0.50 | 0.50 | 0.50 | 0.50 | 0.50 | 0.50 | 0.50 | 0.50 | 0.50 | 0.50 |
| UV2 | | 0.90 | 0.90 | 0.90 | 0.90 | 0.90 | 0.90 | 0.90 | 0.90 | 0.90 | 0.90 | 0.90 | 0.90 | 0.90 |
| UV1 | 0.90 | | | | | | | | | | | | | |
| RBT1 | | 0.01 | 0.01 | 0.01 | 0.01 | | | | | | | | | |
| RBT2 | | | | | | 0.01 | 0.01 | 0.01 | 0.01 | 0.01 | 0.01 | 0.01 | 0.01 | 0.01 |
| pTPP | | | | | | 0.50 | 0.50 | 0.50 | 0.50 | 0.50 | 0.50 | 0.50 | 0.50 | 0.50 |
| TPP | | 0.50 | 0.50 | 0.50 | 0.50 | | | | | | | | | |

TABLE 2

| | Formulation Number | | | | | | | | | | | | | |
|---|---|---|---|---|---|---|---|---|---|---|---|---|---|---|
| | 15 | 16 | 17 | 18 | 19 | 20 | 21 | 22 | 23 | 24 | 25 | 26 | 27 | 28 |
| Si1 | 26 | 32 | 26 | 26 | 29 | 29 | 29 | 29 | 29 | 30 | 30 | 31 | 26 | 21 |
| Si2 | 10 | | 10 | 10 | 8 | 8 | 8 | 8 | 8 | 7 | 7 | 5 | 10 | 15 |
| Si3 | 2 | 4 | | | | | | | | | | | | |
| VMA | 40 | 45 | 40 | 40 | 42 | 44 | 45 | 42 | 45 | 44 | 45 | 40 | 40 | 40 |
| DMA | | | | | | | | | | | | | | |
| HEMA | | | | | | | | 4 | | | | | | |
| HOB | | | | | | | | | | 7 | | | | |
| BVE | 7 | 3 | 7 | 3 | | | | | | 4 | 5 | 9 | 9 | 9 |
| DEGVE | | | | | 7 | | | 7 | | 10 | | | | |
| EGVE | | | | | | 5 | | | | | | | | |
| MMA | | 13 | 12 | 12 | 14 | 14 | 13 | 8 | | 8 | 12 | 10 | 10 | 10 |
| EGMA | 15 | 3 | 5 | 5 | | | | 6 | 10 | 6 | 5 | 5 | 5 | 5 |
| TEGDVE | 0.20 | 0.20 | 0.20 | 0.10 | 0.08 | 0.15 | 0.10 | 0.10 | 0.10 | 0.10 | 0.20 | 0.10 | 0.10 | 0.10 |
| EGDMA | | | | 0.50 | 0.60 | 0.60 | 0.50 | 0.60 | 0.50 | 0.60 | | 1.00 | | |
| TEGDMA | 1.60 | 1.00 | 1.20 | | | | | | | | 1.40 | | 1.00 | 1.00 |
| AE | | | | | | | 0.3 | 0.4 | 0.3 | | | | | |
| V64 | 0.50 | 0.50 | 0.50 | 0.50 | 0.50 | 0.50 | 0.50 | 0.50 | 0.50 | 0.50 | 0.50 | 0.50 | 0.50 | 0.50 |
| UV2 | 0.90 | 1.30 | 1.30 | 1.30 | 1.30 | 1.30 | 1.70 | 1.70 | 1.70 | 1.80 | 1.80 | 0.90 | 0.90 | 0.90 |
| UV1 | | | | | | | | | | | | | | |
| RBT1 | | | | | | | | | | | | 0.01 | | 0.01 |
| RBT2 | 0.01 | 0.01 | 0.01 | 0.01 | 0.01 | 0.01 | 0.01 | 0.01 | 0.01 | 0.01 | 0.01 | | 0.01 | |
| pTPP | 0.50 | 0.50 | 0.50 | 0.50 | 0.50 | | 0.50 | 0.50 | 0.50 | 0.50 | 0.50 | 0.50 | 0.50 | 0.50 |
| TPP | | | | | | | | | | | | | | |

TABLE 3

| Lens Processing and Properties | Formulation Number | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Demolding Process Used | Dry | Dry | Dry | Dry | Dry | Dry | Dry | Dry | Dry | Dry | Dry | Dry | Dry | Dry |

TABLE 3-continued

| Lens Processing and Properties | Formulation Number | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Delensing Process Used | Dry | Dry | Dry | Dry | Dry | Dry | Dry | Dry | Dry | Dry | Dry | Dry | Dry | Dry |
| Extraction Media Used | O* | O* | O* | O* | O* | A* | A* | A* | A* | A* | A* | A* | A* | A* |
| EWC (%) | | 52 | 52 | 53-54 | 53 | 55 | 58 | 55 | 58 | 56 | 57 | 55 | 54 | |
| Dynamic CA (°) | | | 50.10 | 50.00 | 48-52 | | | | | | | | | |
| Static CA (°) | | | 30 | 38 | 37 | | | | | | | | | |
| Modulus (MPa) | | 0.63 | 0.58 | 0.43 | 0.40 | 0.70 | 0.77 | 0.61 | 0.66 | 0.57 | 0.69 | 0.85 | 0.66 | 0.81 |
| Ionoflux ($\times 10^{-3}$ mm$_2$/min) | | 3.62 | | 2.5-3.0 | 2.90 | 3.10 | 4.14 | 4.19 | 2.75 | 3.54 | 3.68 | 3.06 | 3.57 | |
| Dk (barrers) | | | | 70 | >60 | 72 | | | | | | | | |
| Elongation (%) | | | | 450 | 425 | 345 | 349 | 275 | 216 | 310 | 314 | 284 | 274 | 351 |
| Tensile Strength (MPa) | | | | 1.40 | 1.40 | 2.40 | 1.75 | 1.51 | 0.87 | 1.90 | 1.30 | 1.88 | 1.40 | 1.61 |
| Transmittance (%) | | | | 98.00 | 98.00 | | | | | | | | | |
| Wet Ext. (%) | | | 0.67 | 1.23 | 1.30 | 3.90 | 4.42 | 4.10 | 4.56 | 4.47 | 1.81 | 2.38 | 3.80 | |
| Dry Ext. (%) | | | | 17.00 | | 11.00 | | | | 14.39 | | | | |
| Energy Loss (%) | | | | 36 | 35-36 | 40 | 41 | | | 34-36 | 34 | 36 | | |
| Swell Factor (%) | | | | 21 | 21 | | | | | | | | | |

A* = extracted in a volatile organic solvent-free extraction media
O* = extracted in volatile organic solvent-based media and volatile organic solvent-free media

TABLE 4

| Lens Processing and Properties | Formulation Number | | | | | | | | | | | | | |
|---|---|---|---|---|---|---|---|---|---|---|---|---|---|---|
| | 15 | 16 | 17 | 18 | 19 | 20 | 21 | 22 | 23 | 24 | 25 | 26 | 27 | 28 |
| Demolding Process Used | Dry | Dry | Dry | Dry | Dry | Dry | Dry | Dry | Dry | Dry | Dry | Dry | Dry | Dry |
| Delensing Process Used | Dry | Dry | Dry | Dry | Dry | Dry | Dry | Dry | Dry | Dry | Dry | Dry | Dry | Dry |
| Extraction Media | A* | A* | A* | A* | A* | A* | A* | A* | A* | A* | A* | A* | A* | A* |
| EWC (%) | 53 | 57 | 56 | 55 | 55-56 | 56 | 55-56 | 57-58 | 55-56 | 61 | 55-57 | | 56 | |
| Dynamic CA (°) | | 50-56 | 47-51 | 47-55 | 45-47 | | 51-53 | 44-48 | 55-58 | 45-47 | 47-53 | | | |
| Static CA (°) | | | | | | | | | | | | | | |
| Modulus (MPa) | 0.74 | 0.70 | 0.50 | 0.60 | 0.71 | 0.65 | 0.53 | 0.70 | 0.60 | 0.50 | 0.70 | | 0.46 | 0.51 |
| Ionoflux ($\times 10^{-3}$ mm$_2$/min) | 3.33 | | | | | | | 2.90 | 4.10 | 3.80 | 3.60 | | 3.60 | 6.42 |
| Dk (barrers) | | | | | | | | | | 59-71 | 59-67 | | 81 | |
| Elongation (%) | 222 | | | | | | | 300 | 275 | 279 | 285 | | 196 | 200 |
| Tensile Strength (MPa) | | | | | | | | 1.50 | 1.20 | 1.20 | 1.30 | | 0.60 | 0.67 |
| Transmittance (%) | | | | | | | | | | | | | | |
| Wet Ext. (%) | | | | | | | | 5.10 | 4.60 | 4.55 | 4.10 | | 7.28 | |
| Dry Ext. (%) | | | | | | | | 12.20 | 10.60 | 13.65 | 9.80 | | 17.87 | |
| Energy Loss (%) | | 40 | | | | | 34 | 32-33 | 31-32 | 30-33 | 4.1-35 | 36-38 | 34-38 | 32-34 |
| Swell Factor (%) | | | | | | | | | | 27 | | | | |

A* = extracted in a volatile organic solvent-free extraction media
O* = extracted in volatile organic solvent-based media and volatile organic solvent-free media Although the disclosure herein refers to certain illustrated embodiments, it is to be understood that these embodiments are presented by way of example and not by way of limitation. The intent of the foregoing detailed description, although discussing exemplary embodiments, is to be construed to cover all modifications, alternatives, and equivalents of the embodiments as may fall within the spirit and scope of the invention as defined by the additional disclosure.

A number of publications and patents have been cited herein. Each of the cited publications and patents are hereby incorporated by reference in their entireties.

What is claimed is:

1. A silicone hydrogel contact lens, comprising:
a polymeric lens body that is the reaction product of a polymerizable composition, said polymerizable composition comprising (a) at least one siloxane monomer; and
(b) ethylene glycol methyl ether methacrylate (EGMA) in an amount of from 1 to 20 unit parts by weight;
wherein the polymerizable composition further comprises methyl methacrylate (MMA), and a ratio of unit parts by weight of MMA to unit parts by weight of EGMA present in the polymerizable composition is from about 6:1 to about 1:1.

2. The silicone hydrogel contact lens of claim 1, wherein the polymerizable composition further comprises at least one hydrophilic vinyl ether-containing monomer.

3. The silicone hydrogel contact lens of claim 1, wherein the polymerizable composition further comprises at least one vinyl-containing cross-linking agent.

4. The silicone hydrogel contact lens of claim 1, wherein the polymerizable composition further comprises at least one acrylate or methacrylate-containing cross-linking agent.

5. The contact lens of claim 1, wherein the at least one siloxane monomer is a dual-end methacrylate end-capped polydimethylsiloxane monomer.

6. The contact lens of claim 1, wherein the at least one siloxane monomer comprises a first siloxane monomer having a molecular weight of from 400 daltons to 700 daltons, and a second siloxane monomer having a molecular weight greater than about 7,000 daltons.

7. The contact lens of claim 1, wherein the at least one siloxane monomer comprises a monofunctional siloxane monomer represented by formula (3):

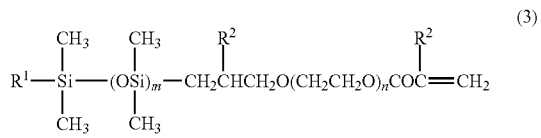

wherein m of formula (3) represents one integer from 3 to 10, n of formula (3) represents one integer from 1 to 10, $R^1$ of formula (3) is an alkyl group having from 1 to 4 carbon atoms, and each $R^2$ of formula (3) is independently either a hydrogen atom or a methyl group.

8. The contact lens of claim 7, wherein in the siloxane monomer of formula (3), m of formula (3) is 4, n of formula (3) is 1, $R^1$ of formula (3) is a butyl group, and each $R^2$ of formula (3) is independently either a hydrogen atom or a methyl group.

9. The contact lens of claim 1, wherein the at least one siloxane monomer comprises a bifunctional siloxane monomer represented by formula (4):

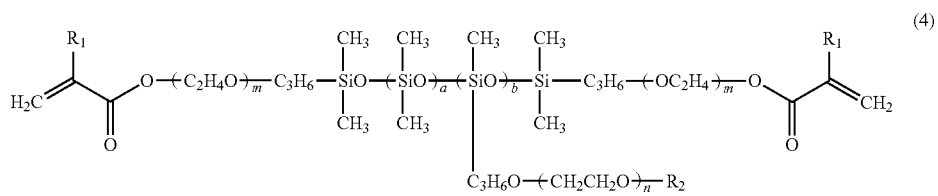

wherein $R^1$ of formula (4) is selected from either hydrogen atom or a methyl group; $R^2$ of formula (4) is selected from either of hydrogen atom or a hydrocarbon group having 1 to 4 carbon atoms; m of formula (4) represents an integer of from 0 to 10; n of formula (4) represents an integer of from 4 to 100; a and b represent integers of 1 or more; a+b is equal to 20-500; b/(a+b) is equal to 0.01-0.22; and the configuration of siloxane units includes a random configuration.

10. The contact lens of claim 9, wherein in the siloxane monomer of formula (4), m of formula (4) is 0, n of formula (4) is an integer from 5 to 15, a is an integer from 65 to 90, b is an integer from 1 to 10, $R^1$ of formula (4) is a methyl group, and $R^2$ of formula (4) is either a hydrogen atom or a hydrocarbon group having 1 to 4 carbon atoms.

11. The contact lens of claim 1, wherein the polymerizable composition comprises a first siloxane monomer and a second siloxane monomer, and a ratio of unit parts of the first siloxane monomer present in the polymerizable composition to unit parts of the second siloxane monomer present in the polymerizable composition is at least 2:1.

12. The contact lens of claim 1, wherein the polymerizable composition further comprises at least one hydrophilic amide monomer having one N-vinyl group.

13. The contact lens of claim 12, wherein the at least one hydrophilic amide monomer having one N-vinyl group is present in the polymerizable composition in an amount from about 10 to about 60 unit parts by weight.

14. A batch of silicone hydrogel contact lenses, comprising a plurality of the contact lens recited in claim 1, wherein the batch of silicone hydrogel contact lenses has, when fully hydrated, an average equilibrium water content (EWC) from about 30% wt/wt to about 70% wt/wt, or an average oxygen permeability of at least 55 barrers, or a tensile modulus from about 0.2 MPa to about 0.9 MPa, or any combination thereof, based on averages of values determined for at least 20 individual lenses of the batch.

15. A method of manufacturing a silicone hydrogel contact lens, comprising:
  providing a polymerizable composition, said polymerizable composition comprising
  (a) at least one siloxane monomer; and
  (b) ethylene glycol methyl ether methacrylate (EGMA) in an amount of from 1 to 20 unit parts by weight;
  polymerizing the polymerizable composition in a contact lens mold assembly to form a polymeric contact lens body;
  contacting the polymeric contact lens body with a washing liquid to remove extractable material from the polymeric contact lens body; and
  packaging the polymeric contact lens body in a contact lens packaging solution in a contact lens package,
  wherein the polymerizable composition further comprises methyl methacrylate (MMA), and a ratio of unit parts by weight of MMA to unit parts by weight of EGMA present in the polymerizable composition is from about 6:1 to about 1:1.

16. The method of claim 15, wherein the washing liquid comprises a volatile organic solvent.

17. The method of claim 15, wherein the washing liquid is free of a volatile organic solvent, and the polymeric contact lens body is not contacted by a volatile organic solvent during its manufacturing process.

18. The silicone hydrogel contact lens of claim 1, wherein the ratio is at least 2:1.

19. The method of claim 15, wherein the ratio is at least 2:1.

20. The silicone hydrogel contact lens of claim 1, wherein the polymerizable composition is substantially free of a hydrophilic vinyl ether containing monomer.

* * * * *